United States Patent
Adeyoola et al.

(10) Patent No.: US 10,121,189 B2
(45) Date of Patent: Nov. 6, 2018

(54) COMPUTER IMPLEMENTED METHODS AND SYSTEMS FOR GENERATING VIRTUAL BODY MODELS FOR GARMENT FIT VISUALISATION

(71) Applicant: METAIL LIMITED, London (GB)

(72) Inventors: Tom Adeyoola, London (GB); Nick Brown, London (GB); Nikki Trott, London (GB); Edward Herbert, London (GB); Duncan Robertson, Cambridgeshire (GB); Jim Downing, Cambridgeshire (GB); Nick Day, Cambridgeshire (GB); Robert Boland, Cambridgeshire (GB); Tom Boucher, London (GB); Joe Townsend, Cambridgeshire (GB); Edward Clay, London (GB); Tom Warren, Surrey (GB); Anoop Unadkat, London (GB); Yu Chen, London (GB)

(73) Assignee: METAIL LIMITED, London (GB)

( * ) Notice: Subject to any disclaimer, the term of this patent is extended or adjusted under 35 U.S.C. 154(b) by 0 days.

(21) Appl. No.: 15/054,818

(22) Filed: Feb. 26, 2016

(65) Prior Publication Data
US 2016/0180433 A1 Jun. 23, 2016

Related U.S. Application Data

(63) Continuation of application No. 14/000,088, filed as application No. PCT/GB2012/050365 on Feb. 17, 2012.

(30) Foreign Application Priority Data

Feb. 17, 2011 (GB) .................................. 1102794.3
Jul. 5, 2011 (GB) .................................. 1111464.2

(Continued)

(51) Int. Cl.
*G06T 15/00* (2011.01)
*G06Q 30/06* (2012.01)
(Continued)

(52) U.S. Cl.
CPC ......... *G06Q 30/0643* (2013.01); *G06F 3/005* (2013.01); *G06F 3/0482* (2013.01);
(Continued)

(58) Field of Classification Search
CPC ......... G06T 19/006; G06T 2207/30196; G06F 3/04815; G06F 3/04842; G06F 3/04845;
(Continued)

(56) References Cited

U.S. PATENT DOCUMENTS

| 5,495,568 A | 2/1996 | Beavin |
| 6,310,627 B1 | 10/2001 | Sakaguchi |

(Continued)

FOREIGN PATENT DOCUMENTS

| EP | 1 959 394 A2 | 6/2008 |
| EP | 1959394 A2 | 8/2008 |

(Continued)

OTHER PUBLICATIONS

Total Immersion AR, Online Virtual Dressing Room—Augmented by immediaC and Total Immersion, https://www.youtube.com/watch?v=XjiQ7MXe1-8, Sep. 28, 2010.*

(Continued)

*Primary Examiner* — Phu K Nguyen
(74) *Attorney, Agent, or Firm* — Saul Ewing Arnstein & Lehr LLP

(57) ABSTRACT

Methods for generating and sharing a virtual body model of a person, created with a small number of measurements and a single photograph, combined with one or more images of garments. The virtual body model represents a realistic representation of the users body and is used for visualizing (Continued)

photo-realistic fit visualizations of garments, hairstyles, make-up, and/or other accessories. The virtual garments are created from layers based on photographs of real garment from multiple angles. Furthermore the virtual body model is used in multiple embodiments of manual and automatic garment, make-up, and, hairstyle recommendations, such as, from channels, friends, and fashion entities. The virtual body model is sharable for, as example, visualization and comments on looks. Furthermore it is also used for enabling users to buy garments that fit other users, suitable for gifts or similar. The implementation can also be used in peer-to-peer online sales where garments can be bought with the knowledge that the seller has a similar body shape and size as the user.

23 Claims, 46 Drawing Sheets

(30) Foreign Application Priority Data

| Jul. 27, 2011 | (GB) | .................................. | 1112931.9 |
| Oct. 25, 2011 | (GB) | .................................. | 1118467.8 |

(51) Int. Cl.
| *H04N 13/204* | (2018.01) |
| *H04N 13/207* | (2018.01) |
| *H04N 13/271* | (2018.01) |
| *H04N 13/282* | (2018.01) |
| *G06T 19/00* | (2011.01) |
| *G06T 13/80* | (2011.01) |
| *G06Q 50/00* | (2012.01) |
| *G06T 17/00* | (2006.01) |
| *G06F 17/30* | (2006.01) |
| *G06Q 10/08* | (2012.01) |
| *G06T 13/40* | (2011.01) |
| *G06F 3/0481* | (2013.01) |
| *G06F 3/0484* | (2013.01) |
| *G06F 3/0488* | (2013.01) |
| *G06F 3/00* | (2006.01) |
| *H04N 5/33* | (2006.01) |
| *G06F 3/0482* | (2013.01) |
| *G06K 9/62* | (2006.01) |
| *G06T 11/00* | (2006.01) |
| *G06T 15/20* | (2011.01) |
| *G06T 17/20* | (2006.01) |
| *G06T 13/20* | (2011.01) |
| *G06T 7/11* | (2017.01) |
| *G06T 7/194* | (2017.01) |

(52) U.S. Cl.
CPC ...... *G06F 3/04815* (2013.01); *G06F 3/04817* (2013.01); *G06F 3/04842* (2013.01); *G06F 3/04845* (2013.01); *G06F 3/04883* (2013.01); *G06F 17/30259* (2013.01); *G06F 17/30268* (2013.01); *G06F 17/30274* (2013.01); *G06F 17/30554* (2013.01); *G06F 17/30867* (2013.01); *G06K 9/6215* (2013.01); *G06Q 10/087* (2013.01); *G06Q 30/0605* (2013.01); *G06Q 30/0625* (2013.01); *G06Q 30/0629* (2013.01); *G06Q 30/0631* (2013.01); *G06Q 50/01* (2013.01); *G06T 7/11* (2017.01); *G06T 7/194* (2017.01); *G06T 11/001* (2013.01); *G06T 13/20* (2013.01); *G06T 13/40* (2013.01); *G06T 13/80* (2013.01); *G06T 15/205* (2013.01); *G06T 17/00* (2013.01); *G06T 17/20* (2013.01); *G06T 19/006* (2013.01); *H04N 5/33* (2013.01); *H04N 13/204* (2018.05); *H04N 13/207* (2018.05); *H04N 13/271* (2018.05); *H04N 13/282* (2018.05); *G06T 2200/04* (2013.01); *G06T 2200/24* (2013.01); *G06T 2207/10012* (2013.01); *G06T 2207/10028* (2013.01); *G06T 2207/20212* (2013.01); *G06T 2207/30196* (2013.01); *G06T 2210/16* (2013.01)

(58) Field of Classification Search
CPC . G06F 3/04883; G06F 3/005; H04N 13/0207; H04N 13/0282; H04N 13/0203
USPC .......................................................... 345/419
See application file for complete search history.

(56) References Cited

U.S. PATENT DOCUMENTS

| 6,546,309 | B1 | 4/2003 | Gazzuolo |
| 6,901,379 | B1 | 5/2005 | Balter et al. |
| 7,953,648 | B2 | 5/2011 | Vock et al. |
| 8,275,590 | B2 | 9/2012 | Szymczyk et al. |
| 8,380,586 | B2* | 2/2013 | Paolini ............... G06Q 10/0637 |
| | | | 705/26.7 |
| 8,554,523 | B2 | 10/2013 | Ko et al. |
| 8,655,053 | B1 | 2/2014 | Hansen |
| 8,660,902 | B2* | 2/2014 | Coulter .................. G06Q 30/02 |
| | | | 705/26.1 |
| 8,674,989 | B1 | 3/2014 | Toth et al. |
| 8,700,477 | B2 | 4/2014 | Wolper et al. |
| 8,711,175 | B2* | 4/2014 | Aarabi .................... G09G 5/024 |
| | | | 345/419 |
| 8,768,786 | B2* | 7/2014 | Paolini ............... G06Q 10/0637 |
| | | | 705/14.49 |
| 8,908,928 | B1 | 12/2014 | Hansen et al. |
| 8,930,012 | B2 | 1/2015 | Fernandez et al. |
| 8,970,585 | B2 | 3/2015 | Weaver |
| 9,001,118 | B2 | 4/2015 | Molyneaux et al. |
| 9,167,155 | B2* | 10/2015 | Wojciech ............. G06T 7/0024 |
| 9,489,106 | B2 | 11/2016 | Chaudhri |
| 9,665,906 | B2* | 5/2017 | Adeyoola ............. G06T 19/006 |
| 9,699,123 | B2* | 7/2017 | Doerksen ................ H04L 51/10 |
| 2003/0101105 | A1 | 5/2003 | Vock |
| 2004/0044589 | A1 | 3/2004 | Inoue et al. |
| 2005/0071257 | A1 | 3/2005 | Giannini |
| 2006/0202986 | A1 | 9/2006 | Okada et al. |
| 2007/0032898 | A1 | 2/2007 | Wang |

FOREIGN PATENT DOCUMENTS

| EP | 2046588 A1 | 4/2009 |
| KR | 20010096903 A | 11/2001 |
| WO | 2005/088484 A1 | 9/2005 |

OTHER PUBLICATIONS

Kravetz, If That's Me in the E-Dressing Room, Why Doesn't This Fit?, The New York Times, pp. 1-5, Sep. 20, 2010.*
Mendez, High-tech dressing rooms become virtual reality, The Christian Science Monitor, pp. 1-4, Apr. 20, 2007.*
Furukawa et al., Virtual Worlds, Second Intl. Conference, VW 2000, Proceedings (Jul. 5, 2000); retrieved from the Internet: URL:http://www.miralab.ch/repository/papers/26.pdf [retreived on Jun. 13, 2012].
Wei-Long Li et al.: "3D Fashion Fast Modeling from Photographs". Computer Science and Information Engineering. 2009 WRI World Congress on. IEEE. Piscataway, NJ, USA. Mar. 31, 2009 (Mar. 31, 2009). pp. 738-742. XP031494711.
Kim S Met al: "Garment pattern generation from body scan data". Computer Aided Design, Elsevier Publishers BV. BARKI NG, GB. vol. 35, No. 7. Jun. 1, 2003 (Jun. 1, 2003). pp. 611-618. XP004415805.
Achim Ebert et al: "Rule-based Morphing Techniques for Interactive Clothing Catalogs". Scientific Visualization: The Visual Extrac-

(56) References Cited

OTHER PUBLICATIONS tion of Knowledge from Data. Springer Berlin Heidelberg. Berlin Heidelberg. vol. IV. Jan. 1, 2006 (Jan. 1, 2006). pp. 329-343. XP008152701.

Ching-I Cheng et al: "A 3D Virtual Show Room for Online Apparel Retail Shop," Proceedings: APSIPA ASC 2009: Asia-Pacific Signa: and Information Processing Association. 2009 Annual Summit and Conference: 193-199. Oct. 4, 2009 (Oct. 4, 2009), XP55029726. Retrieved from the Internet: URL:http://eprints.llb.hokudai.ac.jp/dspace/bitstream/2115/39672/1/MP-LI-3.pdf.

International Search Report, dated Jun. 20, 2012, and Written Opinion issued in International Application No. PCT/GB2012/050365.

UK Search and Examination Report, dated Jun. 15, 2012, issued in GB Application No. GB1202763.7.

"The network virtual clothing fitting system analysis and design," Shandong University's Master's Thesis (Apr. 10, 2009).

Combined Search and Examination Report, dated Jun. 9, 2015, and Notification of Grant, dated Sep. 1, 2015, issued in GB Application No. 1509020.2.

Combined Search and Examination Report, dated Jun. 9, 2015, and Notification of Grant, dated Nov. 10, 2015, issued in GB Application No. 1509162.2.

Combined Search and Examination Report, dated Jun. 5, 2015, and Notification of Grant, dated Sep. 1, 2015, issued in GB Application No. 1508943.6.

Chittaro, et al., "3D virtual clothing: from garment design to web3d visualization and simulation", Proceedings of the eighth international conference on 3D Web technology. ACM, 2003.

Vassilev, et al., "Efficient cloth model for dressing animated virtual people", Computer Graphics, 1998.

Guan, et al., "A new apparel design and online shopping framework for mass customization and best fit", Automation and Computing (ICAC) 2012 18th International Conference on IEEE, 2002.

Jojic, et al., "Computer vision and graphics techniques for modeling dressed humans", Confluence of computer vision and computer graphics, Springer Netherlands, pp. 179-200, 2000.

Ma, "Virtual garment sewing", Diss. The Hong Kong Polytechnic University, pp. 1-221 http://dl.acm.org/citation.cfm?d=1195510, 2006.

"99 Falling Apples", Virtual Dressing Room: Try It On, [retrieved from the Internet] https://www.youtube.com/watch?v=mJKijrVDfWs, Aug. 20, 2010.

Cheng, et al., "A 3D Virtual Show Room for Online Apparel Retail Shop", Proc. of 2009 APSIPA Annual Summit and Conference, Sapporo, Japan, Oct. 4-7, 2009, 2009, 193-199.

Kaiyi, "3D Online Fitting System Based on Flash", Computer & Telecommunication, vol. 2010-02 (ISSN: 1008-6609), Feb. 2010.

Levere, "Penney Sells Back-to-School Clothes the Digital Way", New York Times, pp. 1-3, Aug. 2, 2010.

Rueter, "Macy's offers digital magic to get the right look in-store", Internet retailer, retrieved from the Internet; URL:https://www.internetretailer.com/2010/11/01/macys-offers-digital-magic-get-right-look-store; pp. 1-2 [retrieved Mar. 5, 2017], Nov. 1, 2010.

Metail Limited, "Mannequin Adaptation", Jun. 21, 2011, pp. 1-7.

\* cited by examiner

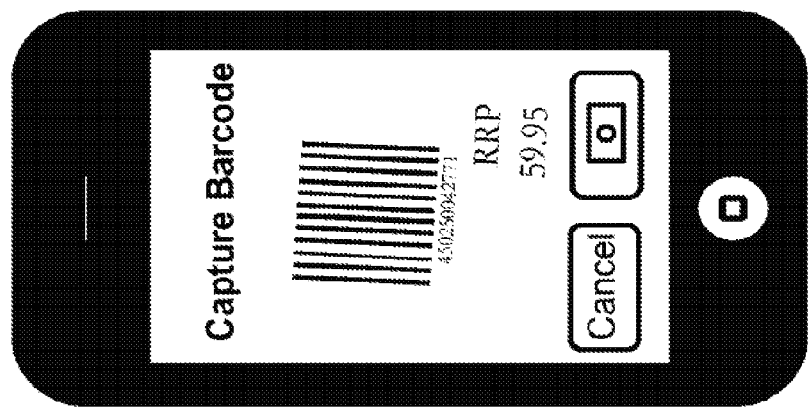
Figure 5

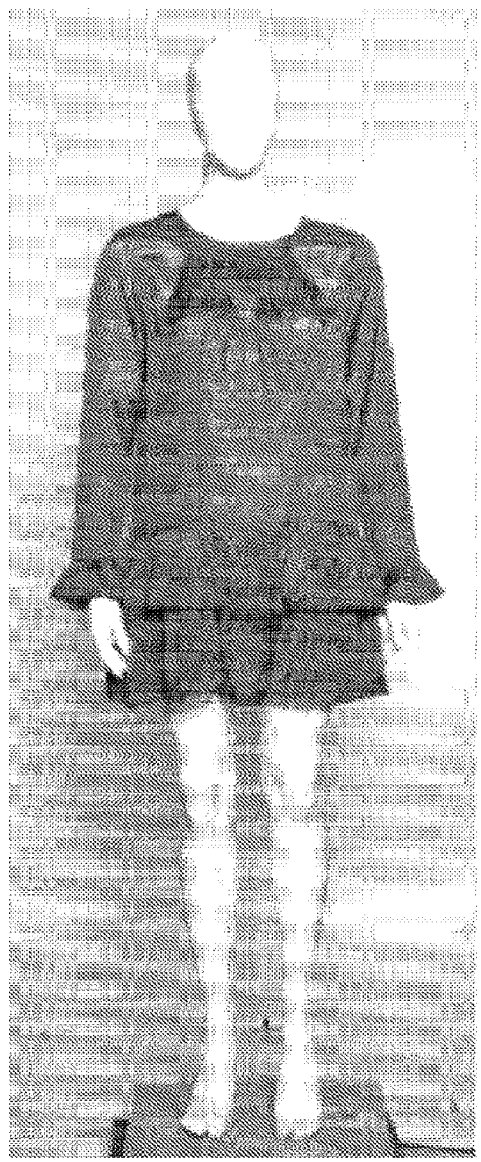 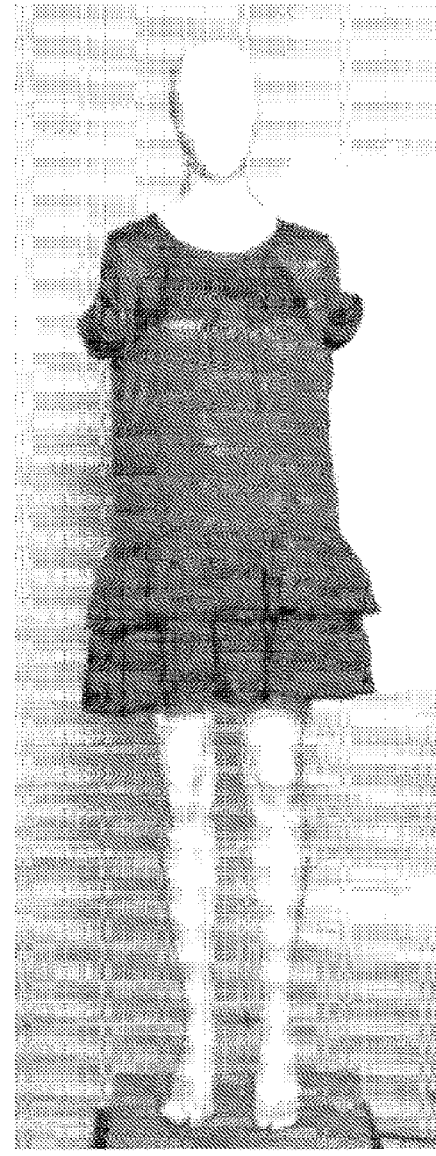
Arms down    Arms up
Figure 29

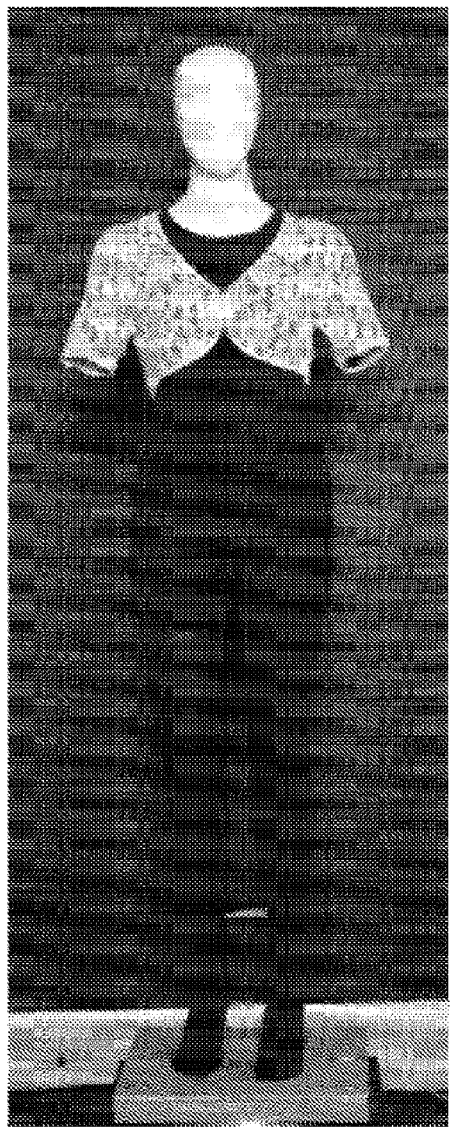 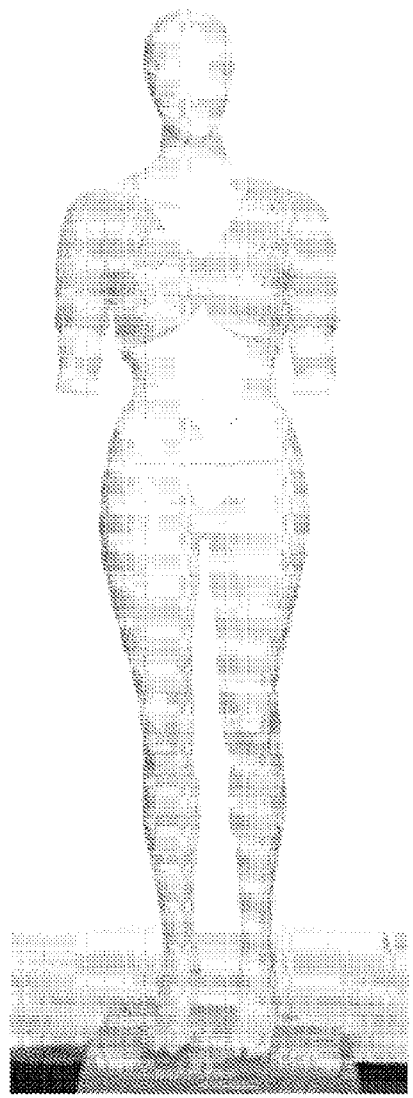
Black on black         White on white
Figure 30

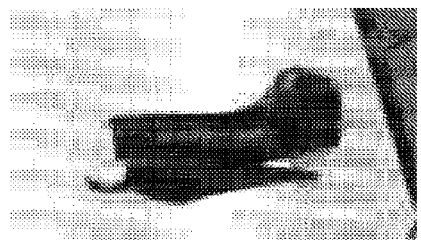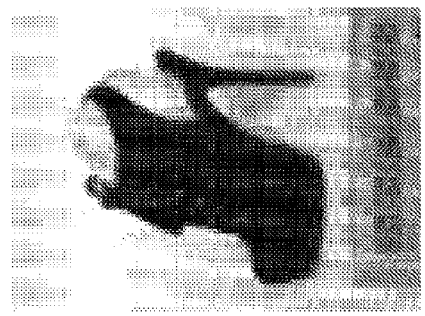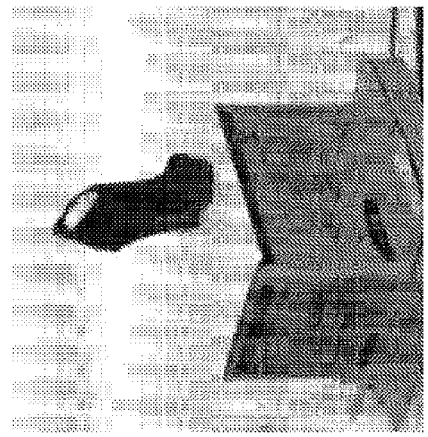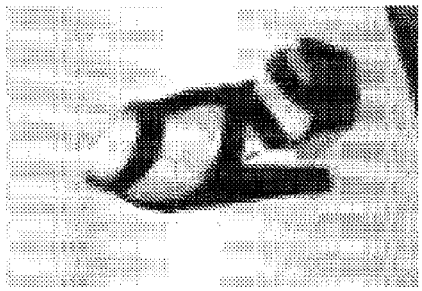
Figure 31

| INFO COMPLETE? | COLLECTION | ME_TAIL CODE | PHOTOGRAPH | PRODUCT CODE | PRODUCT DESCRIPTION | PRICE | SALE PRICE | COLOUR | LOOK AFTER ME | ABOUT ME | URL | SITE IMAGE |
|---|---|---|---|---|---|---|---|---|---|---|---|---|
| | | | | | | | | | | | | |

Figure 32

LongCurlyAuburn02_View_0.zip

| tag key: | value: |
|---|---|
| name | LongCurlyAuburn02 |
| viewpoint | 0 |
| colour | auburn |
| vs_id | _4/LongCurlyAub |
| skintone | pale,tan |
|  |  |
| length | long |
| style | straight |
|  |  |

Update close (back to overview)

Figure 34

| tag/key | Used by | Possible values | eg |
|---|---|---|---|
| name | Vizago | [any] | LongCurlyAuburn02 |
| viewpoint | maps to garment model in GME | 0,1,2,3,4,5,6,7 | 0 |
| colour | Fittingroom filters | blonde, brunette, black, auburn, grey, colourful | blonde |
| vs_id | maps to garment model in GME | [any] | _4/LongCurlyAuburn02 |
| skintone | Head creation filters | pale, tan, dark | pale,tan |
| length | Fittingroom filters | short, medium, long | long,medium |
| style | Fittingroom filters | straight, wavy, curly, up | straight |

Figure 35

| Womanswear Product Matrix | | A | X garments is worn OUTSIDE Y garment |
|---|---|---|---|
| | | B | X garments is worn INSIDE Y garment |
| | | C | X garments is worn both OUTSIDE and INSIDE Y garment |
| | | D | X garment and Y garment CANNOT be layered together |
| | | E | X garment and Y garment are worn on separate parts of the body |

| | To be worn with (Y garments) | | | | | | | | | | | | | | | | | |
|---|---|---|---|---|---|---|---|---|---|---|---|---|---|---|---|---|---|---|
| Category (X garments) | Dresses | Tops | Knitwear | Jackets | Coats | Jeans and Trousers | Shorts | Skirts | Jumpsuits | Shoes | Bags | Accessories | Sunglasses | Jewellery | Leggings | Hosiery | Lingerie | Swimwear |
| Dresses | C | C | C | B | B | A | A | A | A | A | B | C | D | C | A | A | A | A |
| Tops | C | C | C | B | B | C | C | C | C | D | B | C | D | C | C | A | A | A |
| Knitwear | C | C | C | B | B | C | C | C | C | D | B | C | D | C | C | A | A | A |
| Jackets | A | A | A | C | B | A | A | A | A | D | B | C | D | A | A | A | A | A |
| Coats | A | A | A | A | C | A | A | A | A | D | B | A | D | A | A | A | A | A |
| Jeans and Trousers | A | C | C | A | A | | D | D | D | D | B | C | D | D | A | A | A | A |
| Shorts | A | C | C | A | A | D | | B | D | D | B | C | D | D | A | A | A | A |
| Skirts | A | C | C | A | A | D | B | | D | D | B | C | D | D | A | A | A | A |
| Jumpsuits | A | | | A | A | D | D | D | | A | B | C | D | C | A | A | A | A |
| Shoes | A | D | D | D | D | | | | C | | C | A | D | A | A | A | A | D |
| Bags | C | | | | | | | | | | | C | D | C | C | C | C | C |
| Accessories | C | | | | | | | | | | | | D | D | D | D | D | D |
| Sunglasses | D | | | | | | | | | | | | | C | C | C | C | C |
| Jewellery | C | | | | | | | | | | | | | | D | C | A | A |
| Leggings | A | | | | | | | | | | | | | | | C | A | D |
| Hosiery | A | | | | | | | | | | | | | | | | A | C |
| Lingerie | A | | | | | | | | | | | | | | | | | C |
| Swimwear | C | | | | | | | | | | | | | | | | | |

Figure 38

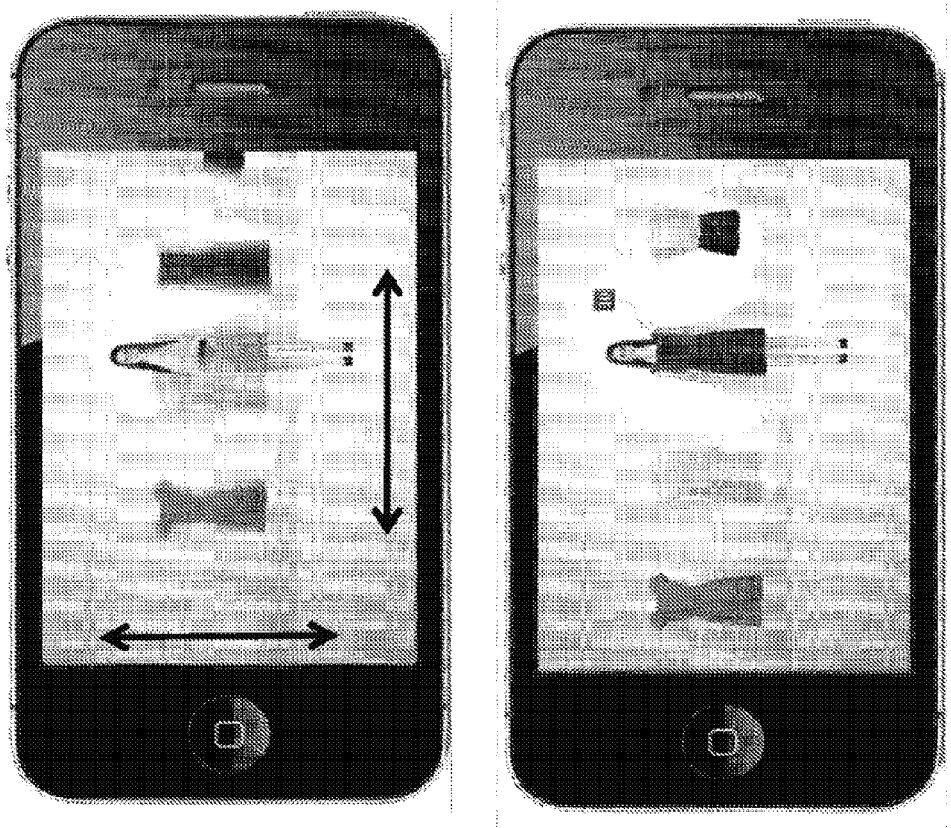

COMPUTER IMPLEMENTED METHODS AND SYSTEMS FOR GENERATING VIRTUAL BODY MODELS FOR GARMENT FIT VISUALISATION

CROSS-REFERENCE TO RELATED APPLICATIONS

This application is a continuation of U.S. application Ser. No. 14/000,088, filed Dec. 27, 2013, which claims the priority of PCT/GB2012/050365, filed on Feb. 17, 2012, which claims priority to Great Britain Application No. 1102794.3, filed on Feb. 17, 2011; Great Britain Application No. 1111464.2, filed on Jul. 5, 2011; Great Britain Application No. 1112931.9, filed on Jul. 27, 2011; and Great Britain Application No. 1118467.8, filed on Oct. 25, 2011, the entire contents of all of which are hereby incorporated in total by reference.

BACKGROUND OF THE INVENTION

1. Field of the Invention

The field of the invention relates to methods for generating and sharing a virtual body model of a person combined with an image of a garment, methods for generating an image of a user in a garment, methods for automatically generating garment size recommendations, methods for visualising generating make-up and hairstyle recommendations, methods of generating a virtual body model of a user, methods for sharing a virtual body model of a person, and methods of enabling users to interact with virtual body models. The field of the invention includes systems which relate to these methods.

2. Technical Background

When shopping for clothes, users typically have entered shops which specialize in selling clothes, in order to try on the clothes before purchase. But the shops are usually closed for more than 12 hours per day, which limits shopping time. More recently, users have been able to purchase clothes from online retailers. During specification of the clothing for online purchase, users can specify a size, but they are unable to try the clothes on without first taking delivery of the clothes. If the clothes are not of the desired size or do not provide the hoped-for look, they may be returned, which entails expense. Current estimates are that return rates for clothes bought online can be as high as 30%—largely because returned clothes do not fit. So at the present time, to try the clothes on, the user must either go to the shop, or must wait for the clothes to be delivered, both of which take time and entail travel or delivery costs. It would be helpful if the user could try the clothes on in some way without having to travel to a shop, or having to wait to take delivery of the clothes. Considerable efforts have been made in recent years to provide computer-implemented systems that construct a virtual body model for a user—i.e. a virtual or computer-graphics based model of most (in some cases, all) of user's head and body; such models are ideally meant to accurately portray the user. These systems then provide a collection of virtual garments that, with varying degrees of accuracy, reflect the actual shape and size of a physical garment that can be bought be a user. A garment can be selected by the user and then fitted, or visualised, onto the user's virtual body model. This enables the user to see what the garment would look like; in particular, whether that style of garment suits the user and whether the fit for that specific size of garment is correct. However, such systems have failed to provide a complete and practical solution. The various aspects of this invention aim to address that failure.

3. Discussion of Related Art

WO2011033258A1 entitled SYSTEM AND METHOD FOR IMAGE PROCESSING AND GENERATING A BODY MODEL, which is incorporated by reference, discloses the following. Images of foreground objects in a scene are generated by causing electromagnetic radiation to be emitted having a first spectral power distribution from a surface of a first foreground object, which is adjacent or at least partially obscured by a second foreground object. A first image of both of the first and second foreground objects is acquired whilst the first foreground object emits electromagnetic radiation with the first spectral power distribution. A second image of the first and second foreground objects is acquired whilst the first foreground object is not emitting electromagnetic radiation or is emitting electromagnetic radiation with a second spectral power distribution which is different to the first spectral power distribution. An alpha matte of the first and second foreground objects is generated based on a comparison of the first image and second image.

WO2011033258A1 further discloses a method of generating a body model, comprising:

(i) defining at least one standard body model control point and/or standard control measurement on at least one standard body model; and (ii) generating a subject body model by defining at least one subject control point and/or subject control measurement corresponding to each standard body model control point and/or standard control measurement in a subject body model corresponding to a subject body, wherein step (ii) further comprises step (ii-1) of generating at least one subject mapping of each standard body model control point and/or standard control measurement to its corresponding subject control point and/or subject control measurement.

WO2011033258A1 further discloses a method of generating a real life body model image, comprising: defining at least one body model control point on a body model image; defining a subject control point for each body model control point in a subject image of a real life subject; generating a mapping each body model control point to its corresponding subject control point; manipulating pixels of the body model image based on the mapping so that pixels in the body model image align with pixels in the subject image, thereby generating a manipulated real life body model image.

Japanese patent application publication nos. 04037383, 11073491 and European patent application publication no. 1909493 describe conventional systems whereby a background planar object and a foreground object (of any shape), which are located at different distances from an imaging device, are discriminated from each other by illuminating the scene with different radiation frequencies. These documents describe that the foreground object must be positioned sufficiently far in front of the background so that background and foreground lighting can be treated as independent, thereby allowing the foreground portions to be distinguished from the background portions. Such systems do not permit foreground objects located near to and overlapping each other in the foreground part of the scene causing occlusion, to be readily discriminated from each other.

SUMMARY OF THE INVENTION

The invention provides computer implemented methods and systems for generating virtual body models for garment fit visualisation.

Further aspects and optional implementation features are defined in the claims. Given the large number of aspects, we briefly summarise them below to aid in understanding the breadth and scope of these aspects. Note that each aspect is both independent of any other aspects, but can also optionally be combined with any or all of the other aspects.

The computer-implemented system of the invention generates a user's virtual body model, that is useable across multiple retail websites, and in which any of those websites enable or permit the user to combine virtual garments, created from photographing physical garments, onto the virtual body model.

The system enables a user to estimate how well a garment, available on a peer-to-peer web site, will fit that user, based on a comparison between the seller's and the user's own body size measurements.

The system provides a 'direct marketing engine', automatically and without user intervention, pushing images to a customer that shows that customer's virtual body model dressed in garments (chosen by size recommendation or otherwise)

The system models clothes that do not fit—the system has ability to show on the user's virtual body model how clothes that are a size too big or too small would look The system includes a hairstyle recommendation engine, based on facial geometry analysis and matching a hairstyle from a database of hairstyles to that facial geometry The system automatically determines appropriate make-up descriptions given the specific garment or garments selected by the user and then provides an image of the virtual body model combined with one or more of the garments, plus the make-up description The system manipulates a virtual garment that is comprised of multiple layers of 2D sprites, to generate 3d photo-real virtual clothing, morphed to match the virtual body model shape The systems provides a UI for end-user's devices, in which there is an image of a user's virtual body model on a touch screen and with a (drag or flick) touch action different clothes are moved onto the virtual body model.

The system can dynamically alter height and pose of the virtual body model, depending on shoe or heel height.

The system uses a face photo to generate skin coloration and texture for the body and that skin colouration is used as a filter or criteria when the system recommends a colour for a garment, or rates the colour of a garment already selected by the user—e.g. in terms of complimenting the user's skin and/or eye colour.

The system supports 2 Screen TV—namely where a TV program features clothes, then the system automatically displays those same clothes on a 'second screen' portable device (e.g. a tablet computer) visualised on the virtual body model of the user. The user can view, interact with and buy those garments from the portable device.

The system enables social network (e.g. Facebook®) interaction and integration: the virtual body model is generated by a person interacting with a web site, and the virtual body model is accessible or useable by a different web site, namely a social networking web site.

The system provides a web browser or browser extension; the system automatically identifies garments on browsed sites and can automatically present the item on the user's virtual body model.

The system enables virtual body model sizing information to be used in search engine's search algorithms The system generates standardised garment sizing tables, scales or charts, based on virtual body model data from large numbers of users' virtual body models.

The system provides a shared, live fitting room where different users can see one or several virtual body models being dressed and dress none, one or several of the models depending on collaboration level.

The system needs only a small number of body measurements annotating a single photograph to enable the system to create an accurate 3d body model: top of the head, bottom of heels, crotch height, width of waist, width of hips, width of chest.

The system enables an icon, barcode on a garment label or advertisement, when scanned by a user's mobile computing device, to automatically cause images of the garment to be combined onto the user's virtual body model to enable that user to visualise what the garment will look like when worn by them The system uses depth stereo to improve post-processing, namely to automatically differentiate pixels in the image that correspond to a garment from pixels in the image that do not correspond to the garment and to then cut the image of the garment from the background and then use that image in generating a virtual 3D image of the garment.

The system enables a user select from one of several different recommendation channels; when a specific channel is selected, then the system automatically selects a garment which the system determines is suitable given parameters of the virtual body model and then combines an image of that garment onto the virtual body model to enable that person to visualise what the garment will look like when worn by them.

The system selects a garment for a user which the system determines is suitable, given the history or record of previous garments purchased or viewed by other users with similar virtual body models and then combines an image of that garment onto the virtual body model of the user to enable that user to visualise what the garment will look like when worn by them.

The system enables photo-realistic visualisation of a garment on a virtual body model to be created: the garment is photographed in different lighting conditions to enable the system to synthesize new lighting conditions which match those applying to the virtual body model.

The system enables the virtual body model to be accessible or useable by any type of display device (e.g. television, tablet computer, mobile telephone) that is operable to use an extensible image framework; that images of a garment can on any such display device be seen as combined onto the virtual body model, to enable a user to visualise what the garment will look like when worn by them.

The systems enables a method of manufacturing a garment, in which a user has a virtual body model of themselves, the method includes the steps of (a) the user selecting a garment from an on-screen library of virtual garments; (b) a processing system automatically generating an image of the garment combined onto the virtual body model, the garment being sized automatically to be a correct fit; (c) the processing system generating data defining how a physical version of that garment would be sized to provide that correct fit; (d) the system providing that data to a garment manufacturer to enable the manufacturer to make a garment that fits the user.

The systems generates an accurate virtual body model for a user based on the actual photograph and/or measurements supplied by the user and displaying that virtual body model on screen, together with an option that shows what the virtual body model would look like with a specific garment if the user lost/gained set amounts of weight or undertook defined levels of exercise. Thresholds set to ensure that extreme and unhealthy re-shaping was not possible.

The system includes a virtual wardrobe including clothes previously bought on-line and hence already in a user's virtual wardrobe, as well as garments not originally bought online but subsequently matched to a virtual equivalent, in order to allow the user to dress the virtual body model on any of her garments (could be to dress or combine with garments to buy).

The system can determine if a shopper is buying garments for themselves or for someone else: (a) the shopper providing a virtual body model of themselves to the system; (b) the shopper purchases garments at an on-line or retail store of a garment retailer; (c) the system matches the size of the purchased garments to the virtual body model and then determines if the purchased garments are for the shopper or not.

The system provides a method of generating a virtual body model, in which a user takes a photograph of their body which is then processed by a computer system to generate and display a virtual body, together with an approximate silhouette of the body, and the user is able to manipulate the border or edge of the silhouette to make a silhouette that more accurately matches the outline of the virtual body.

The system provides a method of generating a virtual body model, in which a user takes a photograph of their body which is then processed by a computer system to generate and display a virtual body model using, at least, the body image and the user is presented with controls that enable the shape and/or measurements of the virtual body model to be altered to more accurately match the user's real or perceived shape and/or measurements, in which the user is presented with an on-screen field or control that enables the user to provide feedback about the accuracy of the virtual body model.

BRIEF DESCRIPTION OF THE DRAWINGS

FIG. 5 shows a mobile phone may be used to scan a barcode of clothes or products in-store and the garment can be linked to the virtual fitting room.

FIG. 17 shows an example of eight views that a user can view a body model from.

FIGS. 21A and 21B illustrate ways in which two different layers (sleeve and torso), can be stretched or shrunk in order to match the body shape they are "worn" on.

FIG. 29 shows an example of the use of a photography tool in processing long sleeved garments.

FIG. 30 shows an example of a photography tool applied in processing translucent garments.

FIG. 31 shows examples of a photography tool applied in processing shoes.

FIG. 32 shows an example of a list for photography specification and related product information.

FIG. 34 shows an example of metadata for hairstyles.

FIG. 35 shows an example of metadata for hairstyles.

FIG. 38 shows an example of a matrix for garment layering.

FIG. 46 shows an example of a method of selecting garments for dressing a body model.

DETAILED DESCRIPTION

Figure 1:
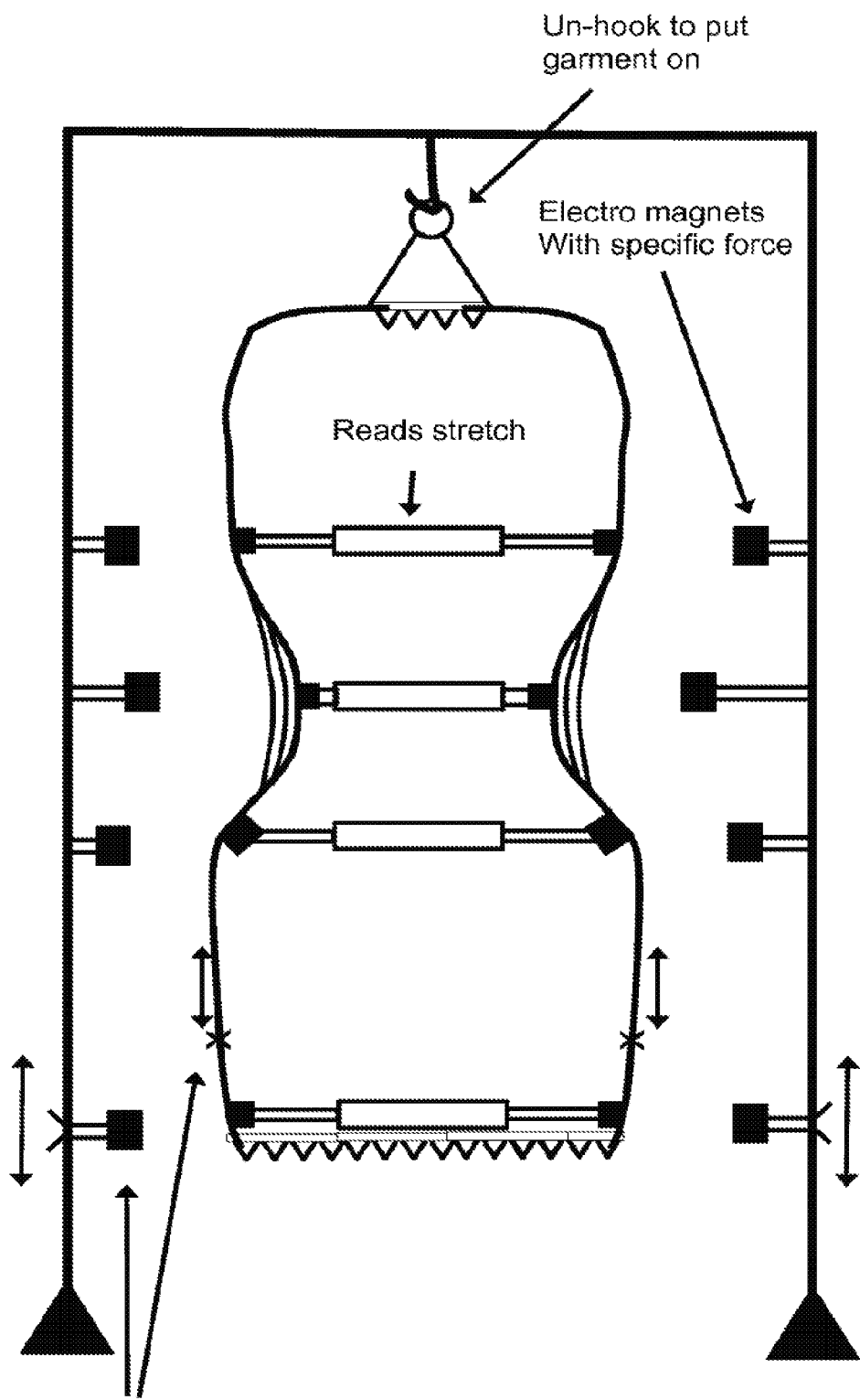
FIG. 1 shows a device for measuring a garment's elastic response.
Figure 2:
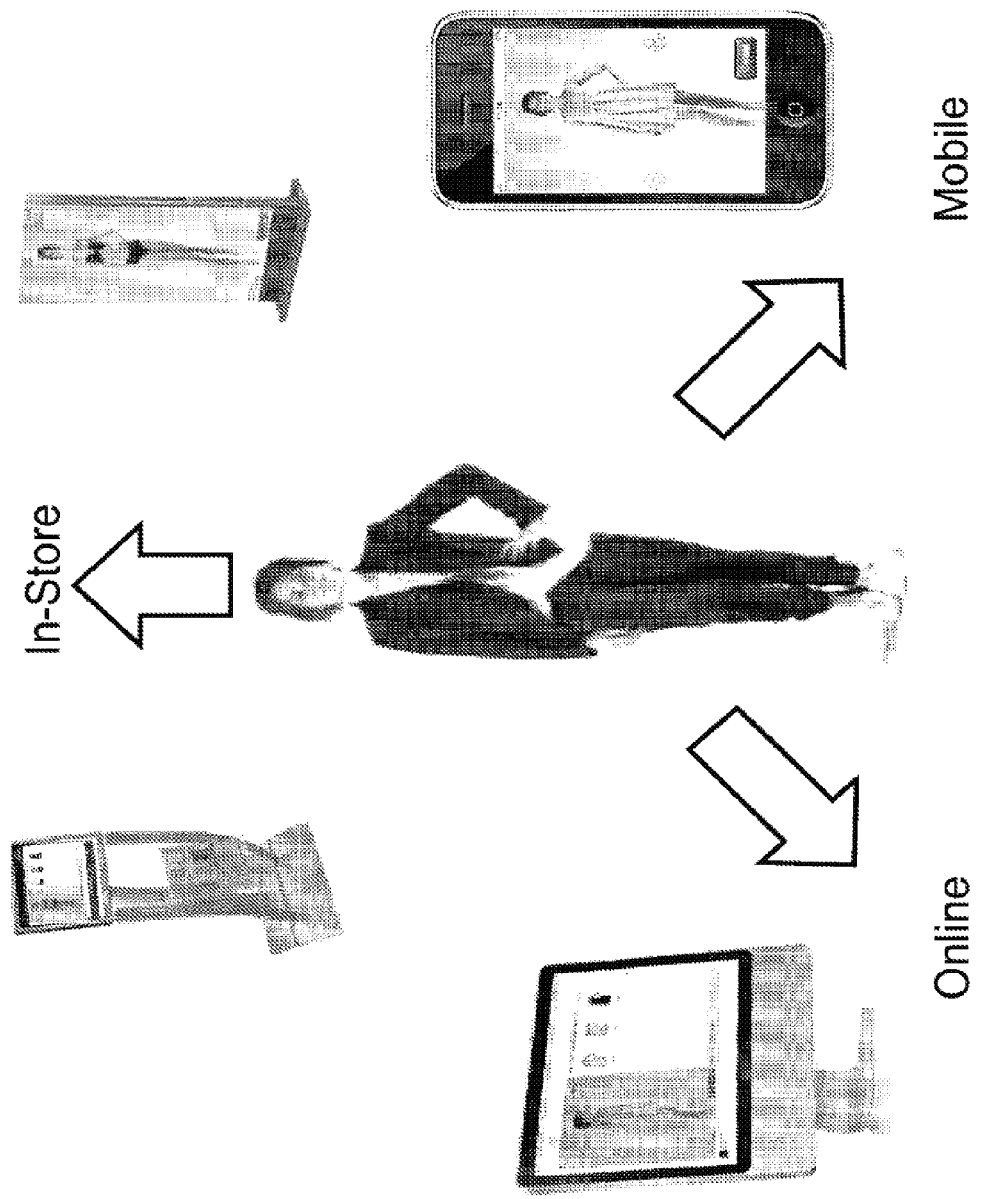
FIG. 2 shows the virtual fitting room may be used in-store, online, or on a mobile device.
Figure 3:
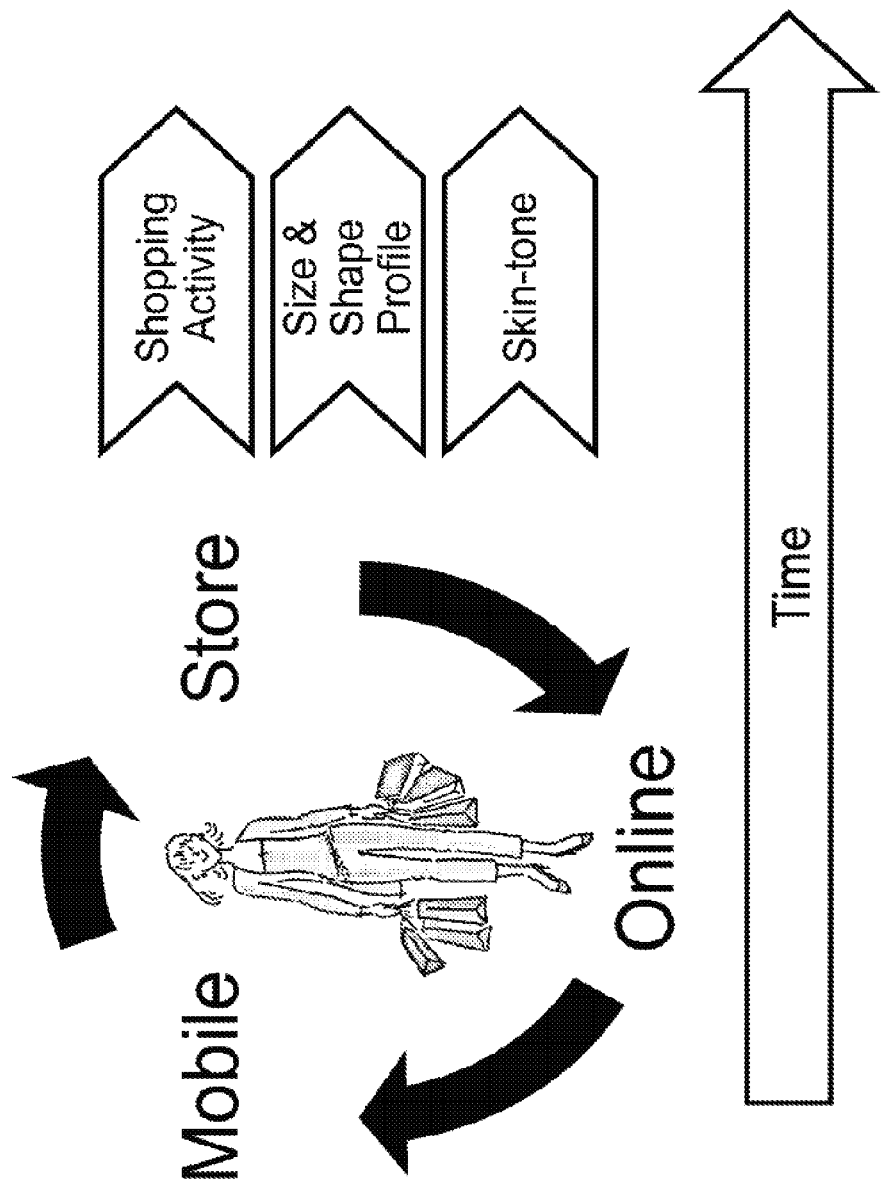
FIG. 3 shows an in-store concept flow of the Metail ecosystem.

The invention provided by Metail Ltd has multiple independent aspects and optional implementation features and each will be described in turn. The virtual body model generated by the Metail system is called a 'Me Model'.

As a preliminary overview, this Detailed Description includes the following sections which describe key features of the Metail computer implemented system that performs the various aspects and features of this invention:

Section 1: KEY FEATURES OF THE CONSUMER PRODUCT OR EXPERIENCE
Section 28: KEY FEATURES OF THE DEVELOPMENT AND/OR DEMONSTRATION FEATURES
Section 57: KEY FEATURES USED IN BACK-END PROCESSING AND PHOTOGRAPHY
Section 79: KEY FEATURES OF SOCIAL MEDIA INTEGRATION
Section 109: KEY FEATURES OF THE VIRTUAL BODY MODEL
Section 116: KEY FEATURES OF THE APPLICATION PROGRAMMING INTERFACE AND MOBILE ASPECTS
Section 121: KEY FEATURES OF DATA SERVICES
Section 126: KEY FEATURES OF GARMENT MORPHING STRATEGIES
Section 129: KEY FEATURES OF HEAD MODELLING
Section 133: SERVER INFRASTRUCTURE
Section 150: VARIOUS MISCELLANEOUS IMPLEMENTATION FEATURES The complete list of section headings is as follows:
Section 1. KEY FEATURES OF THE CONSUMER PRODUCT OR EXPERIENCE
Section 2. The overall ecosystem
Section 3. User Experience Example
Section 4. Creating a head from an uploaded photo
Section 5. Selecting the hairstyle
Section 6. Creating the virtual body model
Section 7. Creating the virtual body model from an uploaded photo
Section 8. Creating the body model without uploading a photo
Section 9. The virtual fitting room
Section 10. Different views of a garment
Section 11. The garment overview in the virtual fitting room
Section 12. The first time the user is presented with their virtual body model
Section 13. Show nudity level of the body model
Section 14. Entering values on sliding scale updates the body model live
Section 15. Automatically adapting the virtual body model to different heel heights
Section 16. Automatically adjusting hem length and body model height
Section 17. Changing hairstyle on the virtual body model
Section 18. Using different backgrounds for the virtual body model
Section 19. Lighting effects on the virtual body model
Section 20. Automatic effects depending on garments
Section 21. Photo effects applied to the garment on a virtual body model
Section 22. Connecting with other sites
Section 23. The user's wardrobe
Section 24. Level of body model completion
Section 25. Randomized outfits
Section 26. Informed randomized outfits
Section 27. User satisfaction survey
Section 28. KEY FEATURES OF THE DEVELOPMENT AND/OR DEMONSTRATION FEATURES
Section 29. Recommendation features
Section 30. 'Cover Flow' type UX for garments
Section 31. Automatic suggestion of outfit
Section 32. Virtual fitting room
Section 33. Cross promotion of goods
Section 34. Body size matching and indexing for improved peer to peer clothing purchasing
Section 35. Using information about linked garments
Section 36. In-store concepts
Section 37. Personalized fashion tips based on your body size
Section 38. Style Radio
Section 39. Maternity clothing feature
Section 40. Compare two body models with different outfits
Section 41. Direct marketing including a picture of your body model in selected clothes
Section 42. Real avatar
Section 43. Bespoke tailoring on body model
Section 44. Aspirational modelling
Section 45. Hairstyle recommendation engine
Section 46. Try out different makeup
Section 47. Beauty recommendations
Section 48. Beauty recommendation engine
Section 49. Facial hair
Section 50. Glasses
Section 51. Tattoo
Section 52. Two screen TV
Section 53. Styling room for publishers
Section 54. Ageing body model
Section 55. Give the body model a tan
Section 56. Testing of new looks for future collections
Section 57. KEY FEATURES USED IN BACK-END PROCESSING AND PHOTOGRAPHY
Section 58. Back end processing
Section 59. The 2.5D solution
Section 60. Metail digitization process
Section 61. Multi layer garments
Section 62. Deforming mannequin
Section 63. Digitization
Section 64. Garment positioning
Section 65. Change the model size and see the garment fit
Section 66. Body model
Section 67. How to turn weight and height or other input data into a shape for the body model
Section 68. Garment size and stretch
Section 69. Garment sizing table
Section 70. Providing retailers with specific size recommendation tables
Section 71. Adapting garment modelling to match with the user's body model
Section 72. Shadows
Section 73. Photography Process and Tool Example
Section 74. Mannequin adaptation
Section 75. Garment segmentation and alternative methods
Section 76. Garment translucency
Section 77. How Metail uses metadata for hairstyles Section 78. How the virtual fitting room use metadata for hairstyles
Section 79. KEY FEATURES OF SOCIAL MEDIA INTEGRATION
Section 80. Social interaction
Section 81. Social needs
Section 82. Purely social
Section 83. Exhibition
Section 84. Recommendations
Section 85. Discovery
Section 86. Online social interaction
Section 87. User profile
Section 88. Social interaction features
Section 89. Sharing the private wardrobe
Section 90. Circle of friends
Section 91. Get live feedback on look from friends
Section 92. Fashion Panel AKA style counsel
Section 93. Shared live fitting room
Section 94. Instant chat through Facebook (FB) chat
Section 95. Invite friends to shop with reminder
Section 96. See which Facebook friends are using the virtual fitting room
Section 97. Become a stylist and be rated by peers
Section 98. Stylist recommended according to style data
Section 99. Try that look on me
Section 100. Follow friends/celeb looks
Section 101. Like and dislike stylist recommendations to find best stylist for you
Section 102. Look recommendations connected to a specific event
Section 103. Different social platforms to share via
Section 104. Email
Section 105. Share alternative looks
Section 106. Share the outfit
Section 107. Sociability
Section 108. Share your model
Section 109. KEY FEATURES OF THE VIRTUAL BODY MODEL
Section 110. Aiding body shape prediction through specific features (pregnant etc.)
Section 111. Improved body modelling using aggregated customer data
Section 112. Modelling clothes that do not fit
Section 113. Creating the face
Section 114. Skin textures and use of face photo to generate skin coloration for a body
Section 115. Male vs. female model
Section 116. KEY FEATURES OF THE APPLICATION PROGRAMMING INTERFACE AND MOBILE ASPECTS
Section 117. Mobile
Section 118. Application Programming Interface (API)
Section 119. Automatic detection of garments and method and system to try the garments on the body model
Section 120. The similarity system
Section 121. KEY FEATURES OF DATA SERVICES
Section 122. Uses for the data that is gathered
Section 123. Market research
Section 124. Size and shape demographic
Section 125. Online Search
Section 126. KEY FEATURES OF GARMENT MORPHING STRATEGIES
Section 127. Photographing a deforming mannequin to capture shape variations
Section 128. Garment size and stretch
Section 129. KEY FEATURES OF HEAD MODELLING
Section 130. Attaching the face to the head model
Section 131. Hair as a layered garment
Section 132. Hands as a layered garment
Section 133. SERVER INFRASTRUCTURE
Section 134. Image/Me model rendering on the back server
Section 135. Visualization Subsystem (VS)
Section 136. Adding more nodes
Section 137. Caching strategies
Section 138. Two-part request affinity
Section 139. Per-avatar session affinity
Section 140. Client-side image caching
Section 141. Garment data
Section 142. Sharding
Section 143. Distributed database (DB)
Section 144. Hardware
Section 145. Web tier
Section 146. Improved DB performance
Section 147. Optimize and Distribute performance critical code
Section 148. Offload SSL decryption
Section 149. Spare capacity/Node provisioning
Section 150. VARIOUS MISCELLANEOUS IMPLEMENTATION FEATURES Section 1: Key Features of the Consumer Product or Experience There is provided a method of generating a virtual body model, in which a user takes, or has taken for them, an image of their body which is then processed by a computer system to generate and display a virtual body, together with an approximate silhouette of the body, and the user is able to manipulate the border or edge of the silhouette to make a silhouette that more accurately matches the outline of the virtual body.

The method may be one in which the silhouette is displayed as being over-laid over the image of the virtual body. The method may be one in which the silhouette is generated using image-processing techniques applied to a 2D photographic image of the user's body. The method may be one in which the user's body is imaged using a depth sensor that includes an infrared laser projector combined with a sensor which captures video or still data in 3D.

There is also provided a method of generating a virtual body model, in which a user takes, or has taken for them, an image of their body which is then processed by a computer system to generate and display a virtual body model using, at least, the body image and the user is presented with controls that enable the shape and/or measurements of the virtual body model to be altered to more accurately match the user's real or perceived shape and/or measurements, in which the user is presented with an on-screen field or control that enables the user to provide feedback about the accuracy of the virtual body model.

The method may be one in which the user is presented with on-screen controls that allow the user to directly manipulate the shape of the virtual body model.

There is also provided a method for enabling garments to be visualised on a virtual body model of a user, in which (a) a display device shows an image of a garment, of a size selected by the user, combined onto the virtual body model to enable the user to visualise what the garment will look like when worn by them and (b) the display device also provides an icon, button, function, sliding scale or other control that, if selected by the user, causes the virtual body model to be altered to show what it would look like with that specific garment if the user lost/gained set amounts of weight defined on a user controllable scale.

The method may be one in which the display device also provides an icon, button, function, sliding scale or other control that, if selected by the user, causes the virtual body model to be altered to show what it would look like with that specific garment if the user altered their body shape through levels of exercise defined on a user controllable scale. The method may be one in which thresholds ensure that extreme and un-healthy re-shaping is not possible. The method may be one in which the control is voice activated using a speech recognition system.

There is also provided a method of generating a virtual body model of a user, including the legs and feet of the user, in which the user can select a pair of shoes or boots for their virtual body model from a selection of footwear shown on-line, and a computer-implemented process retrieves the heel height for the selected footwear and automatically adjusts the height of the heel of the virtual body model depending on the retrieved heel height.

The method may be one in which the virtual body model allows the virtual foot to pivot about its virtual ankle and the heel height of the virtual body model above a virtual floor is adjusted by pivoting the virtual foot about the virtual ankle to give a desired height. The method may be one in which raising the heel of the virtual body model automatically alters the posture of the virtual body model. The method may be one in which the posture of the virtual body model is altered when the heel is raised by tilting the virtual pelvis forward. The method may be one in which the user can choose for the virtual body model to be bare foot. The method may be one in which the bottom of a garment in relation to a virtual floor is raised as the virtual heel height is raised, but the position of the bottom of the garment in relation to the user's legs is not altered.

There is provided a method of generating photo-realistic images of a garment combined onto a virtual body model, in which a physical garment is photographed in different lighting conditions and digital images for the garment in each of those different lighting conditions is stored on a database; and a computer-based image processing system generates an image of the garment combined onto the virtual body model by selecting from the database, or permitting the selection from the database, of garment images lit in lighting conditions similar to the lighting conditions applying to the virtual body model and/or a background for the virtual body model.

The method may be one in which the virtual body model includes an image of a user's face, obtained from a digital photograph provided by the user. The method may be one in which the lighting conditions include one or more of: main direction of the lighting; colour balance of the lighting; colour temperature of the lighting; diffusiveness of the lighting. The method may be one in which the type of garment determines simulated weather conditions, such as rain, sunshine, snow, which are then applied to the image of the garment when combined with the virtual body model. The method may be one in which a user can manually select images from the database by operating a control that mimics the effect of changing the lighting conditions in which a garment was photographed. The method may be one in which the image processing system can automatically detect parameters of the lighting conditions applying to the digital face photograph supplied by the user can select matching garment images from the database.

There is also provided a method for generating and sharing a virtual body model of a person combined with an image of a garment, in which the virtual body model is generated by analysing and processing one or more photographs of a user, and a garment image is generated by analysing and processing one or more photographs of the garment; and in which the virtual body model is accessible or use-able by multiple different applications or multiple different web sites, such that images of the garment can, using any of these different applications or web sites, be seen as combined onto the virtual body model to enable visualization of what the garment will look like when worn.

There is also provided a method for generating and sharing a virtual body model of a person combined with an image of a garment, in which the virtual body model is generated by analysing and processing one or more photographs of a user, and a garment image is generated by analysing and processing one or more photographs of the garment and that garment image is shown in a virtual fitting room, and in which the virtual fitting room is accessible or useable by multiple different applications or multiple different web sites, such that images of the garment can, using any of these different applications or web sites, be seen as combined onto the virtual body model to enable visualization of what the garment will look like when worn.

The method may be one in which one or more of the different applications or web sites each displays, in association with the image of the garment, a single icon or button which, when selected, automatically causes one or more images of the garment to be combined onto the virtual body model to enable a person to visualize what the garment will look like when worn by them. The method may be one in which the combined image is a 3D photo-real image which the user can rotate and/or zoom. The method may be one in which one of the different web sites is a garment retail web site and the garment is available for purchase from that web site. The method may be one in which one of the different web sites is a fashion related web site associated with a print publication. The method may be one in which the image of the garment is generated by photographing in 2D an actual garment from a number of viewpoints, on a mannequin of known size and shape. The method may be one in which the garment is photographed from between 5 and 12 different viewpoints around the garment and the resulting photographs are analysed and processed to generate a 3D photo-real image of the garment that can be viewed from 360 degrees. The method may be one in which the image of a garment is a 3D photo-real image of the garment. The method may be one in which, for a given garment, only a single size of that garment is photographed and the appearance of other sizes is calculated by extrapolating from that single size. The method may be one in which the process of extrapolating is based on measuring other sizes of that garment, or different garments, from the same manufacturer of that garment. The method may be one in which it is possible to show/share a virtual body model to another user so that other user can select and buy clothes to fit the user, whilst concealing actual measurements from that other user.

There is provided a method of visualising garments on a virtual body model of a user, comprising the steps of (a) storing digital images of multiple garments available for purchase; (b) storing a virtual body model of a user that enables the user to visualise what those garments would look like on their virtual body model; (c) providing a virtual wardrobe or garment storage environment which stores images of all garments purchased by the user after they have been shown when combined with the user's virtual body model; (d) including in the virtual wardrobe or garment storage environment images of other garments, purchased or selected by the user without having been combined with the user's virtual body model.

The method may be one in which the other garments, purchased or selected by the user without having been combined with the user's virtual body model, are manually selected by the user viewing images of garments in a digital catalogue or collection of garment images. The method may be one in which the virtual wardrobe or garment storage environment stores also images of outfits, comprising several garments. The method may be one in which the other garments, purchased or selected by the user without having been combined with the user's virtual body model, can be purchased by the user selecting an icon or function that is displayed together with the other garments.

In this document, a "body model" is a visualisation of a user's body shape, an "outfit" is a set of clothes (an "outfit" can for example consist of one or several garments and accessories), a "look" is the body model dressed in an outfit (a "look" can for instance be shared including the background and effects applied to that look), and the "virtual fitting room" system as described in this document is in one example implemented by the company Metail Ltd. Reference to the gender of a user is to be understood to apply to both genders of user, except where the context implies otherwise.

Section 2: The Overall Ecosystem

The Metail online fitting room can be described as providing the user with a body model created to represent her body shape and allowing the user to dress the body model in different garments to model the size and fit of the garments. The user can also receive recommendations of fashion and on size of specific garments.

The user's body model can be used across many platforms and be interacted with through partner sites where the user can dress the body model in for instance a specific retailer's garments.

Figure 12:
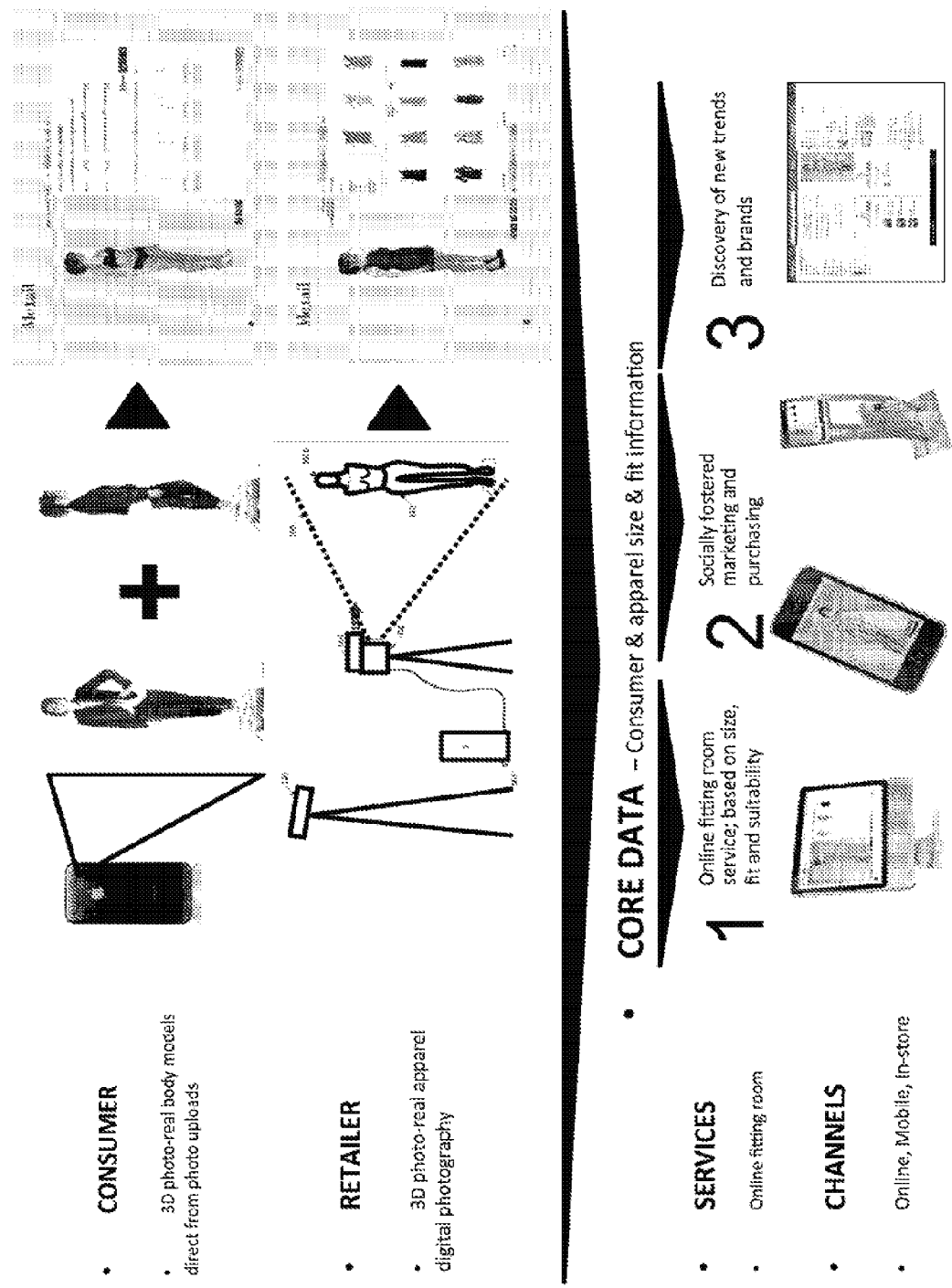
FIG. 12 shows how the consumer and retailer may be linked to core data services and channels.
Figure 13:
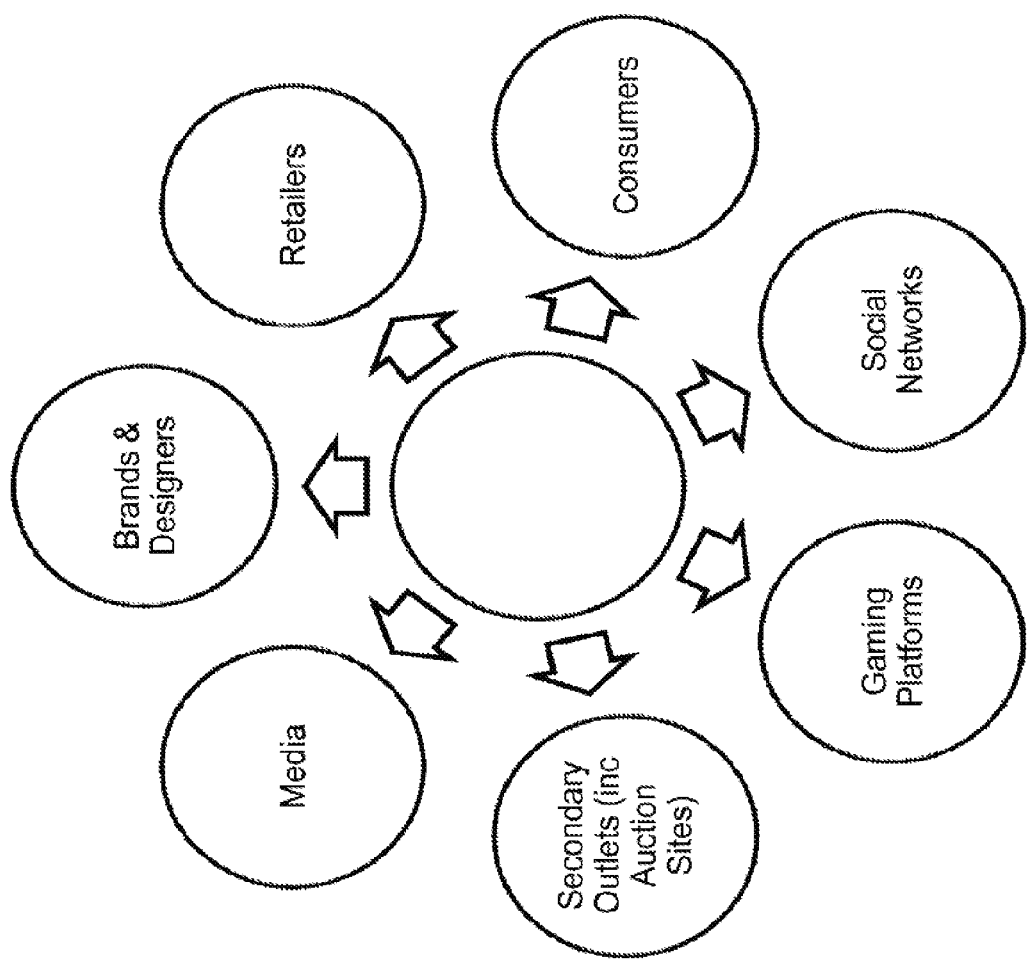
FIG. 13 shows an overview of possible partner channels.
Figure 14:
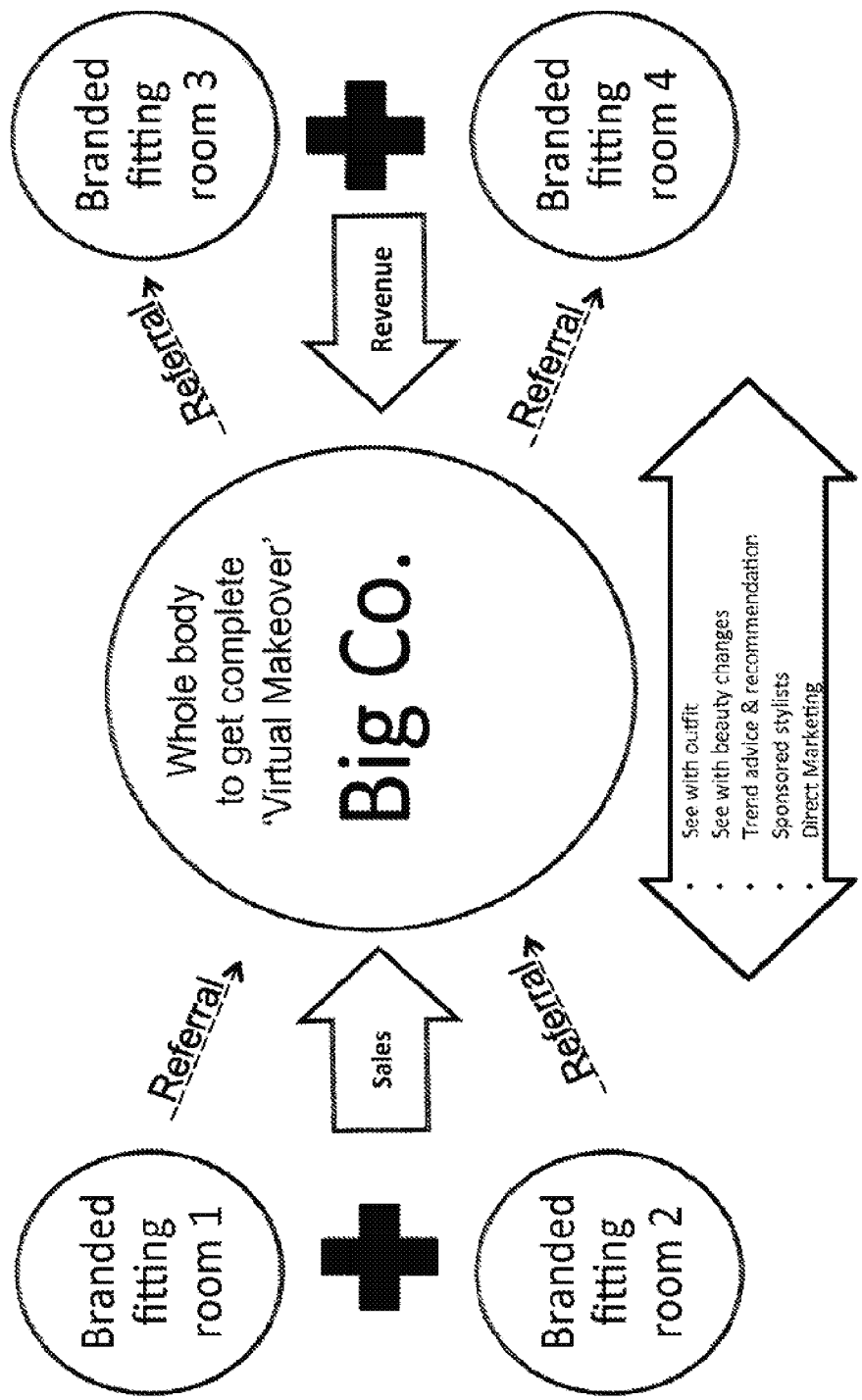
FIG. 14 shows possible connections between branded fitting rooms and a Big Co. which can provide a "virtual makeover".
Figure 15:
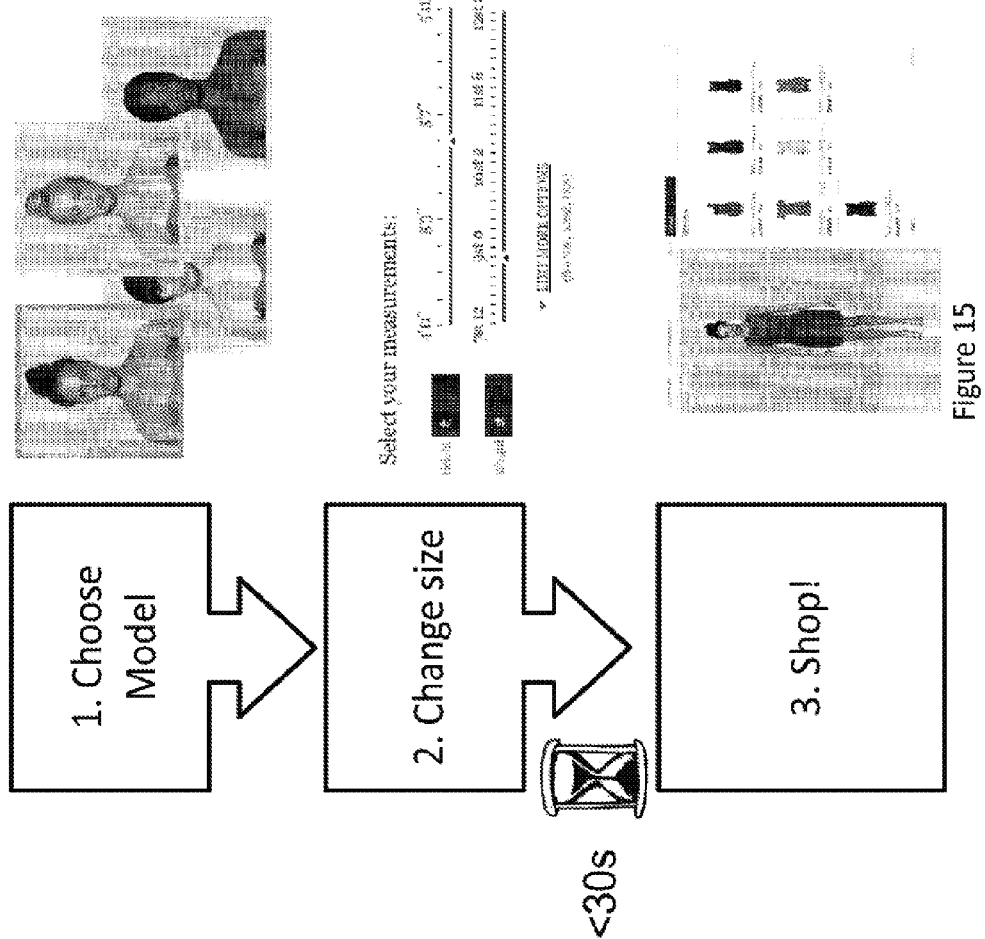
FIG. 15 shows a simplified example of a user journey.

As an illustration FIG. 12 shows an example of applications of the technology. FIG. 15 shows examples of partner channels. FIG. 14 shows examples of interaction points with other brands.

The virtual fitting room is enabling the overall process of obtaining a model of the user's body as a means of visualizing fit and this information can be used for instance in facilitating online marketing.

Section 3: User Experience Example

Figure 23:
FIG. 23 shows an example of a start page for a user, including an option which is provided for the user to start the process of creating a body model.

FIG. 23 shows an example of a start page for the user. There is an option for the user to start the process of creating a body model.

In an alternative example, a start page is provided in which the user has the option to log on to the virtual fitting room or register as a new user. The user can select to login using e.g. their Facebook account and the virtual fitting room account will then be verified via Facebook. The platform supports connections with other platforms as well.

In an alternative example the user is prompted to log in to the virtual fitting room using a third party login such as the Facebook login. This step allows the user to log in and pair the virtual fitting room account with for instance a Facebook account irrespective of if the user previously had logged in to the virtual fitting room. Should the user already have a virtual fitting room account associated with that Facebook account the user is notified about that. The user can select to create a new body model or use the already stored one. In one example the user's previous model is automatically presented to the user at login.

If the user already has created a body model and at a later stage would like to connect that body model to a Facebook account, but the Facebook account already has a body model associated with it, the user will be notified about that. The user is prompted to select which of the body models should be associated with the Facebook account.

As a new user the idea is that you just get started. You can then register and save the body model for later retrieval. The system also allows the user to create a body model without saving it. The user can create the body model and also try garments on the model without registering. To retrieve the model for the next time they use the service, the user needs to register. The model is then saved and associated with that particular user account.

The user can further select to start the process of creating the body model through clicking on "Get Started" (e.g. in FIG. 23).

In one example the user is prompted with a message when they navigate away from the virtual fitting room to another website asking if they would like to register before leaving to be able to retrieve their body model at a later time. The user then is given the option to register or log in to associate their current body model with a user account.

When the user selects to get started with the process of creating a body model the user can select two different options on how much personalisation she would like of the body model. One option is to upload a photo of the user's face and the other option is to use a sample photograph. The step of using a sample photograph can either give the user the option to choose from a set of stored sample photographs or automatically select a photograph for the user.

One alternative is to provide the user with the option to upload a picture of their head or to skip this step. If the user selects to skip this step a head is chosen from a set of sample heads. On this page the user is also presented with guidance about the photo they can upload to give the best experience.

The photo will be used to create the face features on the head of the body model. For example the face will also provide an indication of the skin tone of the user.

In an example the user is presented with a set of alternative face photos to chose from in a selection page. The user can then select one of several sample photographs and the user can also see a standard body model, which they can rotate in to different views.

Section 4: Creating a Head from an Uploaded Photo

If the user selects to upload a picture of their face, the system initiates a process for upload of a file to the server. The user is presented with a popup where she selects the file to upload.

The user is presented with an option to rotate the picture if it is in the wrong orientation. In one example the picture is enlarged to facilitate the post processing so the user is more likely to select points accurately.

The user is then presented with a page where she is asked to annotate the photograph with specific points. This is to aid the process of combining the head and the face in the image. The annotation markers can in different examples have different colours, shapes and be of different sizes.

An example of the steps of post processing is now discussed. In one example the process consists of the user making annotations for the nose, the chin, the ear-lobes, the eyes, the mouth and the jaw. The system is in one example using the placement of the first point as an estimate for where the rest of the annotation points should be presented to the user. The system may use machine learning to make more accurate suggested placements of the annotation markers. This makes the post processing easier for the user.

The system can in one example derive from the whole or a subset of the user base's previous placements of the different points where the first annotation mark (here exemplified with the nose) is most likely to be.

The user can click and drag a marker, for example a cross, to the correct position representing in the first step the nose.

The user is presented with instructions and an exemplary image to make the process easier.

When the user has selected the point for the first annotation, in this case the nose, she can select to go to the next annotation input screen. The user is then instructed to place the cross on the chin. The next step of the post processing is to mark the points for the earlobes. The user then drags and drops the two crosses to positions representing the earlobes. The next step in the post processing is to mark the eyes. The user is presented with four crosses, which are to be placed on each side of each eye. The next step of the post processing is to mark the end points of the mouth. The user is presented with two crosses, which are to be placed on each side of the mouth. The last annotation step is to mark out the jaw. The user places the two crosses on the jawline at two points approximately halfway between the chin and the mouth. It is to be understood that in a different example the annotation steps can be presented to the user in a different order.

Figure 36:
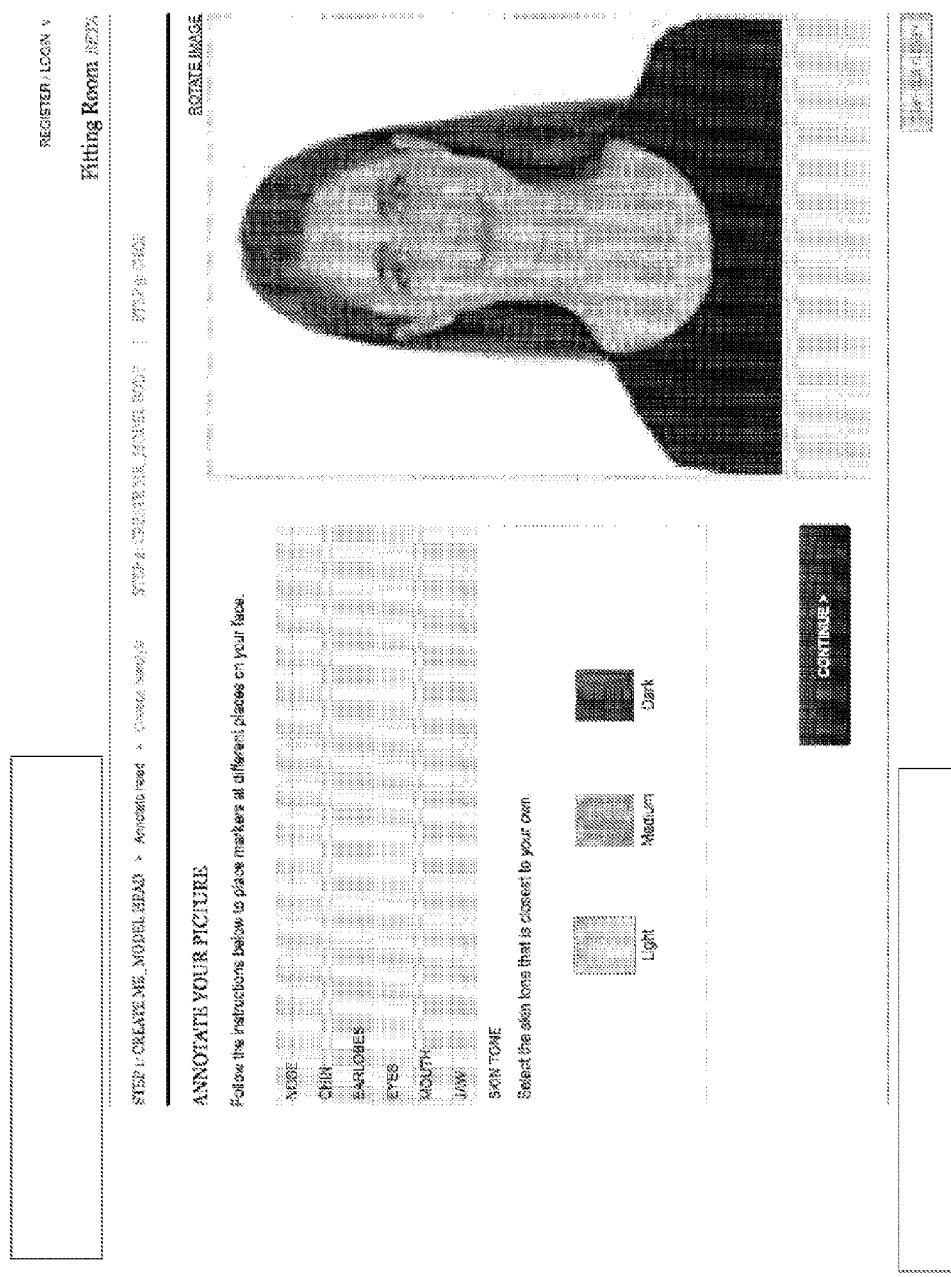
FIG. 36 shows an example in which a set of different skin tones is presented and the user is asked to select the skin tone that is closest to user skin tone in the photo.

The user is then, as shown for example in FIG. 36, presented with a set of different skin tones and is asked to select the skin tone that she thinks is closest to her skin tone in the photo.

The skin tone selection will filter what hairstyles the user will be able to chose from in the next step. The process of creating the head from the photo and a hairstyle is described elsewhere in this document.

In an alternative example the skin tone is automatically detected from one or several points in the uploaded photo. The relevant hairstyles, i.e. hairstyles that fit the user's skin colour, are provided for selection by the user. Points are identified and used to match the skin colour with the hairline.

See also Section 112 and 128.

Section 5: Selecting the Hairstyle

Figure 37:
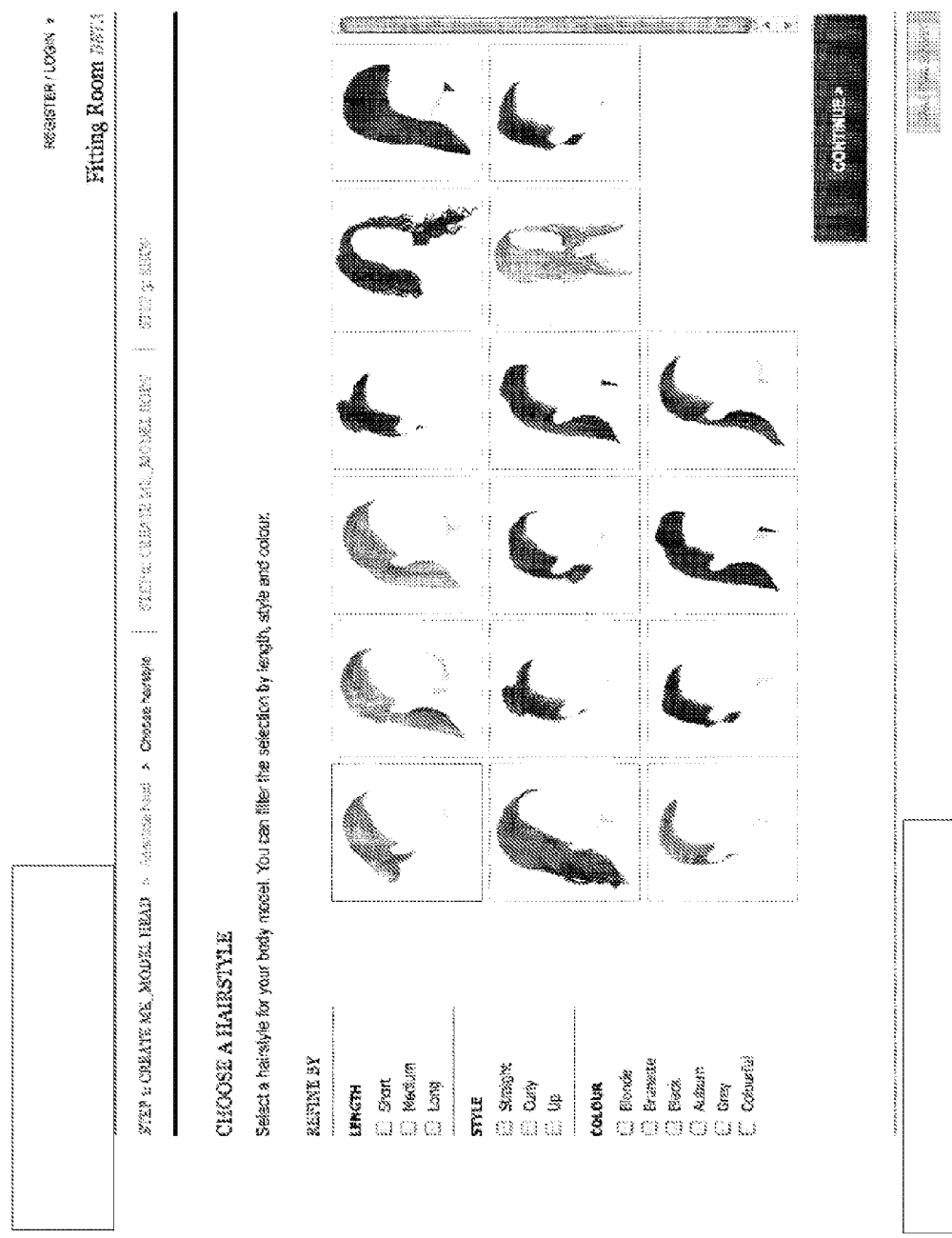
FIG. 37 shows an example of a way of presenting different options for hairstyles, from which users may choose.

The next step in creating the body model's head is to choose a hairstyle for the model. The user is presented with different options for applicable hairstyles. A possible way of presenting the hairstyles is shown in FIG. 37. The user can filter the different hairstyles based on different options. In the example shown in FIG. 37, the keywords are presented to the left.

The hairstyles shown are presented in one view and an alternative view is presented when hovering over the hairstyle image. The alternative view could be from a different angle or for instance the hairstyle shown from a 180 degrees changed view (ie from the opposite direction).

Figure 17:
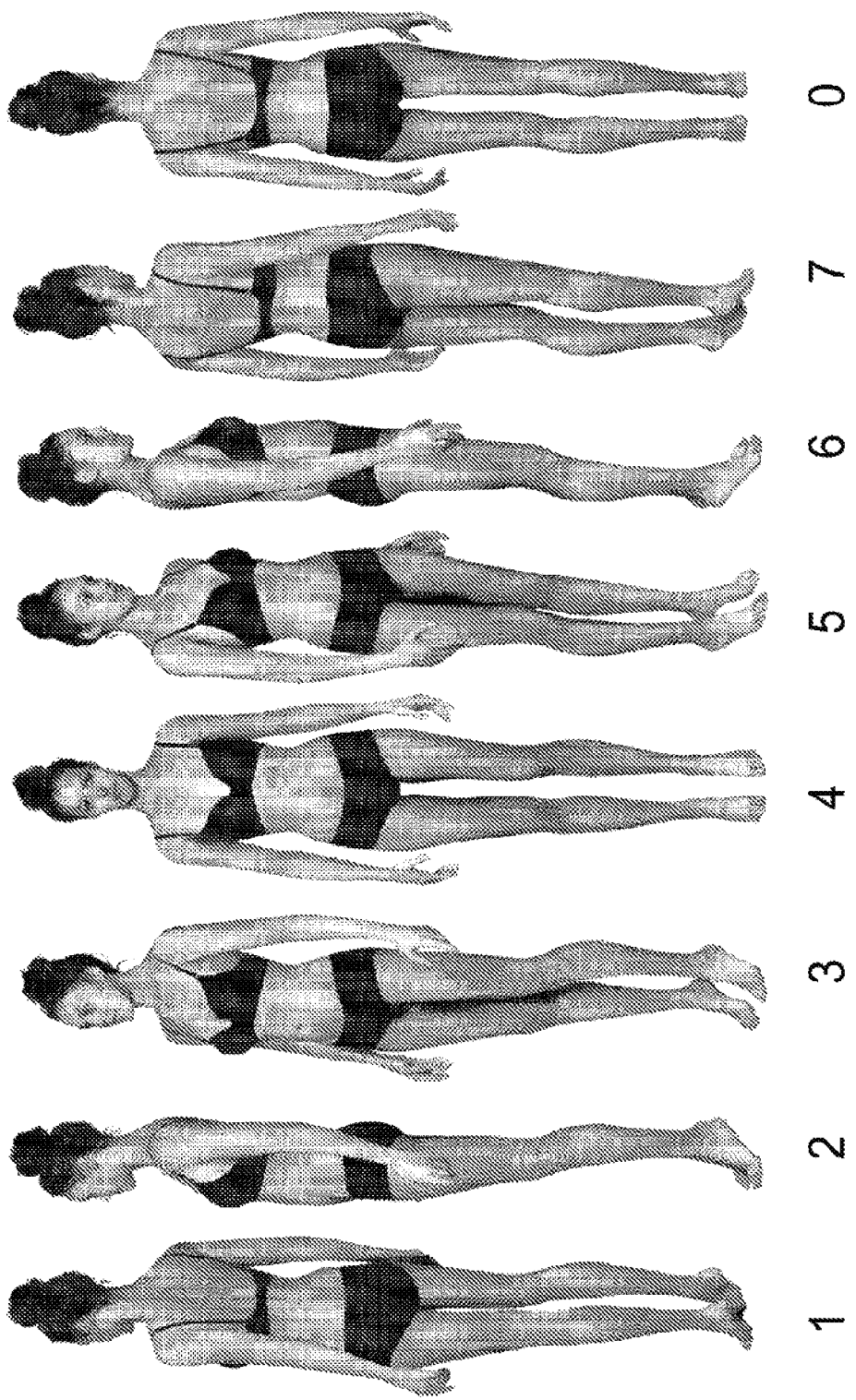
Figure 18:
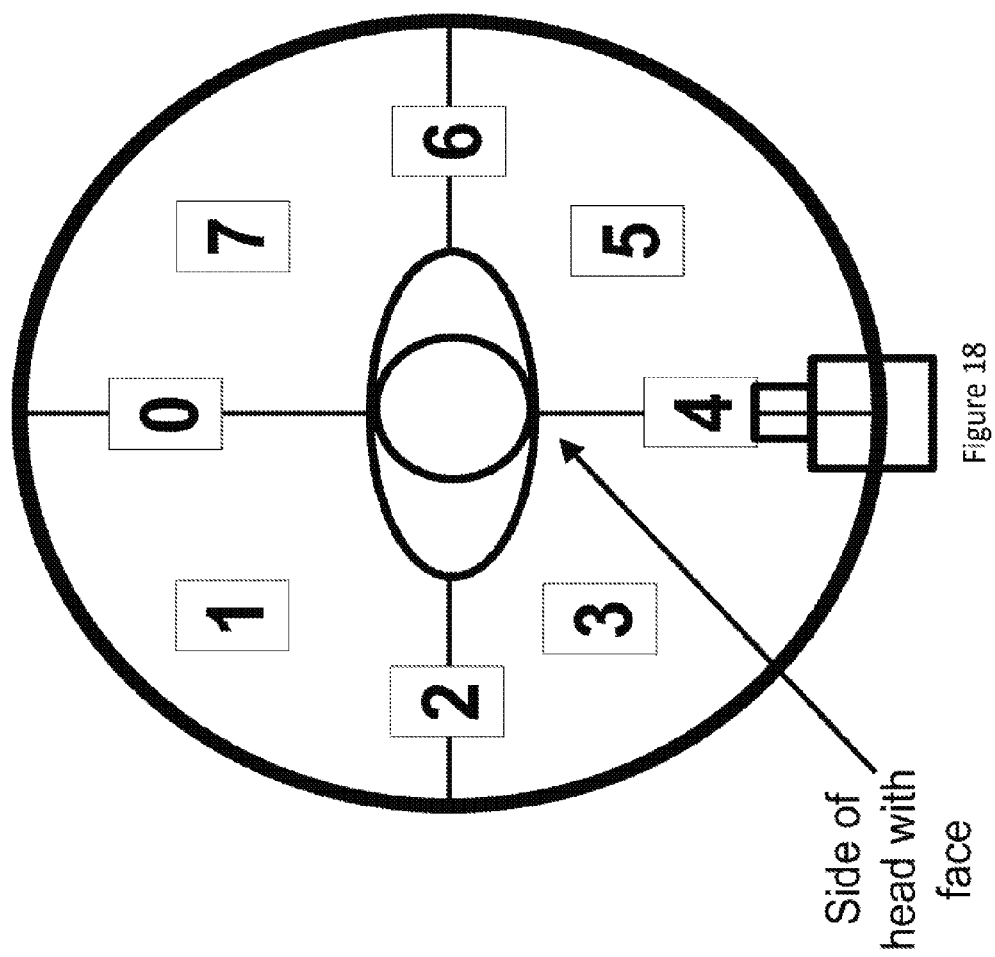
FIG. 18 shows eight photo positions which correspond to FIG. 17.

FIG. 18 shows a number system for classifying view direction. In one example the standard view is view 3 and the alternative view is view 7. The different views are also shown in FIG. 17.

When the user has selected the hairstyle to be used, the head is created in the background on the server and will be viewable by the user when it is ready. The user is prompted that the head is being created and that she will be notified when it is ready.

Section 6: Creating the Virtual Body Model

The next step is that the user is given options (e.g. two) on how to create the body model. One option is for the user to enter measurements of her body and then the body model will be created from those measurements. An alternative option is that the user uploads a photo and annotates that photo and also provides the height and weight. The system will then create a body model representing the user.

See also Section 65.

Section 7: Creating the Virtual Body Model from an Uploaded Photo

The user is asked to upload a photo of herself in a doorway. The doorway is used to set the perspective of the photo. The user is then presented with four corners connected with lines overlaid on the picture of herself in the doorway. The user is requested to mark out the corners of the doorway she is standing against with the four points. This will give the system input to adjust for the perspective of the photo. The photo is then adjusted by the system to account for the perspective view.

The user is then taken through the post processing where the picture is overlaid with lines which are to be adjusted according to instructions. The annotations provide input in to the process of creating the body model.

The first adjustment is to mark out the height of the user in the picture. This is done by the user moving one of two horizontal lines to meet the top of the head of the person in the picture and a second line to meet the heels of the person in the picture. The next annotation is to mark the top of the inside of the leg. The user adjusts a horizontal line vertically to the correct position.

The user is then taken through three horizontal measurements where she is to adjust the end points of a horizontal line to the contour of the body in the photograph. The points of measurement are fixed in the vertical plane and the user can only adjust the end points on the horizontal plane. Three measured points represent the measurements for the waist, the hips, and the chest.

The placement of the horizontal measurement lines is calculated as a percentage of the torso length. The input to this are the height end points provided by the user in a previous step and the point of the top of the inner leg. The lines are then placed at certain percentage points of the torso length. The three measured points give input for the body model creation in that they provide an indication about the user's body shape.

Figure 25:
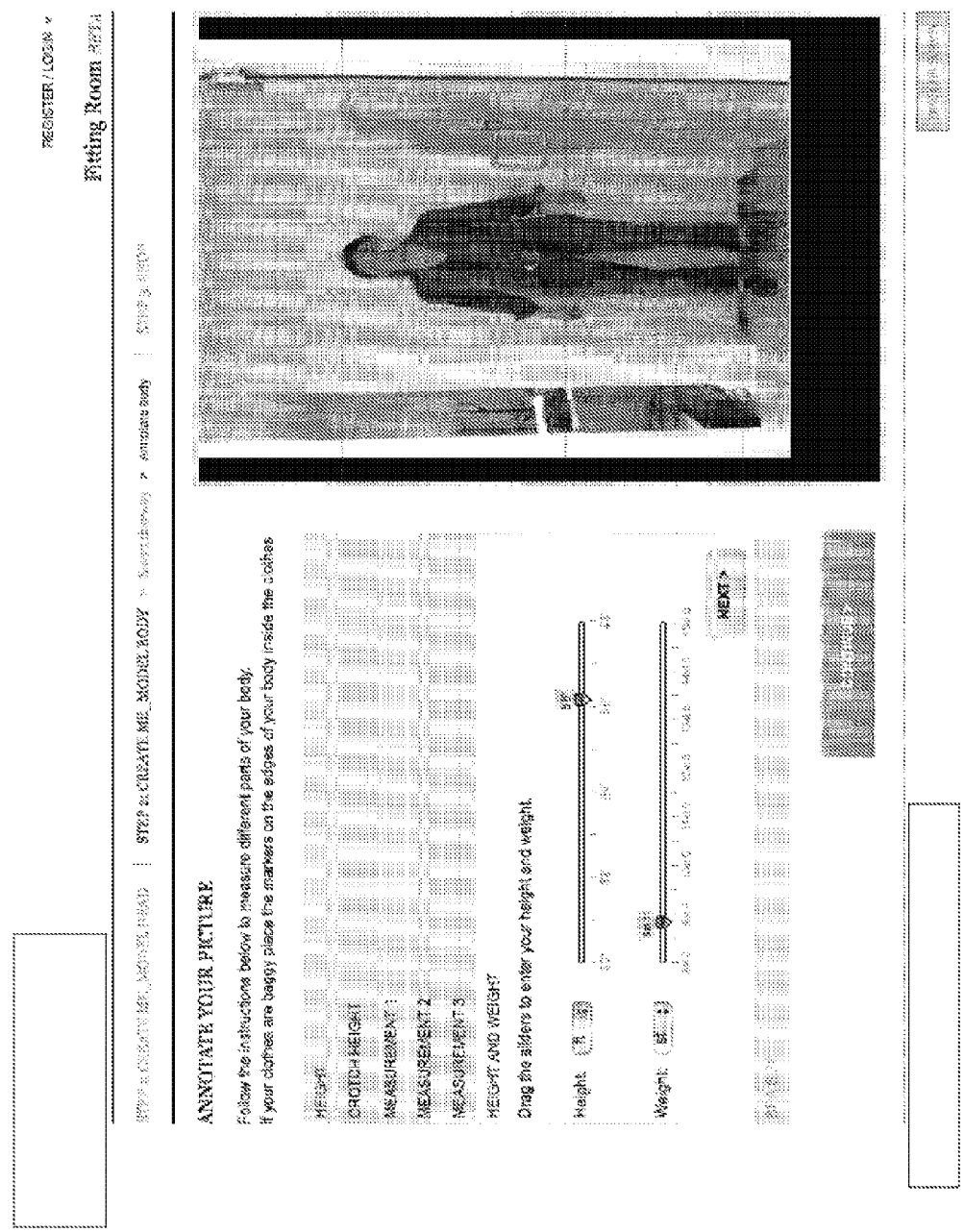
FIG. 25 shows an example of post processing after the upload of a photo, in which the picture is overlaid with lines which are to be adjusted by the user according to instructions.

The next step is where the user enters her height and weight, for example as shown in FIG. 25. These are measurements the user generally knows and can enter without needing to find a scales or a measuring tape. The user can select the unit and slide the handle on the bar to the correct position. In another example the user enters the value in numbers into an input field.

Figure 26:
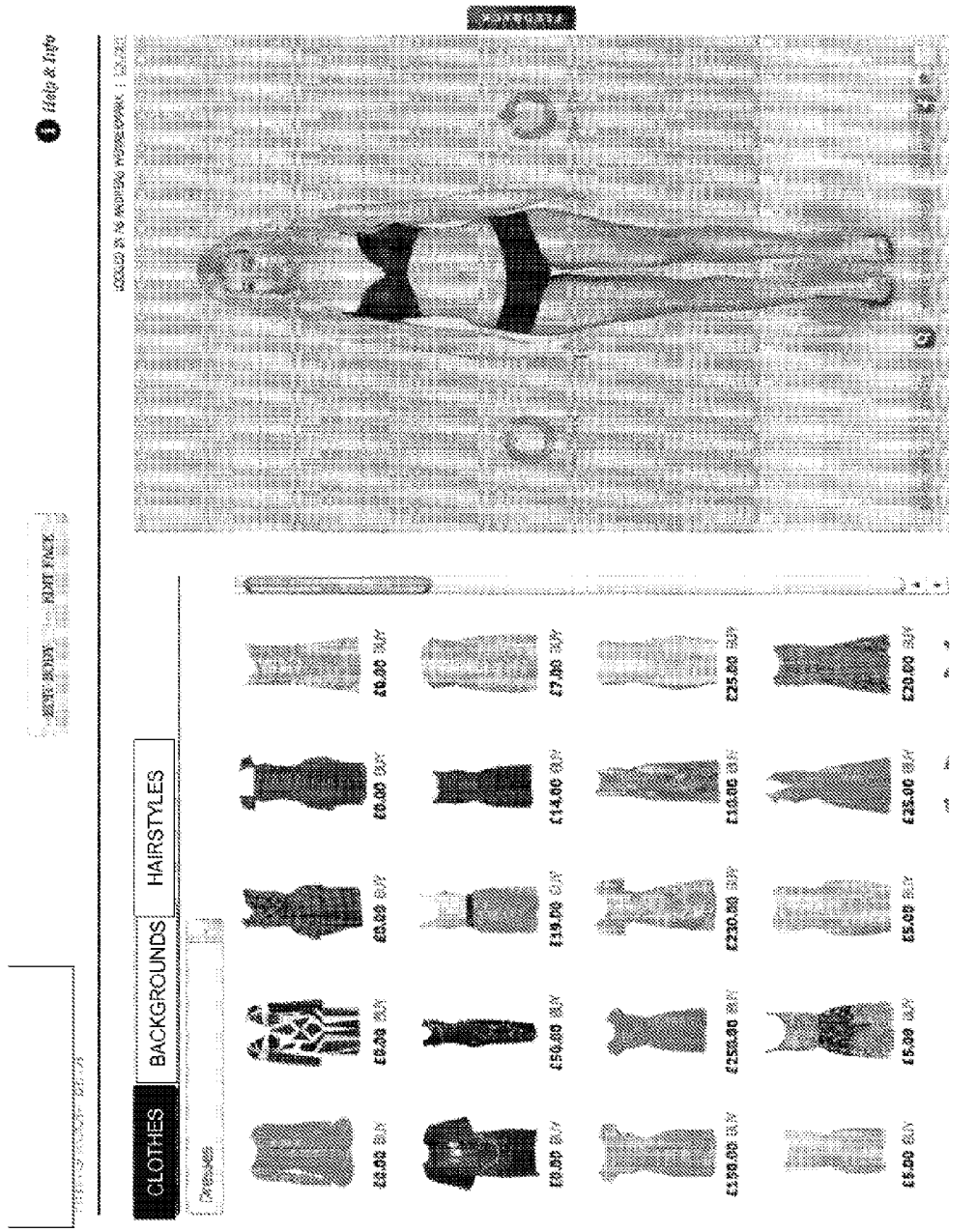
FIG. 26 shows an example of a body model which has been generated after a user has completed the post processing and selected to continue.

In one example if the user is a female and the model to be created is female she then also enters the bra size. The user can then enter in the band size and the cup size. Since these measurements can vary depending on the country, in one example the option to indicate in which country's size the values have been entered is provided. The user then selects to continue and the body model is generated. The user is presented with the body model for example as shown in FIG. 26.

The body model is generated totally synthetically from measurements entered and from the model as it was generated in the system. More details are described elsewhere in this document.

Upon completion of the body model the user gets a notification that the photo annotations may be inaccurate and that there is a possibility to enter measurements manually. If the user selects to change the size of the body model measurements the body model creation is prioritised on the latest input; the photo or the measurements. If the photo is used for the measurements and the user the changes the measurements the model will be more accurate.

See also Section 66.

Section 8: Creating the Body Model without Uploading a Photo

If the user selects to create a body model without uploading a photo the user is in one example presented with different measurements to be entered.

The user is presented with options to enter measurements in two steps. First the basic measurements height and weight can be entered on a sliding scale with the option to change the units.

In one example if the user is a female and the model to be created is female she then also enters the bra size. The user can then enter in the band size and the cup size. Since these measurements can vary depending on the country, in one example the option to indicate in which country's size the values have been entered is provided.

The second step provides for refined measurements. The user is presented with the option to enter additional measurements for instance taken with a tape measure. These measurements can be for hips, waist and chest but also other measurements can be entered.

See also Section 66.

Section 9: The Virtual Fitting Room

Figure 24:
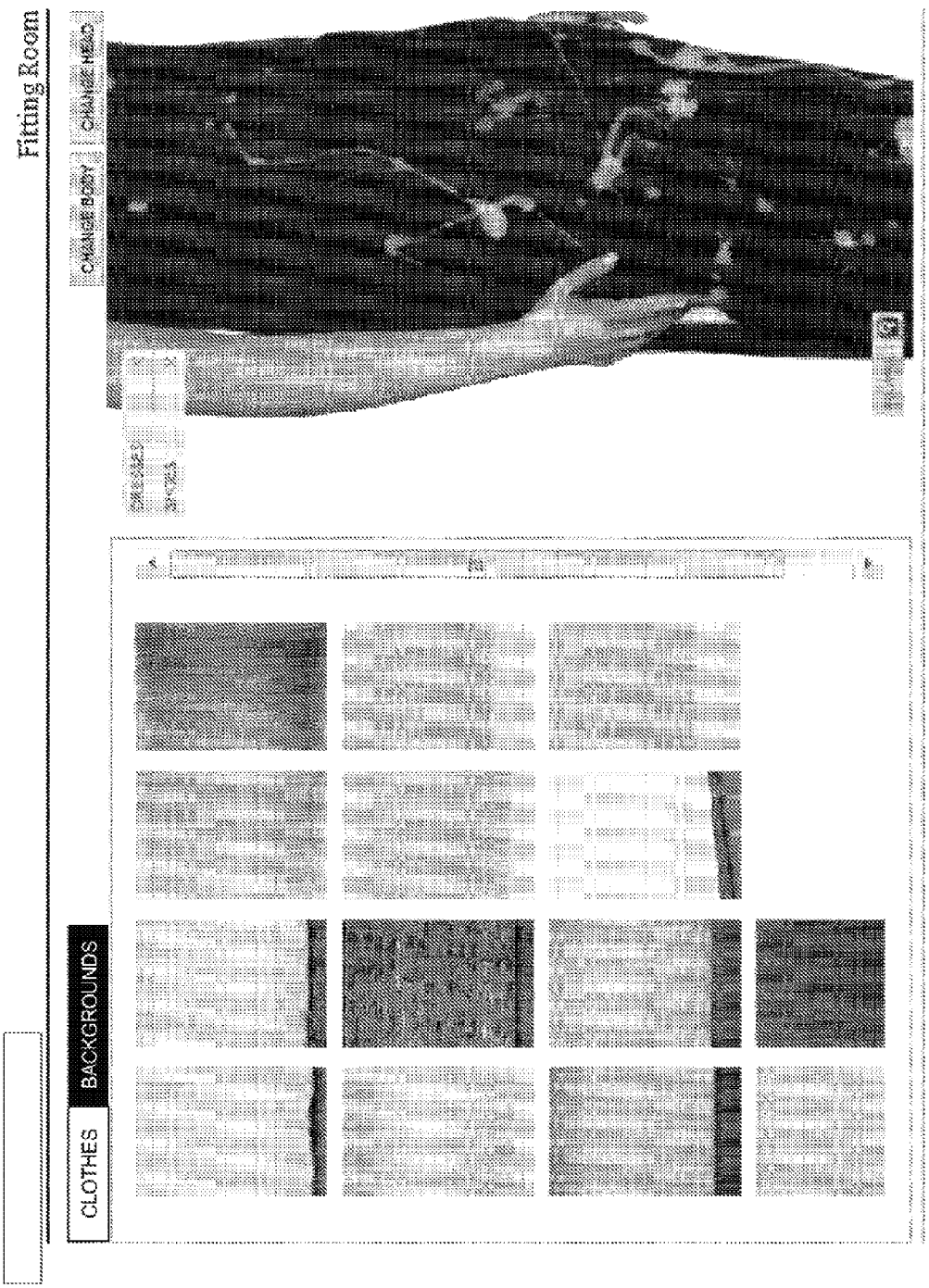
FIG. 24 shows that a user can zoom-in to the body model image and see the body model and the garment in closer detail.

In the fitting room the body model can be dressed in different garments and rotated to be shown from different angles. For example eight views, which the user can view the body model from, are shown in FIG. 17; a drawing of the photo positions is shown in FIG. 18. The user can in one example as a short cut click on "back view" to show the backside view of the body model when showing a look. The user can zoom the body model image and see the body model and the garment in closer detail as shown for example in FIG. 24. The user can change the head and the measurements of the body model from the store interface, for instance if the user would like to change to a different hairstyle.

The Garments

The garments in the virtual fitting room are categorized in different categories such as shoes, dresses, jacket etc. A garment can be presented under several categories. The user can either click on the garment to dress the body model in that garment or the user can drag and drop the garment on the body model.

Buying Garments

The user can buy the garments via the partner retailer's site, and if selecting to buy, the garment is placed in the shopping basket. In one example the user can buy garments in the interface of the virtual fitting room and complete the transaction without leaving that experience.

Garment Layering in Virtual Fitting Room

In the virtual fitting room the user can layer clothes together having a shirt under a jacket and a skirt under a long coat. However, not all clothes should be able to be worn on top of each other; for instance one setting can be that you should not be allowed to have a tight top on top of a coat.

The garments are divided in different groups, some of which can be worn together and some of which cannot be worn together. FIG. 38 shows an example of a layering matrix of different garments which shows how they can be worn together.

The ones that cannot be worn together can be substitutes: for instance you cannot wear a pair of trousers and a pair of shorts at the same time. Selecting to dress the body model in a pair of trousers while the body model is already dressed in a pair of shorts will result in the shorts being removed from the outfit and the trousers will replace them.

In one example the user has the option to decide whether a garment that in the standard mode would replace the garment the body model is already wearing to instead be worn on top of it. It could for instance be a vest top that either could be replaced by a t-shirt or it could instead be worn under the t-shirt.

The system allows for the garments to be worn together or on top of each other. In one example the different garments the body model is wearing are shown in a list where the user can move a specific garment to move it up or down in the layering hierarchy (i.e. the order which they are put on the body model). There can also be buttons which the user can press to bring garments forwards or send backwards in the layering hierarchy.

In one example the user can also drag the actual garments to be placed in a different layering order. The list of clothes also allows for individual deletion of specific garments in one outfit.

The software can in an alternative example derive from where the garment graphically is located in relation to the body model. If for instance a shoulder of a dress is 10 cm outside of the body model then the dress would probably not fit under a jacket and the garment should not be layered together with the dress.

Section 10: Different Views of a Garment

Different garments also have different features such as a shirt can be tucked-in or un-tucked, or a jacket can be open or closed. The system provides for the user to have the choice to select different variants for different clothes the body model is wearing. A similar problem is that a user might want to fold up the legs of a pair of jeans or that a dress could be taken up to a desired length. The virtual fitting room provides for different options to facilitate this.

In one example there are different variants on how to wear a garment, or different variants of the garment itself. The user would then select to show a pair of jeans with the legs folded up for instance.

Section 11: The Garment Overview in the Virtual Fitting Room

Each garment will have information associated with it. The information is about the brand, the retailer and the price among other things. A garment information page may be shown. The garment information page also shows the recommended actual size, based on the body model's measurements. If the user selects "buy from retailer", that recommended size is the size that will be forwarded to the retailers system. The sizing information also provides user specific information in relation to the garment's size and the body model's size. The information provided could for instance be that the garment in size 8 will be tight over the hips and that size 10 will fit you.

Section 12: The First Time the User is Presented with their Virtual Body Model

The first time the user is presented with the model is after they have entered in their measurements. The user will then be presented with the model as representing themselves. One alternative way of showing the user the model is with more or less clothes the first time.

The body model can be shown in different clothes the first time the user sees it. An illustrative picture may be one in which the body model wears underwear. The body model can instead for instance be shown in a tight or loosely fitting garment, which covers more of the skin. This garment is then removed when the user selects a different garment from the garment library and the body model is shown in that garment.

When the user then removes the selected garment the body model could either be shown in underwear or in the other garment, which the user was presented on the body model in the first step.

It is possible for the user to select to show the body model in underwear.

Section 13: Show Nudity Level of the Body Model

The virtual fitting room provides for a setting, which sets what clothes should be shown on the model when none of the garments in the fitting room have been selected. In one example the user can set this and in another example this is a setting provided for a group or individual users from the administrators.

On group level this setting can be based on the age of the user or the size of the user. For instance if the body model has reached a threshold it is to be shown in underwear or a more covering garment. The setting can also be based on the location of the user, for instance on country level and this value can be retrieved from the values the user enters when registering or automatically based on for example the internet protocol (IP) address of the user.

When sharing a look the user decides upon how much clothing the model wears. In order to minimize the risk of improper use the recipient of the look can't undress the model. In one example the model is shared with the possibility for the recipient to exchange items worn but not decrease the amount of clothing or undress the model.

Section 14: Entering Values on Sliding Scale Updates the Body Model Live

In one example, when the user is entering the body measurements using a sliding scale, the body model shown is changing properties to match the user's input. This can alternatively be done with the user enters values in numbers. The user will then be able to try different garments on to the model.

Figure 19:
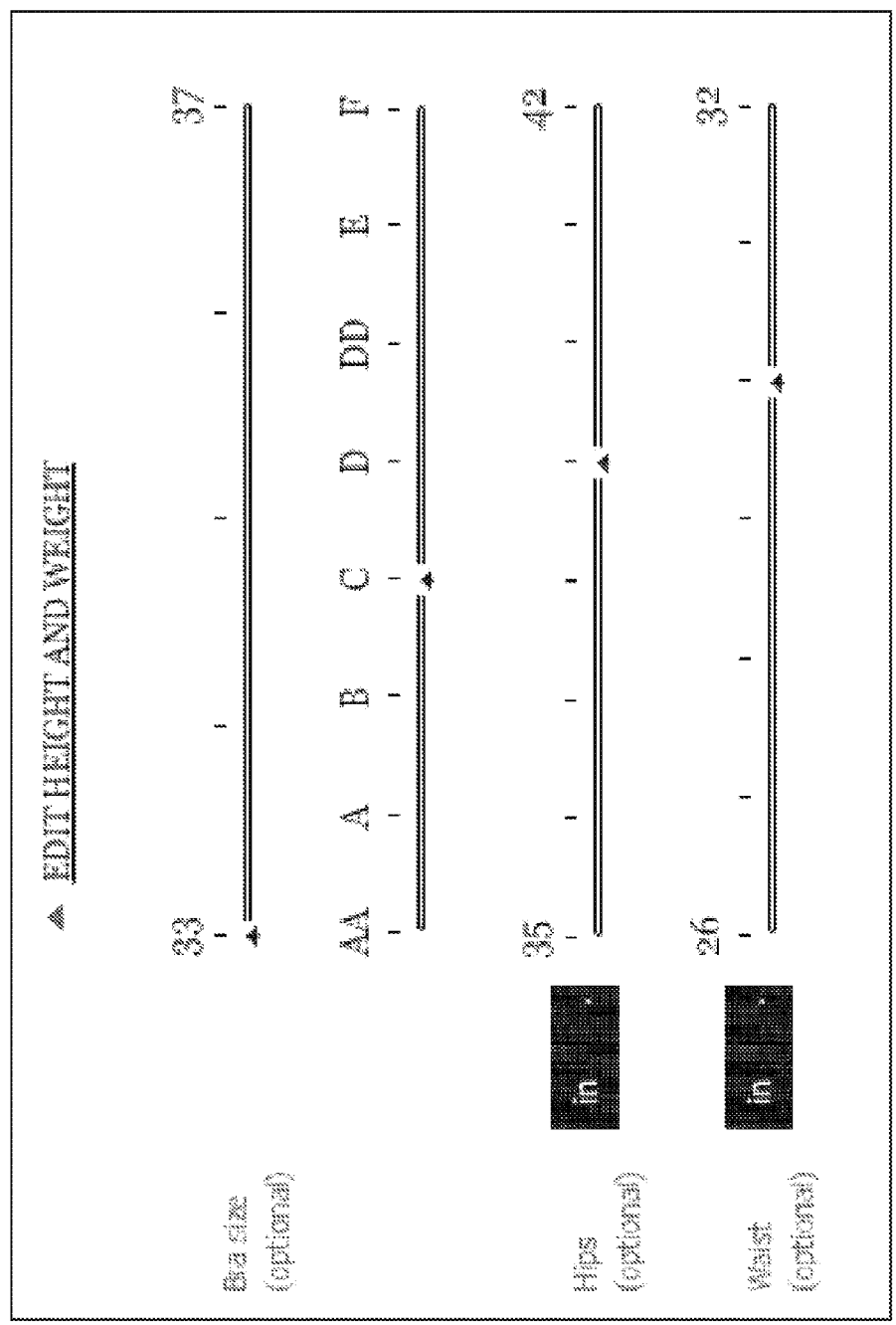
FIG. 19 shows alternative ways of entering measurements for bra size, with hips and waist size as options.

An alternative start point is to hide the body model from the user until she has entered height and weight. FIG. 19 shows an alternative way of entering measurements, in a system where hips and waist measurements are also entered.

Figure 20:
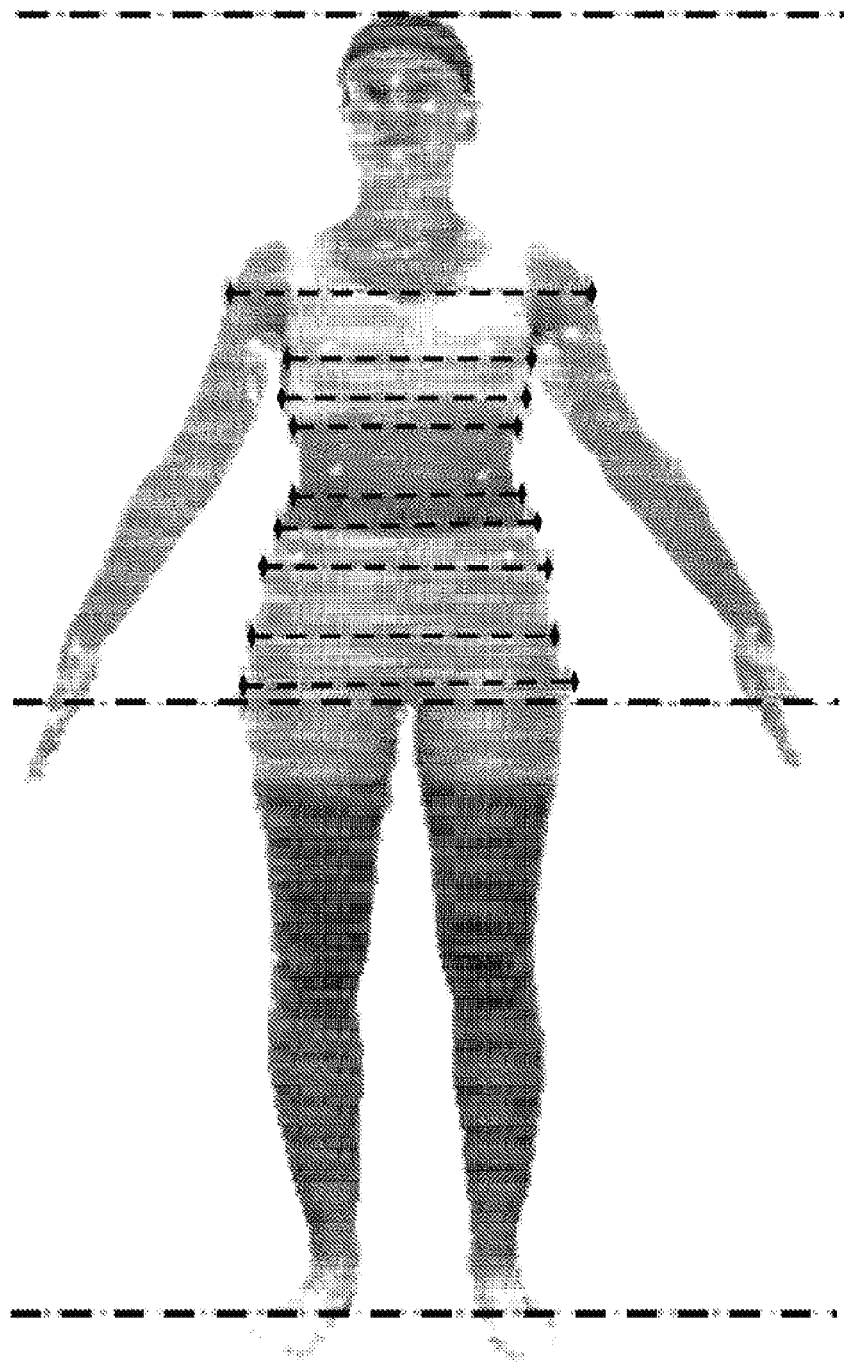
FIG. 20 shows alternative dimensions to measure and/or let the user enter body measurements.

FIG. 20 shows an example of alternative dimensions to measure and/or let the user enter for the creation of the body model.

Section 15: Automatically Adapting the Virtual Body Model to Different Heel Heights The body model can be displayed wearing shoes of different heel height and the choice of footwear changes the heel height of the body model. The adjustment of the heel height depends on the type and model of the footwear used. In one example the heel height adjustment is done by adjusting the heel on the body model and pivoting the feet. In one example also the posture of the body model will change when the body model has a shoe with a different heel height. The garments the body model is wearing will also be adjusted in accordance with the height adjustment of the model to account for the extra height because of the raised heel. When the body model does not wear shoes the body model is displayed with realistic, flat feet.

Section 16: Automatically Adjusting Hem Length and Body Model Height

The hem length can also be adjusted to account for a shorter or longer body model. For instance the hem length would appear shorter on a taller model. This is because body models of different heights could fit within the same garment size. The appearance of the hem length is then adjusted to match with the natural appearance. The actual length of the garment is kept.

The same problem can occur if the dress for instance is covering the body model's feet and perhaps the size of the dress is longer than down to the floor. This is in one example to be communicated to the user and can be presented also with how much it needs to be taken up with to meet certain criteria. The criteria can be not to touch the ground, to be over the feet or for instance to meet the length of the garment on a standard sized model.

In one example the user is just notified that the dress will touch the ground and one option is to see by how much. In another example the user is notified that the dress will touch the ground and given the option to show it taken up. The user can be presented with the option to specify how much to take up the dress by. The user can also or alternatively be presented with just the option to take the dress up. By selecting any of those options, the dress hem length will appear shorter.

Section 17: Changing Hairstyle on the Virtual Body Model

The virtual fitting room allows the user to change the hairstyle of the body model. In the interface in a separate section the available hairstyles are shown. The user can then select one of those hairstyles to use together with the representation of the user's head.

Figure 16:
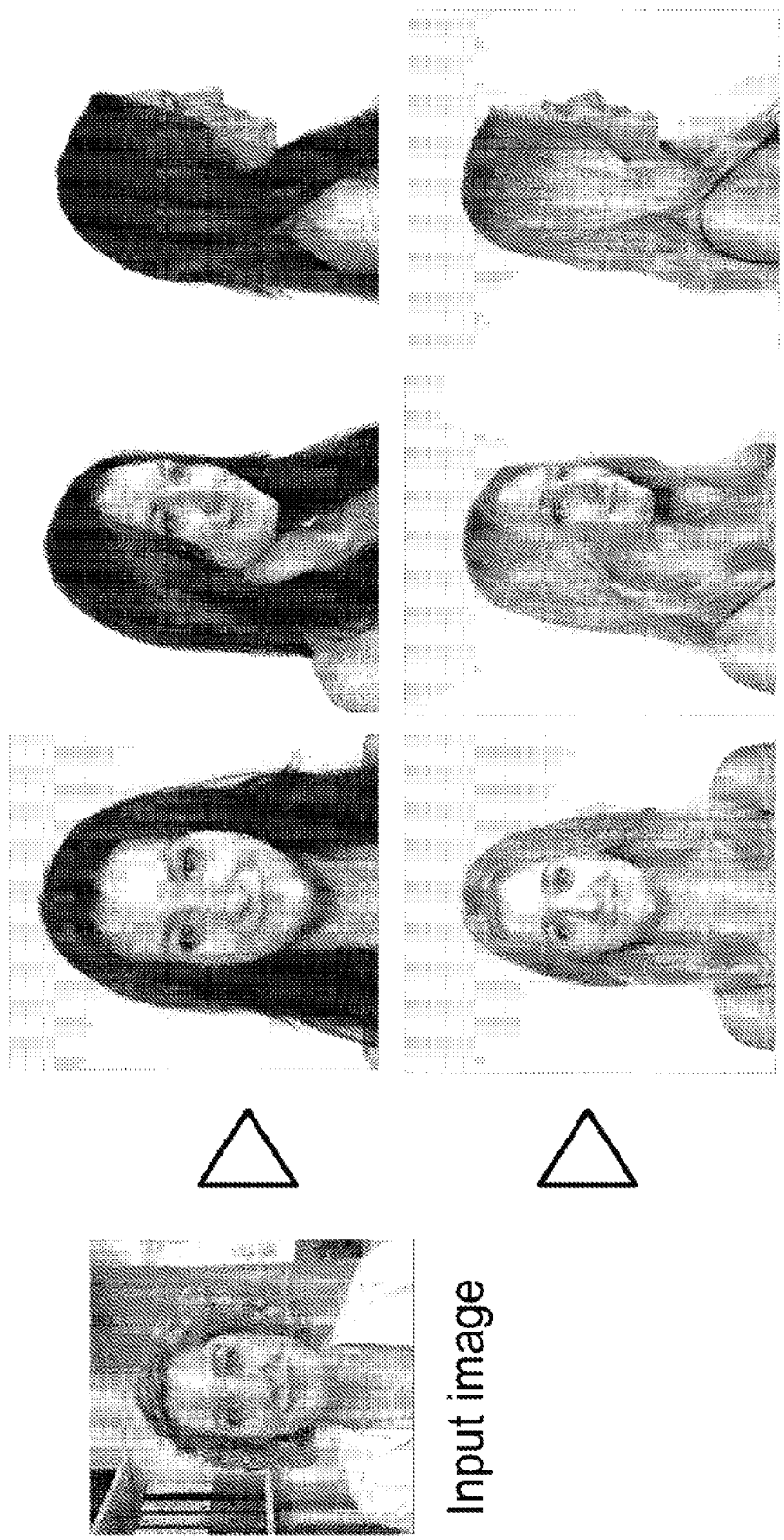
FIG. 16 shows how a user may obtain different hairstyles on a virtual body model.
Figure 40:
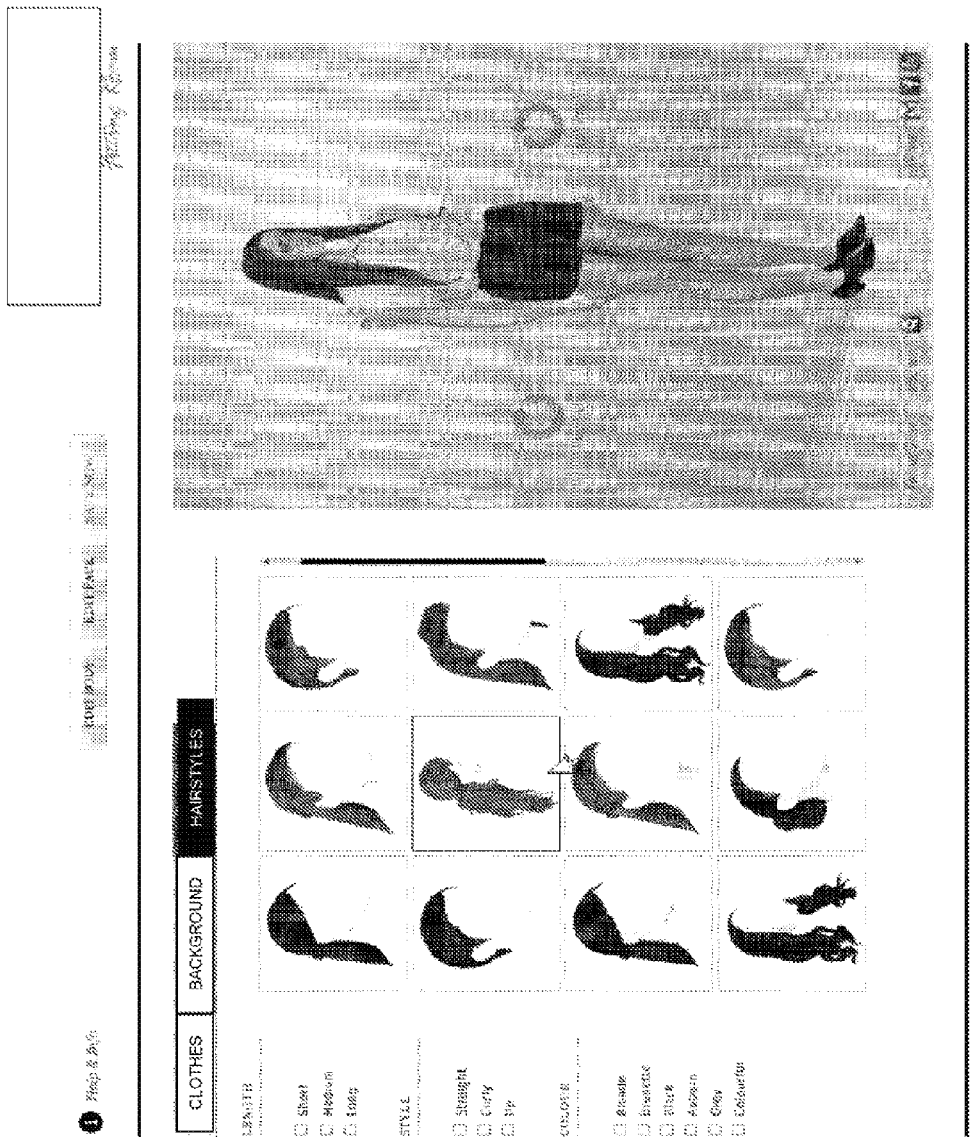
FIG. 40 shows an example of a method for selecting different hairstyles.

This feature allows the user to try different hairstyles together with different outfits. It could be that the user would like to wear the hair up or that she is to try out a new hairstyle before going to the hairdressers. One implementation of this can be seen in FIG. 40 where the user can change the hairstyle. FIG. 16 shows how different hairstyles can be used on one face.

Section 18: Using Different Backgrounds for the Virtual Body Model

Figure 39:
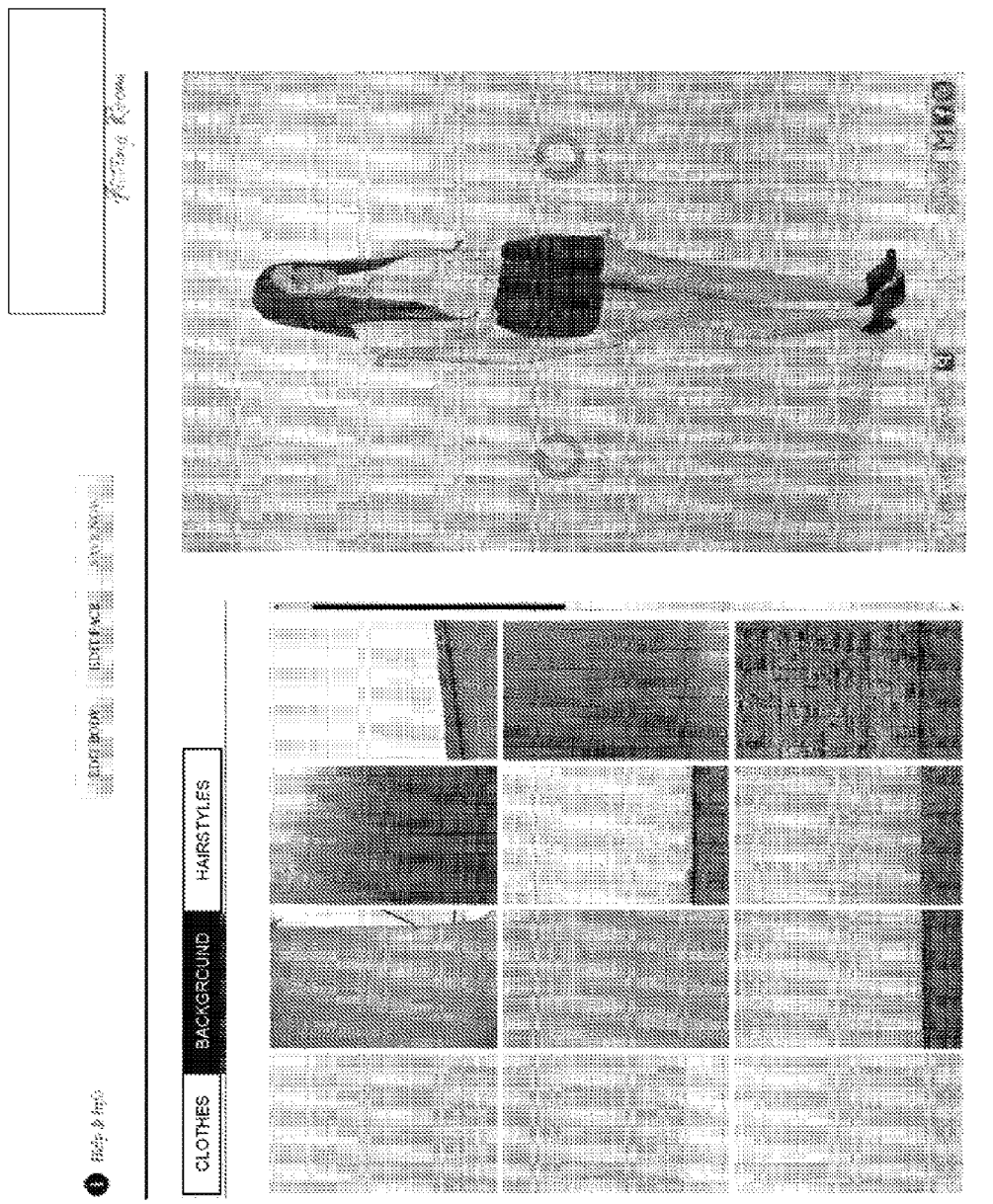
FIG. 39 shows an example of a method for selecting different backgrounds.

As part of the overall look and visualisation of the body model and the garments the user can choose between different backgrounds. One example of this is shown in FIG. 39 where the body model is displayed against a background and the user has the option to select any of a plurality of backgrounds (e.g. colours, images, patterns, photographs etc).

Section 19: Lighting Effects on the Virtual Body Model

The human eye is sensitive to lighting defects and anomalies; as such it is important that the light of the garment is consistent with the light in the background.

In one example the garments are photographed using several light sources. The garment is photographed using one of the light sources at a time. The set of images taken using the different light sources can be blended to give the impression of a specific lighting condition of the garment. This can for instance be used to match the lighting condition in the background and a different blend of the garment images is applied when the user changes the background. The light temperature of the visualisation of the body model can also be adjusted to simulate different lighting settings such as light temperature, sunset etc.

Section 20: Automatic Effects Depending on Garments

In one example if the user selects to dress the body model in a raincoat, the visualization of the look will include effects of rain. This can be a rainy background or for instance a layer of rain overlaid on the image. Similarly, if the user selects to dress the body model in a pair of swim shorts or a bikini, the background is changed to display a beach and the lighting is changed to simulate sunlight.

Section 21: Photo Effects Applied to the Garment on a Virtual Body Model

The images where the body model in an outfit is shown can be adjusted with different effects to change the perception of the look. The effects can be shown in the virtual fitting room and also be shared as part of the shared look. There can be different kinds of effects the user can select from. The effects can be photographic effects such as out of focus, changed focus, flare; location specific effects such as rain, snow; other types of graphical effects such as dividing the image in tiles or giving the impression that it has been painted with watercolours.

Section 22: Connecting with Other Sites

The virtual fitting room can connect to different types of platforms such as social networking sites as well as different retailers and search engines. The body model can be interacted with from different platforms where the user can try on different garments and also shop for garments. The user can also create looks via other sites.

The garments tried on the body model and the looks created can be shared and also stored in the virtual fitting room. Connecting the virtual fitting room to other sites enables the virtual fitting room to provide fitting and size data to be used by the other sites. The data can be filtered before provision to the partner sites: for instance, only providing anonymised data or providing only user-specific data. The users can in one example decide what data should be shared with third party sites.

Section 23: The User's Wardrobe

The user can save clothes to the user profile and store those in a "wardrobe". These could be clothes the user already owns that she would like to combine with other new garments. It could for instance also be garments the user would like to own and therefore would like to keep for future access.

Garments in the user's wardrobe that the user owns could in one example be prevented from being deleted centrally from the system and not be removed from the user's wardrobe even though the garments might not be shown in the virtual fitting room for other users. The user could also let other users use clothes from their wardrobe, either to dress the wardrobe's user's body model or for their own body model.

Section 24: Level of Body Model Completion

The user can in an example receive guidance on how far she is in creating the body model. Providing the user with this information is one way to encourage the user to complete the whole process of creating the body model and update the user profile.

Section 25: Randomized Outfits

The user can be presented with the option to randomize a selection of garments on to the body model. The garments from which to choose can be defined with for instance the garments in the user's wardrobe, garments from a specific brand, garments of a specific colour or other factors or combinations of these.

There can be a feature where the user is asked questions before creating the random outfit to make it more appropriate for the occasion.

The randomizer can create an outfit for a specific occasion and in one example the user can provide feedback to the randomizer engine about the appropriateness of that outfit for that occasion. This could for instance be for a gala dinner, some sports activity or a date.

Section 26: Informed Randomized Outfits

The selection of garments for the body model can be totally random or it can be informed. One way the random selection can be informed is about the user's previous buying pattern and for example suggest similar or dissimilar garments, depending on the setting.

One alternative information base the random selection can use is input from a particular store or several stores, depending on a platform's connections to stores. A store could feed in to the model that they would like to push a specific garment. This could be because the margin is better on that one, that the garment is soon to be replaced by next season's collection or for instance since the store would like to sell more of that garment.

See also Section 29.

Section 27: User Satisfaction Survey

One feature that is present in one example of the virtual fitting room is a user satisfaction survey. The user is then prompted to rate how satisfied she is with the body model as it has been created.

If the user answers that the model is not accurate then the user will be prompted with a message asking the user to annotate on the body model image where it is not accurate. If the user for instance has not provided a waist measurement and the user suggests that the waist is not accurately represented she is prompted with a message suggesting that she should give that value. There could also be a direct link or input area for the user to put in that value.

In an example, the virtual fitting room is provided with an administration interface.

Section 28: Key Features of Development and/or Demonstration Systems

There is provided a method of visualising garments on a virtual body model, comprising the steps of (a) storing digital images of multiple garments; (b) storing a virtual body model of a user; (c) displaying the virtual body model on a touch screen device, together with an image of one or more garments; (d) combining the virtual body model with the image of at least one garment; (e) using a touch action or gesture to the touch screen to cause a different garment to be automatically combined with the virtual body model in place of the previously displayed garment.

The method may be one in which a sequence or array of multiple garments is shown together with the virtual body model. The method may be one in which the garment array is a linear array and the user can with a flick to the left or to the right or other gesture cause the array of garments to move to the left or to the right, with the particular garment that would occupy a given position behind or over the virtual body model being automatically combined with the virtual body model. The method may be one in which a drag and drop action is used to cause a specific garment to be dragged to and dropped on and hence combined with the virtual body model. The method may be one in which physics-based animations are applied to the moving garments.

There is also provided a method for enabling a user to estimate how well a garment, available on a peer-to-peer web site, will fit that user, in which a seller of the garment is associated in a database with a virtual body model defined by various body size measurements; and the user is also associated in a database with a virtual body model defined by various body size measurements, and a system accesses the or each database to enable the user to estimate how well the garment will fit by enabling a comparison between the seller's and the user's own body size measurements.

The method may be one in which the user manually compares the body size measurements. The method may be one in which the system compares body size measurements of the seller and the user that correspond to the same type of measurement, such as height, weight, size of waist, size of hips, size of chest, bra size, height to crotch. The method may be one in which the system generates an index or score of how close the two virtual body models are so that the user can estimate how well the garment will fit. The method may be one in which the seller does not have his/her own virtual body model, but such a virtual body model and/or the related body size measurements can be inferred from other persons that do have a virtual body model and have purchased the same garment. The method may be one in which the web site is a peer-to peer selling service such as an auction site. The method may be one in which the web site provides a clothes rental service.

There is also provided a method for generating an image of a first user in a garment, in which the system can access a virtual body model of the first user and a database of garment images and a history or record of previous garments purchased or viewed by other users, each with similar virtual body models to the first user, and the system automatically, without user intervention, selects a garment which the system determines is a suitable garment given the history or record of previous garments purchased or viewed by the other users and then combines an image of that garment onto the virtual body model of the first user and automatically without user intervention provides to the first user an image of the garment, combined with the virtual body model, to enable that first user to visualise what the garment will look like when worn by them.

There is also provided a method for generating an image of a user in a garment, in which the system can access a virtual body model of the user and a database of garment images and a history or record of previous garments purchased or viewed by the user, and the system automatically, without user intervention, selects a garment which the system determines is a suitable garment given the history or record of previous garments purchased or viewed by the user and then combines an image of that garment onto the virtual body model and automatically without user intervention provides to the user an image of the garment, combined with the virtual body model, to enable that person to visualise what the garment will look like when worn by them.

The method may be one in which the garment combined with the virtual body model is displayed on a garment retail web site that the user has logged on-to. The method may be one in which the similarity of the virtual body models of the other users to the first user, is a function of various body size and/or shape measurements. The method may be one in which the similarity of the virtual body models of the other users to the first user is also a function of age. The method may be one in which the similarity of the virtual body models of the other users to the first user is also a function of user location, user preferences or any other user-related criteria.

There is also provided a method for generating an image of a user in a garment, in which a system can access a virtual body model of the user and a database of garment images and can automatically, without user intervention, select a garment and then combine an image of that garment onto the virtual body model and finally, automatically and without user intervention or instruction, send or otherwise provide to the user, at a time that has not been selected or prior approved by the user, an image of the garment, combined with the virtual body model, to enable that person to visualize what the garment will look like when worn by them.

The method may be one in which the system has access to a database of images of many different garments and selects which garment to choose by applying criteria based on factors including one or more of: age of the user, size and/or shape of the user, location of the user, income of the user, hobbies of the user, purchasing history of the user, browsing history of the user, preferences stated by the user. The method may be one in which the garment combined with the virtual body model is sent as an e-mail to the user. The method may be one in which the garment combined with the virtual body model is displayed on a garment retail web site that the user has logged on-to.

There is also provided a method for generating an image of a user in a garment, in which the system can access a virtual body model of the user and a database of garments or garment images and the user is able to select from one of several different recommendation channels, such that, when a specific channel is selected, then the system automatically, without user intervention, selects a garment which the system determines is suitable given parameters of the virtual body model and then combines an image of that garment onto the virtual body model and automatically without user intervention provides to the user an image of the garment, combined with the virtual body model, to enable that person to visualise what the garment will look like when worn by them.

The method may be one in which each channel is associated with a specific sub-set of images of garments from the complete database of garment images. The method may be one in which each different channel is associated with a different person. The method may be one in which each different channel is associated with a different stylist. The method may be one in which each different channel is associated with a different print publication. The method may be one in which each garment is manually scored as being suitable or not for each of a range of different body shapes and/or sizes and that data stored in a table which is then automatically accessed and used to enable the system to determine which garments are suitable for a user given the parameters of the virtual body model of that user. The method may be one in which the garment combined with the virtual body model is displayed on a garment retail web site that the user has logged-on to. The method may be one in which the parameters of the virtual body model include one or more of the size or shape of the virtual body model, the age of the user, any other criteria input by the user.

There is also provided a method of manufacturing a garment, in which a user has a virtual body model of themselves, the method includes the steps of (a) the user selecting a garment from an on-screen library of virtual garments; (b) a processing system automatically generating an image of the garment combined onto the virtual body model, the garment being sized automatically to be a correct fit; (c) the processing system generating data defining how a physical version of that garment would be sized to provide that correct fit; (d) the system providing that data to a garment manufacturer to enable the manufacturer to make a garment that fits the user.

The method may be one in which the virtual body model is generated from a digital photograph of the body of the user. The method may be one in which the virtual body model is generated using the height and weight of the user. The method may be one in which the virtual body model is generated using one or more of the following: width of chest, height of crotch etc. The method may be one in which a user takes, or has taken for them, a single full length photograph of themselves which is then processed by a computer system that presents a virtual body model based on that photograph, together with markers whose position the user can adjust, the markers corresponding to some or all of the following: top of the head, bottom of heels, crotch height, width of waist, width of hips, width of chest. The method may be one where the user enters height, weight and, optionally, bra size. The method may be one comprising a computer system which then generates an accurate 3D virtual body model and displays that 3D virtual body model on screen. The method may be one where a computer system is a back-end server.

The method may be one where the user takes photograph on a computing device such as a mobile telephone and uploads that photograph to a back-end server. The method may be one where the garment is sized automatically to be a correct fit without using any standard, base sizes.

There is also provided a method for automatically generating hairstyle recommendations, in which a system receives as input one or more photographs of a user's face and then (a) analyses that face for facial geometry and (b) matches the facial geometry to a library of hairstyles, each hairstyle being previously indexed as suitable for one or more facial geometries, and (c) selects one or more optimally matching hairstyles and (d) outputs an image of that optimally matched hairstyle to the user.

The method may be one in which the system combines the image of the optimally matched hairstyle onto an image of the user's face. The method may be one in which the user selects a garment and the system selects a hairstyle that is optimally matched to that garment. The method may be one in which the user can select a specific hair colour and the image of the hairstyle is altered to use that specific hair colour.

There is also provided a method for automatically generating hairstyle recommendations, in which a system receives as input one or more photographs of a user's face and the user's selection or choice of garment and the system then (a) matches the garment to a library of hairstyles, each hairstyle being previously indexed as suitable for one or more specific garments or types of garment, and (b) selects one or more optimally matching hairstyles and (c) outputs an image of that optimally matched hairstyle to the user.

The method may be one in which the system also generates and outputs an image of the optimally matched hairstyle onto an image of the user's face and a virtual body model of the user combined with the garment.

There is also provided a method for automatically generating make-up recommendations, in which a system stores a virtual body model for the user, together with one or more garment selections made by the user and a library of make-up descriptions; in which the system automatically determines appropriate make-up descriptions given the specific garment or garments selected by the user and then provides an image of the virtual body model combined with one or more of the garments, plus the make-up description.

The method may be one in which the make-up description is make-up advice. The method may be one in which the make-up description is an image of make-up applied to an image of the user's face. The method may be one in which the system stores the skin tone of the user; and the make-up description the system provides is compatible with the skin tone.

There is also provided a method in which the system receives as input one or more photographs of a user's face and then (a) analyses that face for facial geometry and (b) matches the facial geometry to a library of make-up descriptions, each make-up description being previously indexed as suitable for one or more facial geometries, and (c) selects one or more optimally matching make-up descriptions and (d) outputs an image of that optimally matched make-up description to the user.

The method may be one in which the automatic determination is achieved by the system looking up in a database appropriate make-up descriptions that have previously been selected by make-up experts, stylists, or models for specific garments or categories of garments.

There is also provided a method of enabling a viewer of a television device to visualise what a garment, displayed on a program shown on the television device, would look like if worn by the viewer, comprising the steps of (a) processing a virtual body model; (b) providing an image of a garment on a second, portable display device together with an icon, button or function that, if selected by the viewer, automatically causes one or more images of the garment to be combined onto the virtual body model to enable the viewer to visualise on the second, portable display device what the garment will look like when worn by them.

The method may be one where the second portable display device is a mobile telephone or tablet. The method may be one in which the program is a live television program and feedback is provided from the portable display devices such that the program includes an indication of the numbers of viewers visualising a given garment on their virtual body models. The method may be one in which the second portable display device includes a button, icon or function that, if selected by a viewer, automatically sends a signal from the device to a server to indicate that the viewer wishes to purchase the garment. The method may be one in which the signal authorises automatic payment for the garment by the viewer.

Section 29: Recommendation Features

Any recommendation from a retailer may be influenced by the business goals with wanting to ship high margin garments or garments that they have a big stock of.

Retailers can in one example enter business rationales for the virtual fitting room layout. Stock levels and margins could be part of how the garments are laid out in the fitting room and what is recommended for that particular user. Business rules having an impact on the recommendations can be margin, stock levels and also any chosen discretionary rules. Magazines may give advice more freely.

Recommendations can be given in relation to the natural fit, which is the fit of garments for a specific body type. The recommendations can be given via the virtual fitting room to the users to use for their body models. The recommendations can in an example only be shown to users with the matching body size. The recommendation can alternatively be shown as an aspirational recommendation where users receive them to have something to strive towards.

See also Section 26 and 83.

Section 30: 'Cover Flow' Type UX for Garments

The virtual fitting room provides for a fast and easy way for a user to browse through a large set of different garments, similar to album art 'cover flow' used in many online music services. The way the user can flick or swipe through the set of garments, for instance using a touch screen device, is exemplified in FIG. 46.

The user can select what type of garment they would like to flick through to try out on the body model and also select one of the garments to stay on the body model. The user can also select to flick through whole outfits of garments to be tried on to the body model. The flow of garments can be flicked through in any horizontal direction for different garments.

In one example the browsing tool allows the user to flick vertically to change the set of garments to flick through. It can be understood as several different horizontal rows of garments that the user can alter between.

The garment pane can be slowed down and a garment selected and the body model as displayed is then dressed in that garment. The user can select to continue to flick through alternative garments to replace the selected garment or the user can select to flick through alternative garments to be worn together with the selected garment.

The user can also select and filter depending on their location. They can filter on the location or if they have selected a garment the user can see where the closest location supplying that garment would be.

The user can also get specific targeted adverts based on the garments they are viewing and be provided with that information from the retailer or third parties. The adverts can also be linked to location and can for instance be that the garment you are viewing is 10% off if you enter this close-by shop within 30 minutes.

Section 31: Automatic Suggestion of Outfit

In an example, there is provided a feature where you take an image of an outfit worn by a person and the device or service uses that image and matches it (or the corresponding outfit) to the selection of garments the virtual fitting room has in its database.

The search can try to provide an absolute match of the garments and suggest the same ones as seen in the picture. The search can alternatively try to provide a best match to the garments identified in the picture. That best match can be a best match based on colour, material and shape, depending on what the user prefers. The best fit match can provide an interface where the user can decide on what feature of colour, material and shape should be the highest priority. A weight range can be provided; this could be by entering values or for instance by moving a slider to a place on a scale.

Section 32: Virtual Fitting Room

In the virtual fitting room, the retailer's customers can have an enhanced experience using the body model.

The three main benefits to the retailers are:

1) Conversion Rate

The people who create a body model are more likely to purchase from the online store. The virtual fitting room has a positive impact on the online retailer's conversion rate (the rate of converting viewing customers to buying customers).

There is a strong suspicion that the "fast fashion" is the demographic that is the most acceptable to the online retailing experience. That group will not have as strong views and concerns about data privacy and will also be more open to share looks with other users.

2) Basket Size

If a user shops for garments in isolation they tend to focus on one garment at a time. The virtual fitting room allows the users to shop for a whole outfit and this is driving the basket size. The users will add more garments to the shopping experience and also have a more playful attitude to shopping.

3) Positive Impact on Return Rate

The virtual fitting room reduces the return rate for garments, since the users already have tried out the garments in the fitting room before dispatch to their homes. Returned garments are costly to retailers both in the logistics in handling them and also the diminished value from a returned garment.

Section 33: Cross Promotion of Goods

The users can be presented with recommendations for products in non-garment sectors. For example if the system calculates that a person based on the body model size is overweight, that information can feed in to the retailer's system recommending diet products.

Some retailers that today have club card systems lack size and fit data in relation to the cardholders. The lack of that data in the system limits what products and services they can offer through their club card database and related services. Connecting the data and buying behaviour from the virtual fitting room adds a whole new dimension to the systems. The retailers can create loyalty programs around size and fit and they can provide information in relation to what other shopping behaviours the users have. The virtual fitting room can also be connected to that data and provide that information as well as provide shopping recommendations based on that data.

Section 34: Body Size Matching and Indexing for Improved Peer to Peer Clothing Purchasing Background By way of example, Metail solves the problem of online clothing fit by allowing users to create 3D photo-real body models of themselves. Metail also then digitizes garments in its special digitization rig to allow it to match garments to bodies for fit visualization. However there are many instances where Metail will not be able to obtain garments for digitization to enable it to generate fit visualization, such as for the second hand market. In this instance an alternative solution is needed to give users the confidence to know that purchases may or may not fit them.

Problem

We solve the problem of allowing consumers purchasing or renting garments from other users to get an indication of what garments are most likely to fit, by getting an understanding of the body match of sellers. This should give an increased confidence of buyers from sellers where sellers are selling their own previously worn items.

Description

A method for scoring garments based on fit. As we are building a database of users who will be creating 'Body models', through Metail, i.e. photo-real accurate virtual body representations of themselves online for trying clothes on to see how they fit, we will therefore be able to match users to other users who have a similar body shape profile. This information will give users an indication of which garments being sold by other users through channels such as eBay might have a better chance of fitting them. We will provide an index matching system such that a user could search for items from people with a 95% body match index or they could even broaden the search to 80% for example. The body match index will be built based on all the fit matrix data that Metail generates from its users.

An advantage is not having to generate garment visualization images, because body data and algorithms are used instead. Therefore there will be no garment digitization costs and logistics. A further advantage is increased basket size and user purchasing potential for second hand and rental businesses through increased confidence to purchase.

EXAMPLES

A specific example is a body matching system for eBay. Another specific example is for a clothes rental service.

Other Ideas

The idea of crowd sourced or peer-to-peer fit recommendations for garments that the Metail computer-implemented system cannot model.

Initially thought of for clothes rental but this can be used for a variety of services such as second hand and out of production garments.

Could work with the likes of Ebay, since the service provider has not seen the garment before a user wants to sell, but the user can rate how well the garment fits and that recommendation can be a guide for a person with a similar body size and shape.

One way you could do peer-to-peer selling of garments is that Metail can tell you that "you are a close match" to a seller.

What else could you do with crowd-sourced fit recommendations?

Ripe for game-ification:

Stack overflow model: the more you recommend the better offers you get.

Ask questions to the community and receive answers to get feedback. Get higher in the hierarchy level.

Other:

Interaction around the Me Model, stardoll model. The models should exist stand alone on a platform, webtop, online. Share and collaborate on the models.

Generally the idea that information about how garments fit some users can be used to infer how well they might fit others. We can match users to other users with a similar body shape profile, allowing e.g. clothes on eBay to be reliably bought if the buyer and seller have a sufficient match in their body shape profile.

Linked Garments

One useful feature, which the virtual fitting room provides for, is to aggregate data on which garments are bought together.

The garments shown as being bought together could be bought by the same person over time or they could be bought by the same user at one time.

The linkage can also be among friends where information can be provided about what type of garments and what particular garments friends buy that are similar. Similarity can be in the types of specific garment or in the dress colour for instance.

The friend connection can be derived from the users being friends (having accounts that are linked) on either the virtual fitting room platform or in a different social networking site such as Facebook.

The information about similar shopping behaviours around garments can also be for similar body sizes. For instance it can be derived that people with a height between 150 cm and 165 cm more often buy a combination of a dress and boots than people of other heights.

Section 35: Using Information about Linked Garments

The use of the data collected can be for recommending users to try the linked garments. It could for instance be that your friend has bought a dress and you get a recommendation to try the same or a similar dress. Or that someone with your body size has bought a particular shirt and you are recommended to try that one on.

The user could also get a recommendation that one of the garments they are trying out has complementary garments. The complementary garments could be from previous shopping behaviour of other users.

It could also be data that is being provided from the retailer, or for instance from a stylist, that some garments go well together. The recommendations can also be crowd sourced from the user base and they could come with recommendations on what fits together for instance. See more about recommendations elsewhere in this document.

Section 36: In-Store Concepts

The virtual fitting room can be connected to an ecosystem which in one example includes physical presence in retail stores. An outline of an example system is shown in FIG. 2-9.

The ecosystem is one in which the customer can use an online body model or can go in to a real-world retail store and create a body model of herself though a picture and by entering measurements or other parameters. The user can see the body model and try on clothes using an in store computer and after the experience also access it online. The user can also access the body model through her mobile phone where she for instance can scan a bar code of clothes and see them on the body model.

A virtual fitting room service for online clothing retailers and media/fashion websites is provided. An outline of the system is given below:

1. Concept
  a. Consumers create 3D 'Body model' versions of themselves in-store
2. Scope
  a. Big established retailer
  b. Potential to go wider
3. Audience
  a. Users=tourists=>local customers post Olympics in London 2012
4. Multi-channel
  a. Profile for use online, in-store and on mobile
5. Aim
  a. Social interaction driving brand, PR and sales through lifetime engagement with customer The in-store concept is part of an overall system which consists of several parts that all centre around the virtual fitting room and the body models.

In-Store create my own 'Body model' get all my body measurements try lots of outfits without needing the changing room create my own style magazine enter cool new style competitions create my own 'Body model' get hair & makeup advice from style advisors stored to profile try more trends, faster in-store on Body model in Style Surgery match hair & makeup to clothes buying Mobile scan items/marketing campaigns and try them instantly on the move Online use my profile to continue trying clothes on at home see what others think about my style choices use my profile to try different makeup and hairstyles on at home share and see what others think about my style choices match to clothes and total 'look'

Technology Features

Create virtual body model, try on and save outfits

Interact with model in-store through various means:

Changing room booth (private)

Small touchscreen (less private)

Large touchscreens/plasmas (public)

Big screens can show two models at the same time so that friends can shop together and dress each other The smartphone application allows the user to try outfits on their model in or out of stores (barcodes could be scanned)

Microsoft Kinect allows for gesture recognition and can be used with large plasmas instead of touchscreens Social features in connection with store concept The user can publish her looks to a slide show on a touch screen in the Partner store/an advert (this can be 'liked' leading to prizes)

Look Books can display the most 'liked' looks on a large touchscreen

Most 'liked' looks can be compared between stores (long term)
Publish your looks to the Partner website
Publish your looks to Facebook and other social media sites
A celebrity look can be viewed or incorporated
Styling advice can be given based on skin tone, size and shape
Style surgery and advisors in-store
A 'Look Off' game can be created to allow users to try to create the best look (could be judged by a celebrity)
Print Features
Your looks onto a photo strip (could include randomised looks)
Your measurements and recommended Partner size
Your images to create postcards or save as e-cards (themes)
Your images to create your 'Partner Magazine'
Loyalty
Loyalty card integration
A picture of your model can be printed onto your card
The card can be swiped in store or code entered online to track the user and update Metail wardrobe
Given a store and online loyalty card when you create a model (track size over time and adapt offer)
In-Store and Online Excitement
1. Save size and outfits to the Metail plug in on the Partner website
2. Differing levels of privacy, from a changing room booth, to a small touch screen to a large touch screen
3. Publish your looks to a slide show on a touch screen in the Partner store/an advert (could be 'liked' leading to prizes)
4. Look Books can display the most 'liked' looks on a large touchscreen
5. Most 'liked' looks can be compared between stores (long term)
6. Publish your looks to the Metail website
7. Publish your looks to Facebook and other social media sites
8. A celebrity look can be viewed or incorporated
9. Your looks onto a photo strip (could include randomised looks)
10. Your measurements and recommended Partner size
11. Your images to create postcards or save as e-cards (themes)
Mobile and Additional Features
A Smartphone application allows the user to try outfits on their model in or out of stores (barcodes could be scanned)
The screen can show two models at the same time so that friends can shop together and dress each other
Styling advice can be given based on skin tone, size and shape
Your images to create your 'Partner Magazine'
Loyalty Again
For instance the Microsoft Kinect allows for gesture recognition and can be used with giant plasmas instead of touchscreens
A 'Look Off' game can be created to allow users to try to create the best look (could be judged by a celebrity)
Loyalty card integration
A picture of your model can be printed onto your card
The card can be swiped in store or code entered online to track the user and update Metail wardrobe
Given a store and online loyalty card when you create a model (track size over time and adapt offer)

Figure 4:
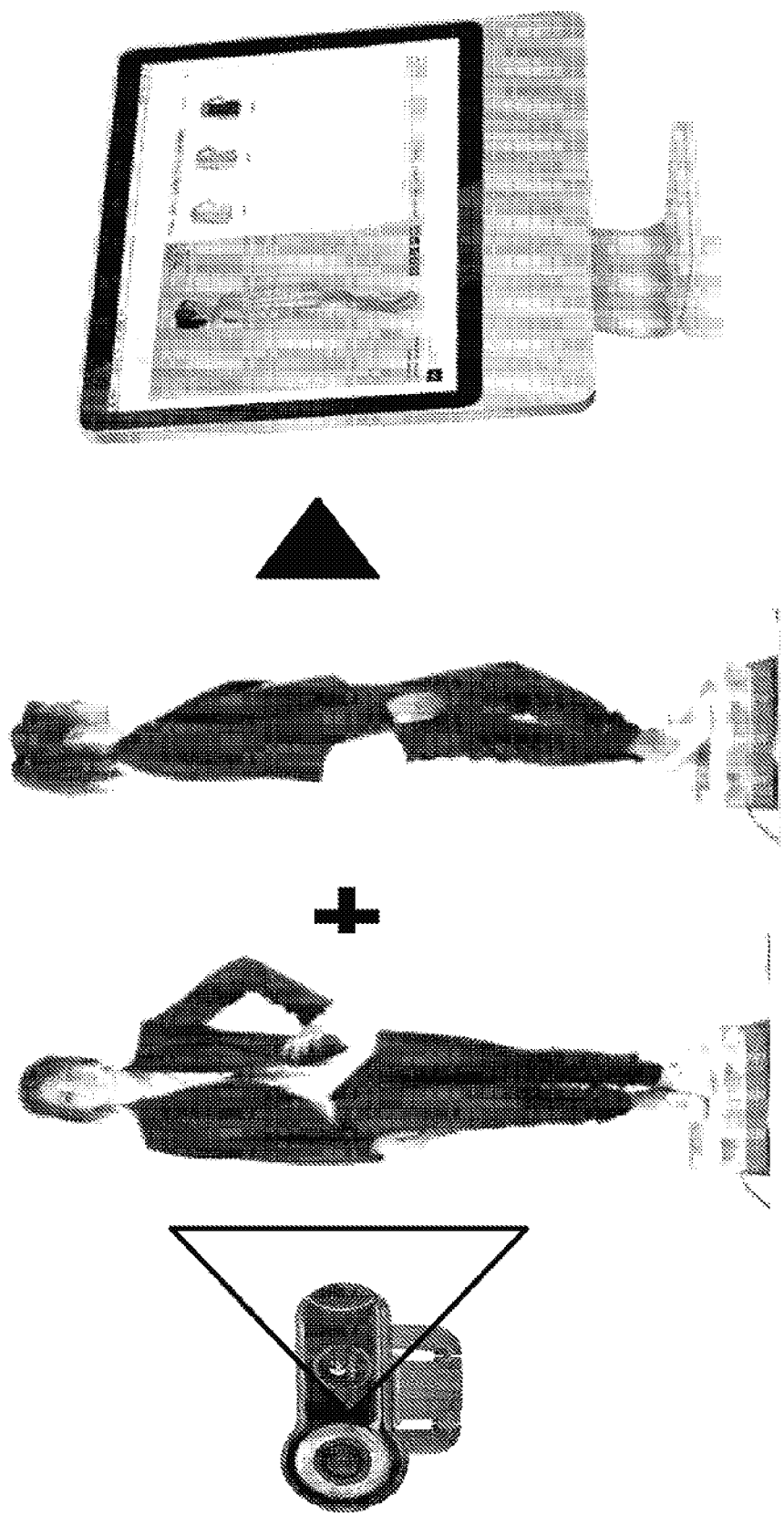
FIG. 4 shows an example of steps to create a body model.
Figure 6:
FIG. 6 shows the user may access product details through a mobile device.
Figure 7:
FIG. 7 shows a user may use the mobile device to select the product and view the garment on their own personal body model in full 3D.
Figure 8:
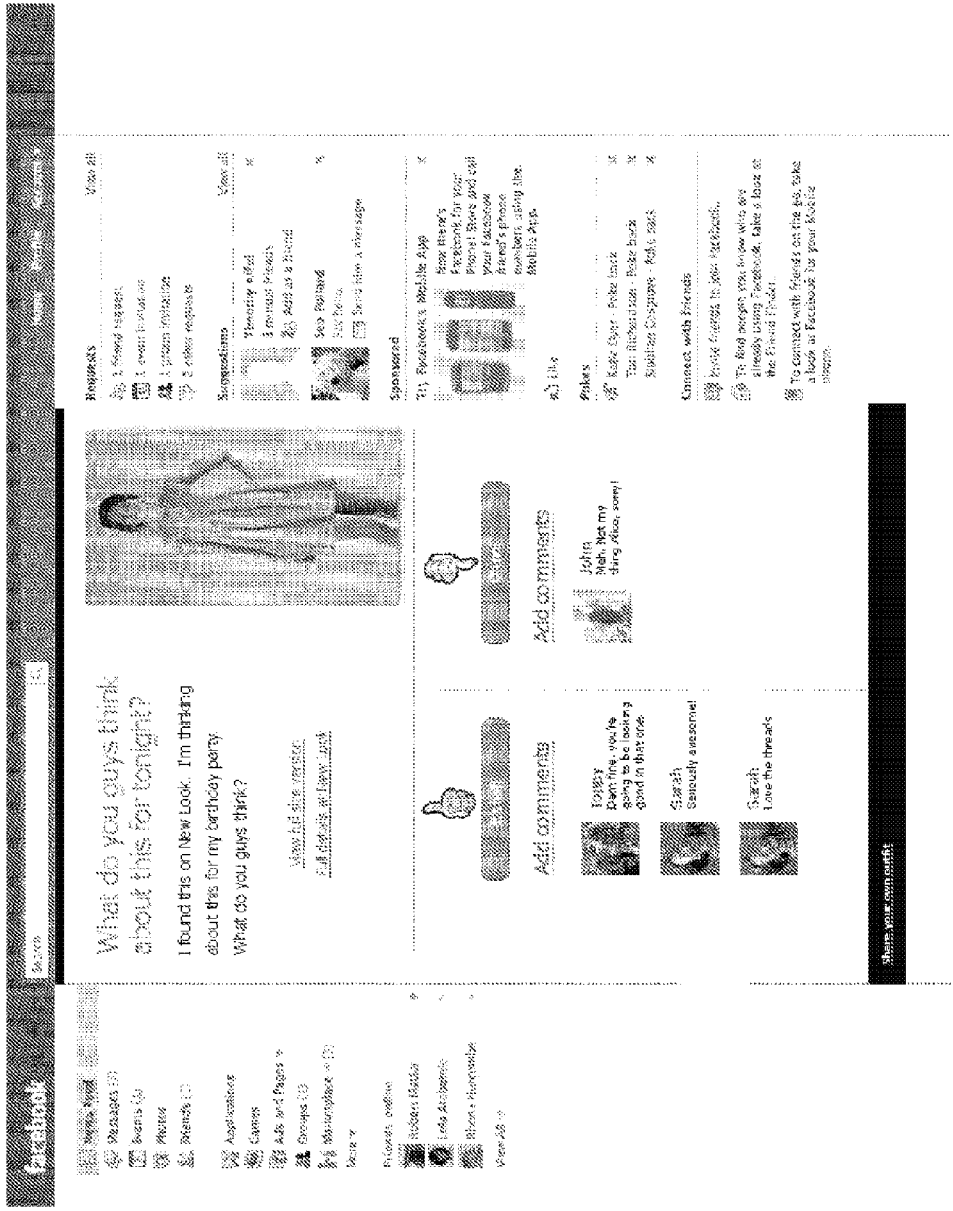
FIG. 8 shows an example of a user sharing an outfit with close friends on Facebook.
Figure 9:
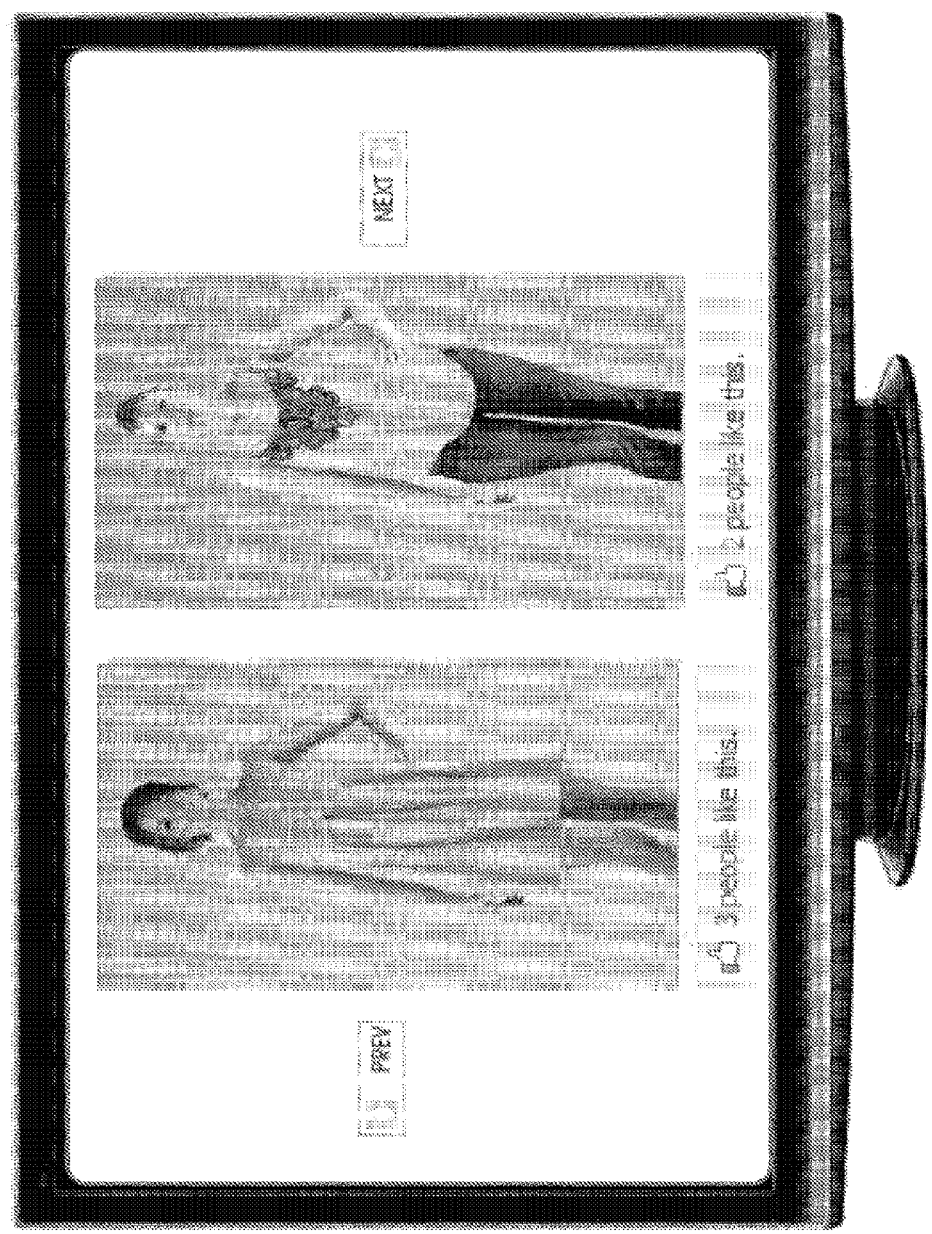
FIG. 9 shows a user may publish her own in-store style to attempt to be voted the most 'liked' outfit of the month.

Creating the Model
An example is shown in FIG. 4.
The consumer takes a photo of themselves in front and side profile in a photo booth.
Their body is created and an online profile is created ready for them to try on clothes.
All products viewed on that day are automatically saved to their profile on the Partner website meaning that users can review (and purchase) the items they saw that day at any time.
Scan Garments in Store
Customer uses Partner application on their mobile device to capture the product barcode in-store.
An example shown in FIG. 5.
Server identifies product and presents product detail to the customer. An example is shown in FIG. 6.
The customer selects the product and then can immediately view the garment on their own personal body model in full 3D. An example is shown in FIG. 7.
Share the outfit with close friends for immediate feedback on Facebook. An example is shown in FIG. 8.
. . . or if the customer is bold she can publish to the website or in-store 'Style Wall' to see if she can get the most 'liked' outfit of the month. An example is shown in FIG. 9.
What are the key differences over known systems?
Systems today are all based on virtual mirror systems in-store, which revolve either around
 taking photos of you as you turnaround to then present them back to you and share with a community or;
 an augmented reality approach or increasing the size of clothing image on screen to match a size to place over a video image of yourself as you stand there. No precision but merely a visual cue and simple technology wrapped up in the exciting sounding words of 'augmented reality'
Our technology revolves around you creating your Body model in-store and then 'trying' the clothes on that 3D Body model either on small touchscreens or in-store computers or even on full length life-size screens controlled either by touch or gesture recognition systems like the Microsoft Kinect
Other Aspects of the in-Store Ecosystem
Creation of physical body sizing chart printout from photos taken, i.e. we will know your size and shape dimensions and likely size across the range of clothing presented in-store, so could give each customer who gets their photo taken a print-out of their dimensions and sizes in the various clothing types sold—simple yet highly effective.
Creation of Body model magazine or post cards that users could purchase, i.e. from a Body model created, the retailer creates a glossy printout magazine for the customer to purchase or give-away free in-store, i.e. the user as the star of their very own magazine dressed in all the season's top trends.
The screen can show two models at the same time so that friends can shop together and dress each other.
A 'Look Off' game can be created to allow users to try to create the best look (could be judged by a celebrity).
Loyalty card integration. The card can be swiped in store or code entered online to track the user and update Metail wardrobe. Given a store and online loyalty card when you create a model (track size over time and adapt offer)
A Smartphone application allows the user to try outfits on their model in or out of stores (barcodes could be scanned). An example of this is shown in FIG. 5-7. Publish your looks to a slide show on a touch screen in the Partner store/an advert (could be 'liked' leading to prizes).

Section 37: Personalized Fashion Tips Based on Your Body Size

Personalized fashion tips can be provided based on your body size and measurements. The tips could also be customized to match the features of the garments used in the clothes. The data is gathered from the information you have entered and also from what you previously have bought. The styling tips can be done in collaboration, with for instance fashion magazines.

Personalized clothing tips for specific clothes based on your body size and measurements. Get recommendations for clothes and sizes for specific retailers or brands. The data is gathered from the information you have entered and also from what you previously have bought.

Section 38: Style Radio

A push recommendations system in which designers give custom advice to customers—e.g. 'for your size and shape, this shirt works best etc.' Users can 'dial in' to their favourite stylists for their subjective advice overlay over our objective initial work.

From our perspective, building the system is such that the virtual fitting room service has the subjective measures and then each stylist adds their idea for garment type and brand per body shape and we build this into a database for what then is shown as dynamic advice.

Section 39: Maternity Clothing Feature

The virtual fitting room provides a maternity clothing feature where the user can input measurements and the progress of the pregnancy and the body model is modelled to reflect that. The body model can also be adjusted to reflect a future state in the pregnancy. The user can also get recommendations and purchase clothes that will fit when reaching certain state of the pregnancy.

A manual adjustment can be made also for height, for instance to simulate the growth of a child. See also the predictive feature for growth described separately.

Section 40: Compare Two Body Models with Different Outfits

The system allows for a user to compare body models of herself in different clothes to try out different outfits. The system also allows for the user to see the body model of a different user to for instance see how the outfits of the two users match.

Section 41: Direct Marketing Including a Picture of Your Body Model in Selected Clothes The system allows for the system operator or a third party to add clothes to a user's body model and for instance send it as an email to the user. This could be done via the system without a third party getting access to the user's model or measurements.

It could for instance be if the retailer is launching a new collection and sending out an advert showing your body model dressed in garments from that new collection. The promotion can also be based on your previous shopping preferences.

Retailer could send out effectively marketing magazines personalised to the user with the user in every shot or if aspirational, a model closest to the user's size and shape in every shot. Other NON-CLOTHING retailers can also use this system, i.e. here is you with this lovely ice-cream. This is personalised direct marketing because we will own the user information. This non-clothing part will depend on privacy settings but the way to drive that would be from advertising campaigns pulling the user into the adverts—driving the ability to continue to use that data in future for these purposes.

Precise marketing using this system could be to only send advertisements for garments where only size 10 is in stock to those people having size 10 in that store and in that fitting model. This targets the long tail. This could be sending recommendations to people having bought or having garments of a particular colour in their virtual wardrobe, providing recommendations for garments of that colour.

Section 42: Real Avatar

The system allows the user to use the body model in for instance online gaming or social applications or networks as an avatar. This would allow the user to for instance use his/her own face and body shape when playing online games. The user would also be able to animate and interact using his/her own body shape and face.

Using the virtual model in gaming can be seen from two different aspects 1) one where the body model created for apparel is used in gaming and 2) one where the techniques to create the body model is applied specifically to create a gaming avatar with the user's body.

Section 43: Bespoke Tailoring on Body Model

The system would enable the user to use the body model for bespoke tailoring and try on different materials and clothes and also order the tailor-made clothes from the interface. The system could use basic standard shapes for the different types of clothes and then only adjust them to fit the body model of the user. The system could also enable the user to fully tailor his own clothes.

A separate use for the body model is in online bespoke tailoring or made-to-order tailoring. This can be enabled through designer marketplaces, which are great for young designers to access people without having to spend a lot of money on creating samples, i.e. they can build their own market.

Section 44: Aspirational Modelling

One aspect of the virtual fitting room and the body model presented to the users is that the impact of a photorealistic model is hard to predict. In one example the virtual fitting room provides tools that allow the users to dwell in the more conventional aspirational realm from time to time—being able to switch between their Body model and a picture of a model of similar stature.

Section 45: Hairstyle Recommendation Engine

Use of facial geometry gained from the single face input image to cross validate against hairstylist information about what hairstyles suit what head shapes to generate recommendations back to users about what hairstyles might suit them. Like style radio, users can dial in to the advice of celebrity hair stylists, e.g. James Brown (currently in UK television programme Great British Hairdresser) for advice on what to do with their hair.

Also relate this hair advice directly to clothing choices. The combination of recommendation for hair and outfit provides unique value to the user. With the full Body model setup, i.e. what hairstyle to choose with that black cocktail dress or green ball gown etc, the users can share full looks that represent them.

Celebrity hairdresser could give recommendations. The user can view herself in different hair colours based on the colour set from a hair dye dotcom website. Then match with hair style company. Then match with clothes.

Section 46: Try Out Different Makeup

The user can try out different sets of makeup. Different brands, different makeup looks on their face.

Section 47: Beauty Recommendations

The user can get recommendations for makeup based on their size and/or their skin tone and face shape.

Leverage for makeup to skin tone matching: Apparel matching to skin tone; Leverage for makeup to skin tone matching.

Section 48: Beauty Recommendation Engine

Use information gained on facial geometry and skin colouration to provide make-up and beauty advice on what mixture of make-up colours would work best. Also relate this beauty advice directly to clothing choices.

The user is able to combine a makeup with clothes and also a haircut or colour. This is part of the virtual fitting room offering a full Body model setup, i.e. what makeup to wear with that black cocktail dress or green ball gown etc.

Section 49: Facial Hair

The male user can try different facial hair styles on the face. The user can also get recommendations for facial hair in combination with outfits.

Section 50: Glasses

The user can try on different glasses such as reading glasses and sunglasses with different outfits. This lets the user match an outfit with a pair of glasses. The user can also get recommendations for what glasses she should wear.

Section 51: Tattoo

The user can in one example select tattoos to be applied to the body model. A tattoo is treated in the same way as a garment and can be displayed and layered. The layer settings decide if a tattoo can be displayed at any other level than the inner layer.

Section 52: Two Screen TV

The two screen TV concept is built round user interaction on two screens. One screen, the TV, will broadcast a show and the user will be able to on the other screen interact with features relating to what is being broadcasted. The interaction screen can be on a laptop, pc, tablet, phone or any other device (typically a portable device) which allows the user to input information and also receive information in relation to what is being shown on the TV. In one example, the second screen is a smart remote supplied with the TV.

The user will be engaged in the conversation around the broadcasted show at the time when the show is happening. The user can be shown images or outfits in relation to the program and for instance vote on the different outfits. The users can also comment on the outfits and in some cases what has been interacted upon.

The users can also bet live on events that are occurring on the TV screen. The odds could be changing in real time and also winners may be announced in the TV broadcast or on the interactive display. The users can bet against other users and see the other friends and/or their body models.

The users can also bet on different outfits and also on different looks on different body models. The users can in one example see a real outfit on a person or a mannequin on the TV show and select to dress the user's body model in that outfit.

In one example the TV show can show one or several of the user's looks on the TV show, either in real time as the look is being prepared or in a ready state where the user has dressed the body model in the look.

The two screen concept can also be applied if the user is viewing a recorded session. The focus will then be that the user is interacting with what is being presented on the TV screen and the events as they are unfolding on the TV show.

The two screen TV concept will also be connected to a shopping experience where the user also can link in to shopping of the garments and other products shown on the TV show.

The two screen concept can be applied to TV shopping channels where the user can view garments being presented with shopping information and the user can interact and try the garments on their body models on the second screen as they are viewing the programme. The users can also go back and see previous programmes and the garments that have been shown on the previous programmes and also try those garments on the user's body model.

Overview Example

Launch Concept

Consumers try clothes on 3D models in the BeautyTV styling room.

Scope

Capsule wardrobe of 40+ items with monthly refresh 8 models shot to match the 8 body types currently employed Users can tweak the models to match their body measurements Clothing sets chosen to suit the 8 shapes Users able to try clothing sets on the different body shapes to 'prove' the styling advice Co-created content and links to relevant TV programming where appropriate Users can create their own 'Body models' of themselves direct from photos.

TV Show Partner's Style Me Your Ultimate Personal Fashion Experience.

1. Ease and Convenience

Try the latest fashion trends and styles on yourself in two easy steps, all from your living room!

2. Try the Looks as you See Them

See TV Show Partner's fashion latest High Street trends on yourself while you watch the show 3. Join the Conversation Share your looks to get votes and advice from friends and the TV Show Partner Facebook community, and return the favour 4. Feature on the Show See whose look is the most loved at the end of each show and get involved with competitions Pre-Show Experience Re-activation and preparation: Morning email; Introduce the theme; Style Me guide; Teaser content; Preview ads; What's coming up; Making your model is easy; Social Media; Facebook wall post; Announced on Twitter.

The Dannii Minogue celebrity wardrobe is added to Style Me. Viewers can create outfits on their body model from the wardrobe and enter them into the competition. Dannii chooses the best look and the winner gets Dannii's Style Me wardrobe in their size.

Post Broadcast Experience

Save your favourite looks in your wardrobe for future reference; Celebrity wardrobe competitions; Expert Q&A and forums; Voting and Rating of garments—help influence future selections; Special offers; Community; Integrated with the YouTube channel TV Show Partner's Style Me
  Create The Ultimate Personal Fashion Experience
  Enhance TV Show Partner's current position as fashion influencers, making the latest trends even easier to access through enhanced personalisation tailored to each viewer
  Increase engagement in the already very active TV Show Partner social media community, complementing the TV screen content with the 2nd screen experience
  Build a comprehensive database of information on size, fit and style of viewer-ship Section 53: Styling Room for Publishers Currently styling magazines are engaged in giving recommendations to their readers but the readers do not have a good way for selecting the recommended outfits and for buying the outfits.

The virtual fitting room concept can provide a valuable channel for publishers in the form of a styling room where they can show, let the readers play and try out the recommended clothes and also get part of the revenue from the recommended clothes.

The virtual fitting room can provide an environment where the magazines can provide interactive spaces for the pieces they run in the physical magazine with connections to retailers and also the possibility for the readers to use the outfits and play around with them.

The virtual fitting room is also providing an interaction platform for publishers and they can let their users create outfits that the retailers can use in their publications or dress real people in.

The publishers can also act as an intermediary who is digitizing garments. The publishers often receive garments from brands to review early and to include in new trends. This provides for the publishers to be able to combine clothes from different brands and can also combine high end and low end of the brand spectrum.

See also Section 56

Section 54: Ageing Body Model

The body model can in one example be shown in different stages of ageing. This is a useful feature if you as a user are shopping for clothes for your kids and would like to know how well the clothes would fit in the future when they for instance have aged one year and also have grown accordingly.

The system to calculate the ageing process will in one example take the data from databases of information about the height and weight of children in different age groups. The data can in another example be derived from the user base in the system and the ages of the users.

The data to calculate how the user would grow over time can also be derived from the size updates the user has done historically in the service. The calculation from those changes can be linear or use inputs from another source to alter variables accordingly.

It is understood that in a preferred example the growth of the body model can be modelled based on a number of different data inputs, either on its own or in combination.

In one example the face is being changed to represent the common features for a person of the relevant age.

Section 55: Give the Body Model a Tan

A useful feature that the user can be presented with is to give the model a tan. The body model's skin would be slightly coloured when the user selects that feature. In one example the user is presented with a yes/no switch for applying the tan to the body model's skin tone. In another example the user can select how deep the tan should be, either in steps or on a sliding scale.

Section 56: Testing of New Looks for Future Collections

Any retailer struggles to understand what their customers would want to buy when the clothes are in the stores of their shops. The virtual fitting room provides a channel for the retailers and fashion brands to test their garments before placing orders for them or before stocking the shops.

The retailer could put the garments for the next collection in to the virtual fitting room and let the users test, rate and share the looks. There could also be a more closed testing where only a select group of users were allowed access to the garments to be tested.

In the system there can be provided controls for the retailer to decide whether the user trying out the new unreleased garment is to be allowed to share the garment with anyone, share the look with anyone or how they can interact with the garment in some other way.

The retailer would get feedback from the system on the user behaviour with the garments and if that option has been provided for that garment, how the users rated the garment.

The virtual fitting room is driving the stocking and flow: Section 56: The retailer can understand what garments are being tried out in different parts of the country. Also to understand what garments are sold online in the system. In regular stores the manager decides how many of what size. In more modern stores that is set by a total stocking system.

See also Section 53.

Section 57: Key Features Used in Back-End Processing and Photography

There is provided a method of generating a photo-real virtual garment to be combined onto a virtual body model, in which (a) one or more digital photographs are taken of the garment; (b) one or more sprites are extracted from the garment photographs, showing some or all of the garment and separated from any background; (c) a processing system models the behaviour of the sprite as a virtual garment, applying finite element analysis to model how the virtual garment would sit or form itself over a virtual body model of defined shape and/or measurements, when values for variables, including one or more of physical garment elasticity, weight, density, stiffness, material type, thickness, are input.

There is also provided a method of generating a virtual body model, in which a user takes, or has taken for them, a single full length photograph of themselves which is then processed by a computer system that presents a virtual body model based on that photograph, together with markers whose position the user can adjust, the markers
  corresponding to each of the following: top of the head, bottom of heels, crotch height, width of waist, width of hips, width of chest.

The method may be one where the user enters height, weight and, optionally, bra size. The method may be one comprising a computer system then generates an accurate 3D virtual body model and displays that 3D virtual body model on screen. The method may be one where a computer system is a back-end server. The method may be one where the user takes a photograph on a computing device such as a mobile telephone and uploads that photograph to a back-end server.

There is also provided a method of developing a standardised sizing table, scale or chart for garments, including the steps of (a) processing individual virtual body models from a group of users; (b) generating a description of the size and shape of users across various parameters, including: age, location, any other personal demographic, garment retailer and (c) generating one or more standardised garment sizing tables, scales or charts using that description.

There is also provided a method of garment segmentation, in which an image of a garment is cut, separated or segmented from the background image, where the garment is scanned or imaged with depth information and that depth information is used in a processing system to automatically differentiate pixels in the image that correspond to the garment from pixels in the image that do not correspond to the garment and to then cut the image of the garment from the back-ground and then use that image in generating a virtual 3D image of the garment.

The method may be one in which the garment is imaged with depth information by using a stereo camera. The method may be one in which the garment is imaged with depth information by using a depth sensor that includes an infrared laser projector combined with a sensor which captures video or still data in 3D. The method may be one in which the virtual 3D image of the garment is combined with a virtual body model of a user.

Section 58: Back End Processing

By way of example, eight angles the body model and the garments can be viewed from are shown in FIG. 17-18.

The overall goal is that the customers are to buy clothes they like. This is done through 1) Building a model of the user's body, 2) building a model of the garment size and fit and 3) visualizing the garment on the user's body model.

The visualization can be used to communicate size and fit properties of a specific garment to the user. The information can be such as how far down the legs the hemline might come and what size the user most likely will have with that particular garment. Part of the information that also can be conveyed is how tight or baggy the garment will be on that particular body shape.

Another way of visualization of garments is to build a 3D model of the garment, such as by using a stitching plan and visualizing it using that. In models like these there can be included fabric specific features such as the fabric's weight and elasticity for instance.

Section 59: The 2.5D Solution

Photographing the garment from a number of different viewpoints on a mannequin may be performed. The photographs from several different viewpoints give the user the impression that the body model is rotated and it can be experienced as being in 3D. Using this solution to adapt the two dimensional model of garment shape to be represented on a number of body models with different shapes is one of the main focus areas for Metail. The approach is to stretch the garment to match the body model fit of the garment.

This approach has the advantage that there is no need for access to the stitching plan information of the garment. One photograph is needed to visualize the garment on a body model. The Metail solution with manual post processing of the pictures of the garments enables the virtual fitting room to visualize outfits and combinations of garments.

See also Section 73.

Section 60: Metail Digitization Process

The garments can be prepared before the digitization process by steaming (e.g. to remove creases) or by visual corrections to the actual garment (e.g. to remove dangling threads). A mannequin is then dressed with the garment to be photographed. The photographic setup follows a specified layout where the garment is photographed from eight different angles. The mannequin is rotated to set positions and a photograph is taken; the photograph is then fed into an annotation system.

The photographic setup also includes a camera where the focal length is fixed at one level and the position is the same for each photographed garment.

It is important that the mannequin is photographed in the exact position for every angle and for every garment. This is because the post processing and the visualization of the garment on the mannequin are from a specific angle. This is also to enable one garment to be compatible with another garment, especially when combining garments as an outfit and so the garments can be viewed from the same angle when the body model is dressed in the garments.

Off the shelf mannequins have several joints between the foot and the head where only a slight misalignment in the photographic process will create a significant misalignment of the garment from other garments photographed. Depending on the material of the mannequins they also tend to deform and change shape over time due to ageing and material differences.

In order to keep the joints in exactly the same place on different mannequins and on the same mannequin from one photo session to the next, one solution is to use mannequins manufactured with detents. ('Detent' is the term for a method, as well as the actual device, used to mechanically resist or arrest the rotation of e.g. a wheel, axle or spindle.)

A different problem when photographing a mannequin on the turntable is that after each turn the mannequin might wobble slightly. Taking a photograph when the mannequin is not in a fixed position might give the garment a slightly different view and position in the photograph. This is overcome with a time delay between when the mannequin has turned to when the photograph is taken. The mannequin is then still in one position.

Image Alignment

If the garment photograph is not in perfect alignment with the ideal position of the garment, image warping may be applied using the thin plate spline method. This alignment allows for repositioning and reshaping of the garment in the photograph. With this method the whole garment or part of the garment can be repositioned.

Section 61: Multi Layer Garments

Many garments have multiple layers that need to be modelled, such as a long sleeved shirt with a torso, where the back sleeve and a front sleeve occupy different depth layers in the scene. This has significance especially when the garment is not the same size as the body model.

Layered garments will also change their position when the body model is changed in size. For example, the arm in relation to the torso may need to be slightly tilted outwards or backwards when the body model is fatter.

Partitioning the garment in depth layers is also important for the combination of outfits. For example if combining a jacket and a shirt, it is important that the back sleeve of the shirt is behind the torso of the jacket.

This can be solved through taking different photographs to represent different depth layers of the garment. For example, for a pair of trousers different photographs may be of a front leg and a back leg; for a shirt different photographs may be of a front sleeve, a back sleeve and a torso; for a shoe, different photographs may be of a front view and a back view.

Section 62: Deforming Mannequin

A deforming mannequin may be used to model what a garment would look like if the garment would not have the best fit for a specific body model. Capturing also what a garment would look like if the fit on the body model were not the best. The user can select alternative views or alternative sizes for the user's body model to show what a too large or a too tight garment would look like.

Capturing the nuances of a garment when having different fits to different body shapes is important for the visual appearance of the garment on the body model. A loose hanging garment might have vertical creases and a really tight garment might have horizontal creases. Nuances like that are captured when for instance using a deforming mannequin.

Similar results can be achieved when using a mannequin of one size and garments of different sizes, when the mannequin is dressed in different garments for a photo session.

Section 63: Digitization

As a starting point for the digitization the mannequin can vary in size depending on the major demographic of the customers for the retailer. Some retailers are more focused on larger men and women and then it makes more sense to start with a larger mannequin and a larger sized garment. The closer to the starting point a visualized garment is the better the garment will look on the body model.

The "canonical" body model is a computer model representing the same size as the mannequin used during the photo shot. In the ideal situation clothing items could be transferred directly from the mannequin to the computer model without morphing.

Section 64: Garment Positioning

For the garment to be represented in an accurate way on all of the eight views and for the garment to be on the same horizontal level and not move up and down in the views, key points on the body are marked. This is to have for instance a straight waistline across all of the views.

Section 65: Change the Model Size and See the Garment Fit

The body model can change body shape in a variety of ways, and during the post processing stage of the digitization the operator can change the body size to vary to see how the digitized garment would look on different body shapes.

The variations are offset from starting points on a 3D mesh and those different vertices have different modes of variation. Different ways to show the variation can be to change the overall fatness, height, thigh length, breast size, hip width, and other modes of variation. The variations can be adjusted linearly and in combination. Each value can be adjusted independently of the rest. This enables the possibility to achieve any body form and size within the limitations set by maximal and minimal values.

Section 66: Body Model

The body model (also referred to as a 'virtual body model') needs to be constructed to be able to reflect the great variety of shapes of bodies and also to be able to be changed and reconfigured between them. Defining the input data for the model is one way of defining what the body model will look like and how to approach the model creation.

Another approach is to let the user upload a photograph where she is standing in a doorway. Since the doorway is rectangular with straight edges, defining the doorway in the photograph allows for correction of the aspect in the photo. Knowing one measurement in centimeters, such as height, allows for converting that into pixels in the picture. Knowing the size in pixels in the photograph allows for taking other measurements from the photograph.

Another way to get input data for creating the body model is to use a 3D sensor such as the Microsoft Kinect sensor to the Xbox gaming platform. This is one of many available depth-scanning sensors that can be used to obtain measurements. The sensor creates a depth map that can show an object and the depth and size of that object. In the depth map every pixel has a value corresponding to the distance to the point in the scene from the camera.

See also Section 6.

Section 67: How to Turn Weight and Height or Other Input Data into a Shape for the Body Model The body model is in one example built up by facets, so it has vertices and triangles. The body model has 18,000 vertices and one of the steps is to map the input data to those vertices to define the user's shape.

The model to map the input values is based on a probabilistic model of how the human body shape varies amongst the population. Some of the values are predefined such as that the model should have two arms and two legs.

This is done by starting with a mean model of the population which is then adjusted with the population variation. The technique used for this is principal component analysis (PCA). It can be understood that this model is used to find the most significant shape variation relative to the mean.

The modes of variation can be the proportion of the variation over the population. The most variation of the body shape is in height and the second most common is the body-mass-index (BMI) of a person: how much body fat each person carries. Other modes of variation in the model can be torso length compared to leg length, the shape of the torso (apple shape, pear shape etc.). This can be considered as a low dimensional model of body shape variation.

Using the dataset of body variations, principal component analysis is performed on this dataset in order to use the mean body shape and the modes of variation in relation to that mean.

One database that can be used for the body shape modelling is the anthropometric CAESAR database of body shapes obtained through laser scans. This dataset provides the basis for the low dimensional model of body shapes. The low dimensional model can have for instance 10-20 parameters. These are used to describe the modes of variation in relation to the mean model. If the first parameter is overall scale, the second might be the BMI of the body. Having the 10-20 parameters will provide good enough accuracy to generate a body model to a good standard of representation.

When fewer measurements are obtained for a body, the more approximate the model will be. Using only height and weight and applying a model for maximum likelihood estimate of the body shape based on the given the height and weight is possible. Since many body shapes can correspond to the same height and weight, the model will present the most likely body shape for those two measurements.

Since the probabilistic model can provide several different probable body shape models, one example is to present the user with a plurality of body shapes based on the most likely body shapes and ask the user to select the one that is closest to the body shape of the user. This sample of plausible body shapes exemplifies a range of different body types.

Another way of improving the body shape of the body model is to give the user the alternative to select a more muscular or a fatter body shape and use that for the calculation. This will provide input to the model for instance because fatter people carry more weight typically around the tummy, thighs and butt, whereas a more athletic body shape carries more weight around the shoulders and the arms.

To further improve the body modelling more values can be inputted in to the model. One way for this is to ask the user to provide more measurements, such as the waist size.

The more values provided the more constrained the model becomes.

See also Section 7 and 8.

Section 68: Garment Size and Stretch

Different garments have different properties when it comes to size and stretch. This information can be used for modelling a particular size of a garment to a particular body model and to give a realistic representation of what the garment looks like.

For any garment that is smaller than the body model, information about the stretch of the garment is needed in order to visualize the fit. Any garment also has different stretch capabilities on different parts of the garment. For instance a hem will stretch differently from the stretch of the plain fabric of the garment. A garment can also have different types of fabrics that stretch differently. Just knowing the stretch properties of the fabric of the garment is therefore not enough to model the whole garment.

This problem can be overcome by taking stretch measurements of the garment at different points on the garment. Those points can correspond with the points where the user is asked to input the body size measurement.

See also Section 127.

Section 69: Garment Sizing Table

It is understood that each garment will have an individual sizing table for the absolute size values for each garment. This table can further be populated with specific measurements, for instance hip, waist and chest and be populated for the different garment sizes. This enables one to map the size closely to the body model size for a specific Different garments have different properties for stretch and also are intended to fit differently. A t-shirt may for instance be intended to be worn loose or be intended to be worn more tightly fitted; a lycra top is only intended to be worn fitted and also has more tolerance for stretch. Some other garments are intended to be worn fitted but they do not stretch. So to map the body shape of the user tightly to an appropriate garment is important to be able to provide a good fit for the garment.

Using garment specific fitting tables and by including stretch values and knowing the tolerances for the fit in the specific garment is important to be able to provide a good representation and also to be able to provide a good fit for the garment. This fitting table can be built up with specific mechanical measurement equipment that measures the strain vs. stress for different parts of the garment.

Figure 41:
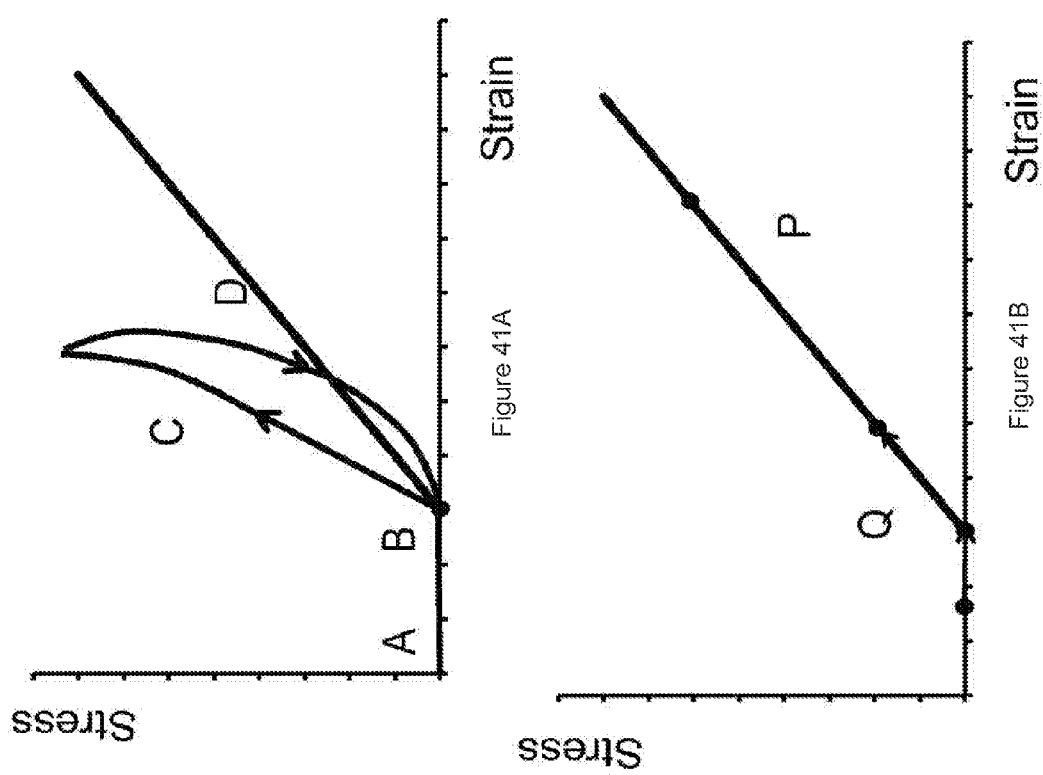
FIGS. 41A and 41B show examples of stress-strain curves which may be relevant to garment stretch and to modelling garments on different body models.
Figure 42:
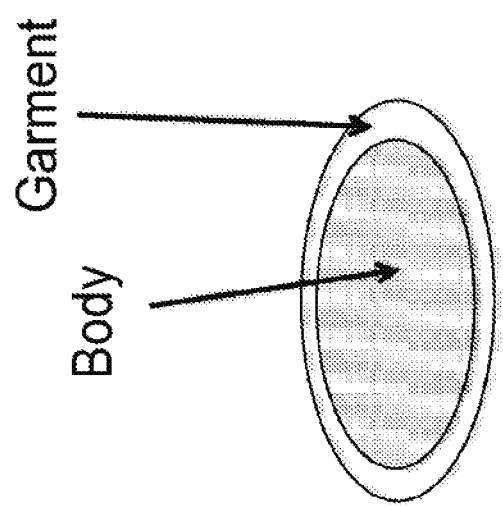
FIG. 42 show an example in which a garment section is larger than a body section.

This measurement is exemplified in FIG. 42, which shows that when the body parameter is inside the garment parameter there is no stretch of the garment and it would not feel tight to wear. This is also shown for point A in FIG. 41A. At point B in FIG. 41A the body parameter is the same size as the garment and the garment starts to feel tight to wear.

The stretch of a garment can also reach a point where increasing the force will break the garment. Stretching is exemplified by path C in FIG. 41A. Also in FIG. 41A for path D it is shown that when reducing the force not all garments will behave in the same way as when increasing the force and will not return to the original shape in the same way. i.e. the stretching and shrinking processes do not follow the same paths in the stress-strain diagram.

The sizing table built from the actual stretch properties of the garment can be used to give recommendations to what is the best size of the garment for a particular user. It is also understood that this recommendation can be augmented with human input to provide a recommendation that also takes into account the subjective element of what a good fit is. The subjective input can for instance be that a particular garment has properties such that a particular user would want to wear it fitting precisely. Knowing this will put the garment on the curve in FIG. 41*a* at point B.

In one example the user can decide if they for instance would like the t-shirt to hang loose, closer to point A on FIG. 41*a*, or have a more snug fit closer to point B.

Section 70: Providing Retailers with Specific Size Recommendation Tables

The virtual fitting room is able to provide data to retailers and brands on the body sizes of their specific customer demographic. The modes of variations of the consumers' bodies can vary between different retailers and this information can be gathered and provided. As an example for fast fashion brands it is more likely that the main mode of variation is the height whereas for a brand for middle-aged people the main mode of variation is the BMI of the customers.

Section 71: Adapting Garment Modelling to Match with the User's Body Model

Each user has an individual body shape and the process of adjusting the garment is therefore central to the user experience. Each garment that has been photographed has a model that is then annotated and can be adjusted to match with changes in the size of the body model.

When the body model deforms relative to the starting point, the silhouette changes. This changed silhouette gives a starting point and an indication of how the garment model is to be modelled in relation to the changed body model.

In an example, the garment information is captured in 2D and the garments are also modelled in 2D.

Starting with the canonical body shape as exemplified in FIG. 43A, the body shape of the body model has one specific characteristic shape. The alternative body shape as exemplified in FIG. 43B has a different characteristic shape.

A garment as photographed on a mannequin with the same shape and size as the canonical body model will have a specific shape. To model that garment on an alternative body shape the garment needs to be transformed to illustrate the fit on that body model.

Seeing that the body silhouette is close to the silhouette of the garment when modelled on to the canonical body model, it can be inferred that the garment is tighter on those parts where the silhouettes are close. Also the stress/strain properties that have been measured for the garment enables the understanding that the garment is tight on the parts where the silhouettes are close. It can also be inferred that the garment is loose if the perimeter of the body is less than the perimeter of the garment.

Dividing the garment model in horizontal segments as shown in FIG. 43*a*, for each segment there is put a value on the fit of that segment. When modelling the garment on to a different body model each of those segments can be individually modelled for the fit of that segment along the stress/strain curve as shown in FIG. 41*a*. The image of the garment is then stretched locally for that section of the garment.

Figure 43:
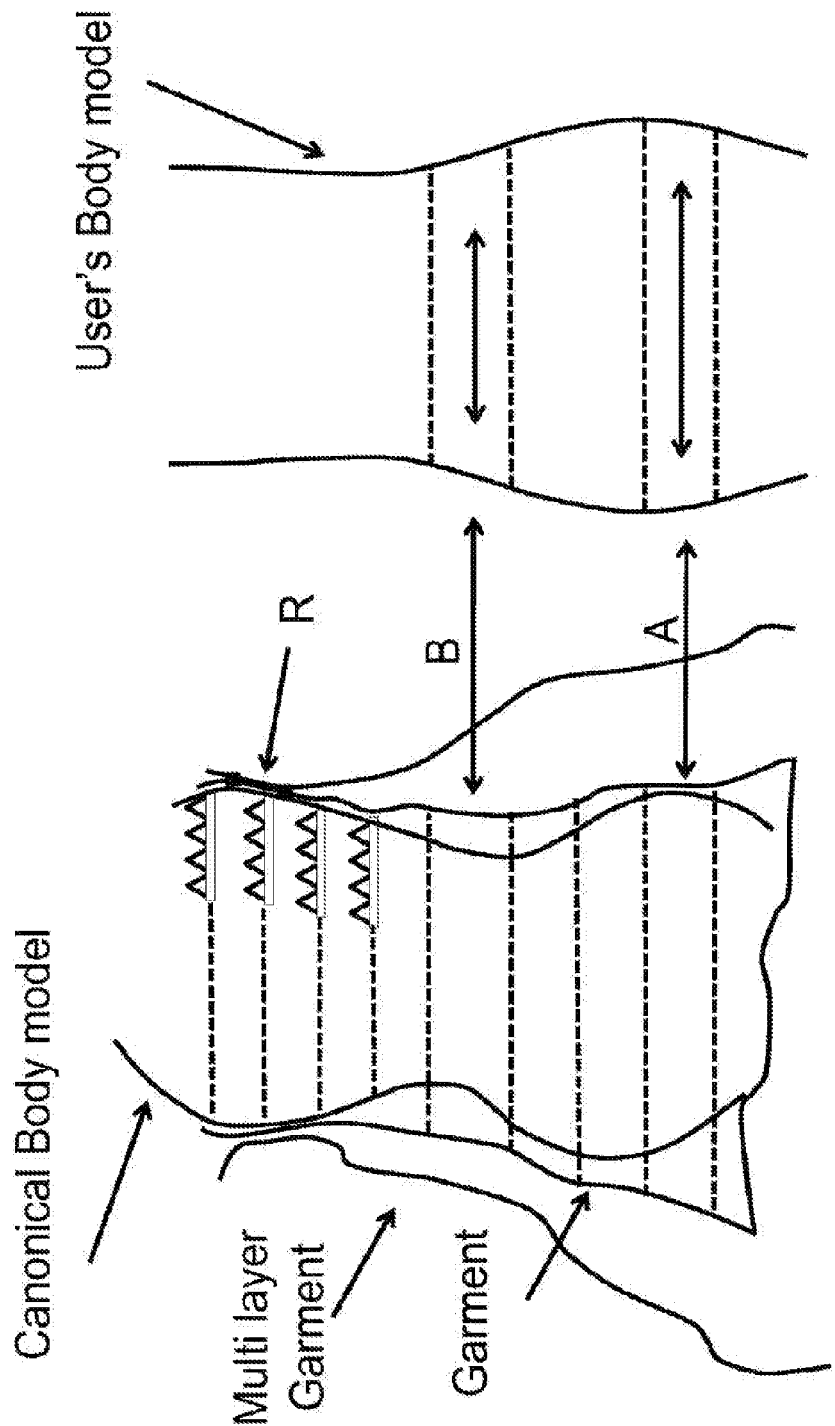
FIGS. 43A and 43B show examples of garment stretch and modelling garments on different body models.

For example, section A in FIG. 43 is under tensile stress in FIG. 43*b* and the garment has stretched. When that section is modelled on to FIG. 43*b* that segment of the garment model is expanded simulating that the garment is stretched. This is exemplified by movement along the line at P in FIG. 41*b*.

In another example, section B in FIG. 43 is not under stress in FIG. 43*a* and the garment hangs loose. This can be shown with a position along the line at Q in FIG. 41*b*. When that section is modelled in FIG. 43*b*, the body will fill the empty space, then the garment is in the elastic region, and the garment needs to be stretched. The garment model is then stretched from the point where the body model meets the garment perimeter. This can be shown with movement along the line at P in FIG. 41*b*.

The sections of the garment model are also coupled together so that stretch in one of the sections will have an effect on the neighbouring sections of the garment, as shown at R in FIG. 43. The model can further be thought of as a series of springs and rods, where the springs do not have a negative pressure i.e. they are not under compression.

The stress/strain measurements measure the inner geometry of the garment which enables modelling of multi layer garments as well.

Section 72: Shadows

One aspect is that there can be a shadow on the thighs of the body model when the model has a skirt on. The same can be applied if the body model wears a long dress and the shadow is then laid onto the legs further down. It is important that the shadow is consistent with the lighting of the garment and the artificial lighting in the body model. For instance if the lighting is diffuse, a shadow might not be appropriate.

Section 73: Photography Process and Tool Example

User Requirements

Figure 28:
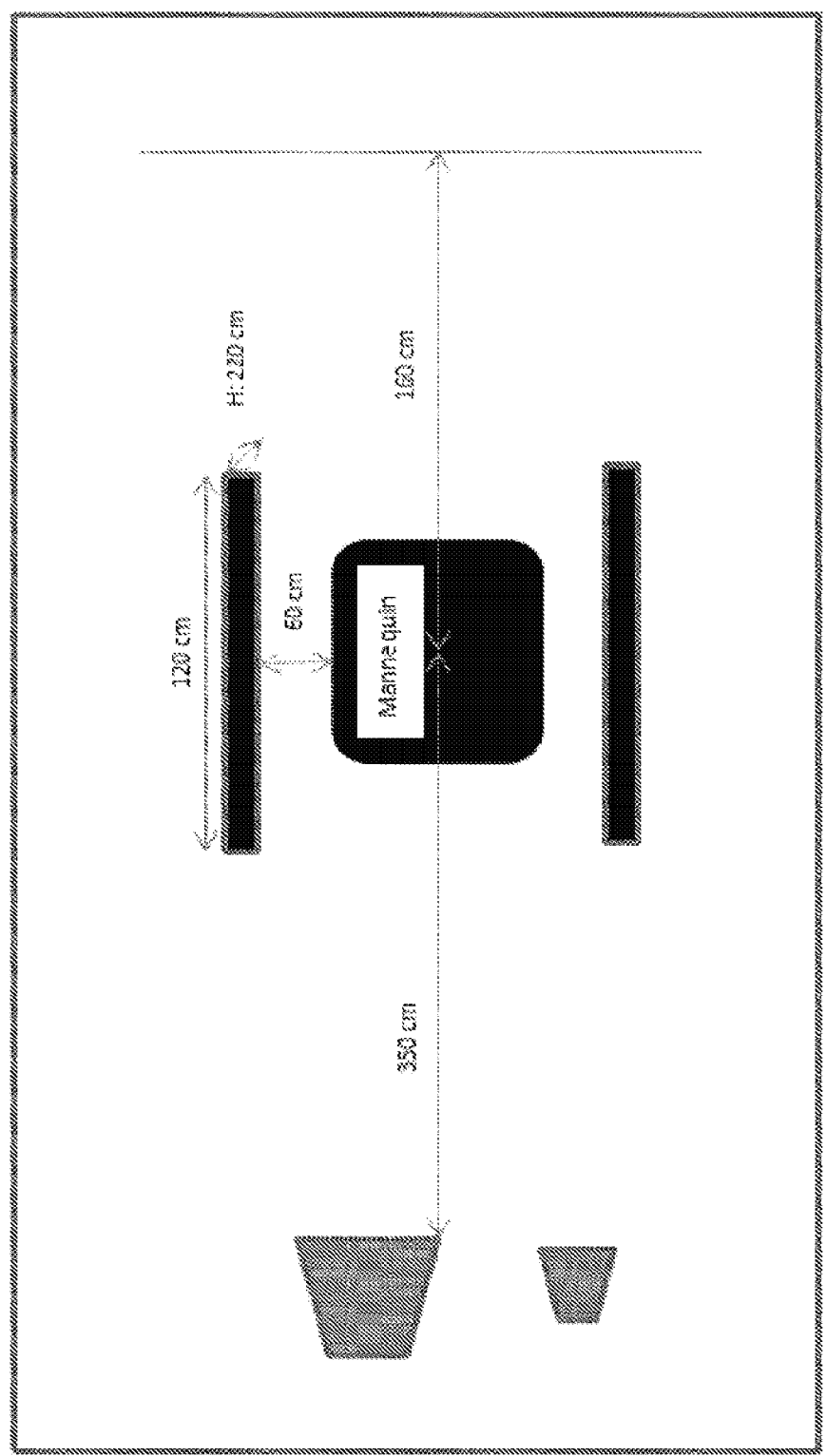
FIG. 28 shows an example of photography process and equipment set-up.

For the photography process the minimum requirements are that the Garment Photography tool is installed and that the computer has minimum two working USB ports. An example of setting up the photography equipment is shown in FIG. 28.

The steps to go through are described below:

1. Prepare Garment

Remove visible labels and stickers, apart from sewn in labels

Hang the garment on a hanger and steam out all creases

Check for loose threads, stains or other blemishes on the garment

Ensure that you know how the garment is meant to be worn (eg where the straps and ties go) and if in doubt, photograph in more than one way 2. Dress Mannequin Choose stub arms to fill the sleeves as fully as possible, but ensure that the stub arms do not stick out from the bottom of the sleeve and obscure the garment Do up all zips and buttons unless you want a specific alternative style Pull the garment down fully to ensure fit and to reduce folds in the fabric Make sure that the garment is straight and looks as good as possible A long sleeved Garments Exception example is shown in FIG. 29.

Long sleeved garments

A garment with a sleeve that is longer than the armpit is considered to be long sleeved This will need to be photographed twice, once with the sleeves down, and once with the sleeves up Try to keep the rest of the garment unchanged when you remove the arms Make the folded up arm as flat as possible so that it does not obscure the garment Make sure that the folded up arm does not cover the armpit of the dress or below 2.2 a Translucency Exception is Shown in FIG. 30.

All translucent garments must be photographed on both:
a) A white mannequin with a white background—as usual
b) A black mannequin with a black background—e.g. use the black side of a poly-board to create the black background and use opaque black tights and a long sleeved black top to create a black mannequin.

2.3 a Photography Process for Shoes is Shown in FIG. 31.

Shoes are not photographed on the mannequin

Shoes are photographed separately from each other so that they do not obscure the other shoe in some views Place the shoe on a white covered box over the spikes on the turntable so that it is facing forward completely straight Shoes must be photographed with a shape as close as possible to how they look when worn by a foot—stuff the shoes with tissue paper/card but do not obscure any outside shoe:

3. Prepare Equipment

Check that the equipment is set up according to the specifications

Turn on the power sockets for all relevant equipment

Plug the camera and turn table cables into your computer's USB ports

4. Prepare Spread Sheet, Such as Shown for Example in FIG. 32.

This is to record garment information and photograph names

Ensure that the names that you give garments as you save them are simple, logical and consistent Ensure that the names in the spread sheet are exactly correct 5. Open the associated computer programme.

6. Capture Photographs.

The turntable will now rotate 360 degrees whilst eight photographs are captured at different angles.

Figure 33:
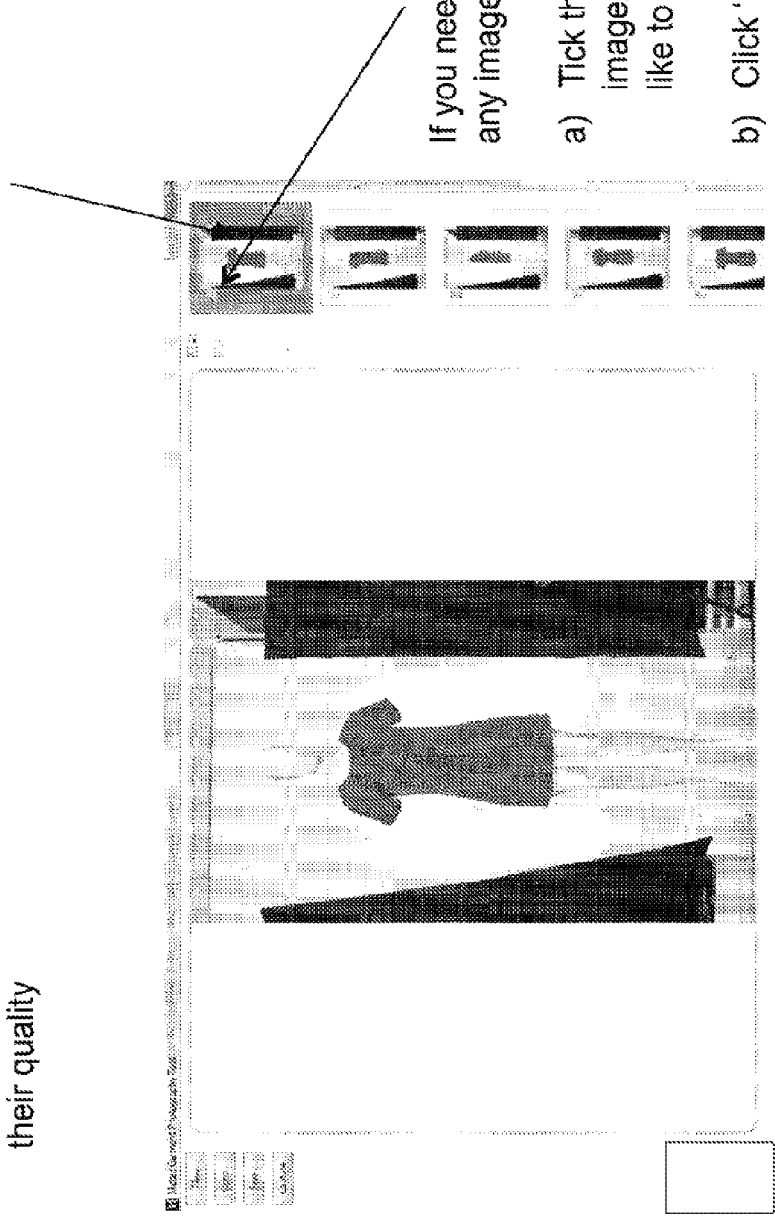
FIG. 33 shows an example of a step in a photography process.

7. Quality Control the Photographs as shown for example in FIG. 33.

8. Save Photographs.

10. Post Process Garment

The garment is now ready for post processing with the Garment Model Editor.

Post Processing of Garments

For each of the eight photographs of the garment the sprites are cut out, the edges are cut out to make the garment free from the background and the mannequin in the photograph.

See also Section 59.

Section 74: Mannequin Adaptation

Background

One other previous solution to this problem has been to wrap the arm around the mannequin's neck for instance. This has the problem that the sleeve still covers some of the torso material and there might also be some misalignment where the two layers in the photograph meet.

The meeting point of the two layers needs to be as much in alignment as possible for the garments to display nicely. One approach could also be to tuck the leg in to the mannequins to be able to photograph the garments.

Metail seeks to supply its users with accurate visualization and size recommendation of garments, through interaction with a software package, on-line or otherwise. Metail achieves this goal in three steps: firstly a three-dimensional model of the user is generated; secondly garments are photographed, processed and fitted to a default body (a step called digitisation); and lastly the digital representation of the garment is deformed to agree with the users body shape gained from the first step. This description is concerned with a refinement to the second step, garment digitisation.

As mentioned above, garment digitisation can be broken down into three steps: photography, processing and fitting. However they are linked in that the quality of the previous step directly impinges on the output of the next step. For example if photography is performed to a low standard the output of the processing step will also be of poor quality. Therefore taking high quality images is an important first step. In the simplest case one image is required per "view" of the garment however a special case is garments which have more than one "layer". By layer we mean a portion of the garment which covers, or is covered by, another portion of the garment. An example of this is long-sleeved garments, which have a sleeve closest to the camera. This hides a portion of the garment torso, which in turn hides a portion (or all) of the sleeve furthest from the camera.

Long-sleeved garments need two images to be taken per "view"; this is to capture all of the garment fabric. When the arms are down by the side of the garment, in six of the eight views, part of the garment torso is occluded by the garment sleeves. To overcome this problem Metail has devised the following scheme: an image is taken of the garment with the arms up (secured away from the garment torso), from this a layer that represents the garment torso can be taken. A second image is then taken, with the garment sleeves down next to the torso; from this image, two layers representing the garment arms are produced. These three layers are then placed one on top of the other (the order depends on the viewing direction), and together forms the digitization of the garment.

The purpose of producing these different layers, and hence preserving a digital representation of the garment fabric in occluded regions, is to allow fitting of the garment to different body models. When the garment is stretched or contracted by different amounts in different regions to agree with a user's body model, the different layers will stretch or contract different amounts and so slide past each other. If a depiction of the occluded garment texture wasn't preserved in newly non-occluded regions then this sliding would uncover regions of the body with no fabric covering them. This would be an undesirable result.

Figure 21B:
Figure 21A:

The two images of FIGS. 21A and 21B illustrate the way that two different layers, namely sleeve and torso, can be stretched or shrunk in order to match the body shape they are "worn" on.

Above, the example of a long-sleeved garment was used. However the same could be true of any multi-layered garment, such as trousers. The discussion below uses long-sleeved garments as an example to clarify the detail, however the skilled person will understand that each argument applies to other multi-layered garments.

Problem

Above, the details of digitising a multi-layered garment and in particular a long sleeved garment were outlined. In this section the associated problems with this scheme are expanded upon and in the next section a solution to these problems is detailed.

When obtaining the two separate images for a multi-layered garment, there is an important issue to overcome. This is the marriage of the layers where they join, which for a long-sleeved garment is at the shoulder. To obtain a realistic join of the arm layer with the torso layer the digital representation of these two layers must be identical in the region of the shoulder. This is often hard to achieve as when a garment has its sleeve rolled or pinned up there is distortion of the fabric in the region of the shoulder. Alternatively the garment sleeve could be removed. However this has two disadvantages: the garment is now effectively worthless and secondly if any of the sleeve-down images need to be reshot, this is now not possible. However a scheme has been devised to allow the garment torso to be photographed while creating minimal distortion in the region where the layers join, while at the same time keeping the garment intact.

Solution

The solution to the problem outlined above is to create apertures in the mannequin (either in the arm, torso or leg) into which occluding layers can be placed when obtaining images of occluded layers. To illustrate the point: a long-sleeved garment might have its sleeve inverted through the arm scye (which is an armhole (or, occasionally, a leghole) in tailoring and dressmaking) and tucked into the aperture in the mannequin's side or arm. This, coupled with an attachment to the mannequin shoulder, allows the garment to be identical at the shoulder region in both arms up and arms down images. The aperture in the mannequin structure is necessary as to allow the sleeve to be inverted without distorting the side of the garment torso, as would be the case if it were simply inverted and allowed to hang or even tied to the mannequin torso. In general, the occluding layer must be able to be inverted inside of the occluded layer and stored within the mannequin structure so as not to distort the shape or appearance of the occluded layer.

Figure 22:
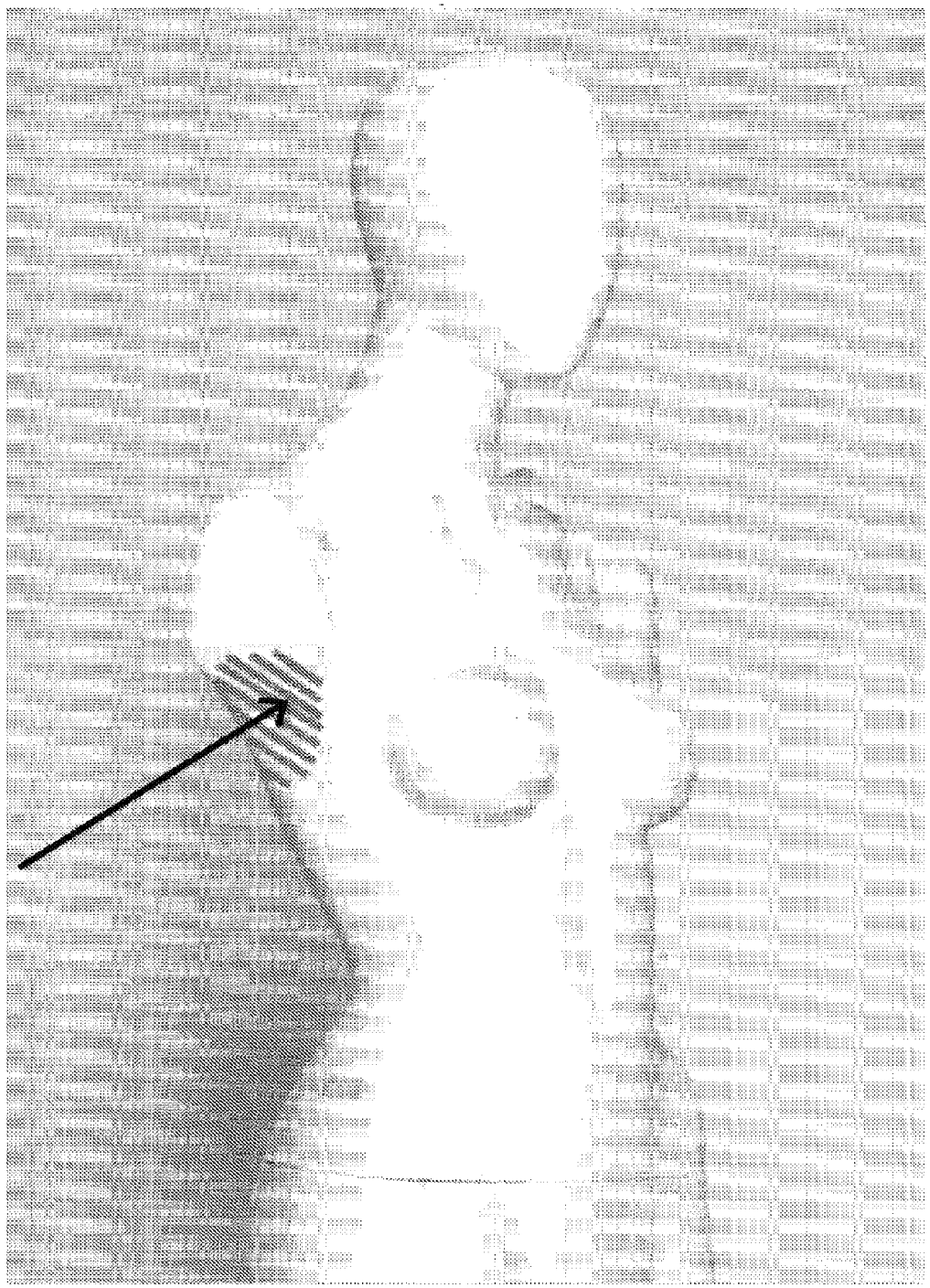
FIG. 22 shows a shoulder attachment position and a possible location of an aperture.

This scheme therefore produces the following results: the sleeve down image and sleeve up image may be close to identical in the joining region of the shoulder, thus reducing image processing time and increasing its success; the time taken to tuck the sleeve into the aperture is envisaged to be small, thus reducing processing time. FIG. 22 shows a shoulder attachment and a possible location of an aperture.

Again it is emphasised that this scheme may be generalised to other multi-layer garments. For example it is envisaged that an aperture might be created in the bottom of the mannequin torso and the legs made to be removable. This is so that one leg, supporting the mannequin, may be shot, whilst the fabric of the other is placed in the mannequin's aperture. The roles of the legs might then be reversed for the second set of images.

The advantage derived from this approach is to reduce processing time of multi-layered garments: this gives a competitive advantage as it will drive down digitisation costs.

Depth from stereo to aid garment segmentation: Using depth from stereo image capture (one of many means) as an aid to garment segmentation in the 3D domain would require far less user intervention in post-processing, even though we'll probably still want to represent our models in the same way.

Section 75: Garment Segmentation and Alternative Methods

Garment segmentation is cutting out the garment from the background. If you have stereo images you have more pixel information by which to automatically understand what pixels belong to which part of the scene, i.e. background, foreground and garment. Our approach allows for features such as taking image photography of the garments on real moving people rather than having to restrict the scene with a defined mannequin. This could help with retailer logistics. This also allows us to build a visual hull in 3D of a garment to give more information about how the garment then will move and react and deform depending on the size of the person inside.

Section 76: Garment Translucency

Problem:

When digitizing garments with translucent or transparent sections it is necessary to provide a method to deal with these sections.

Metail's present method of post-processing garments is to section garments from the background (defined as anything which is not garment, i.e. mannequin, back-drop, lighting apparatus etc.) by means of a spline drawn round the desired sections of an image. The image has a .jpg file format that consists of three colour channels (red, green and blue or RGB).

The problem of using this method of separating a garment with translucent sections from its background is that elements of the background will be included in the foreground. For example a black translucent garment photographed on a white background will have pixels with elements of white and black in them, giving a RGB value at some point on the greyscale. This is undesirable as the translucent sections should respond to their background. For example if they are placed over a skin colour they should appear not grey but a mixture of black and skin colour.

Present Solutions:

Two strategies have been formulated to overcome this problem. Both rely on changing the image format from three channels to four. Including an alpha channel, that describes pixel opacity, allowing background colour to be expressed when the garment is laid over it. This so called 'alpha matte' contains values between 0 and 1, where 0 indicates total transparency and 1 total opacity. For pixels with an alpha value of 0, none of the foreground colour is represented and 100% of the overlaid colour is seen. For pixels with an alpha value of 1, 100% of the foreground colour is represented and none of the overlaid colour is seen. For intermediate values of alpha a mixture of foreground and overlaid colour is represented. The two strategies differ in the way the alpha channel, and therefore the alpha matte, is calculated.

The first method is for "whole-panel opacity".

This is applicable when large areas of the garment (or perhaps the whole garment) share similar opacity. In this case the garment is photographed on a background of a similar colour. At present this is achieved by first dressing the mannequin in tight fitting clothing of a similar colour and placing a board of similar colour behind. For example a black garment dressed on a black mannequin with a black board placed behind. In the future it is imagined that a mannequin and background, whose surface colour can be changed, might be used. The garment is then "splined" in the same way as a normal garment before its opacity is modified manually by the annotator. The product is an alpha matte where the alpha value of each pixel outside the spline is set to 0 and the alpha value of each pixel inside the spline is the same and set by the annotator.

The second method is "per-pixel opacity".

At present this method is applicable for loose garments of a single colour. The garment is photographed against a background of a contrasting colour, for example a black garment on a white mannequin with a white background. In the future it is imagined that a mannequin and background, whose surface colour can be changed, might be used. The image is then altered by software. This software performs the following steps:

a. Estimates RGB values for the background and foreground.

b. Uses these values to estimate alpha channel values on a pixel-by-pixel basis.

c. Subtracts a corresponding amount of background colour from each pixel.

d. Normalises the colour in each pixel.

The product is an alpha matte which has alpha values ranging from 0 to 1. The image is then splined as above. This results in an alpha matte where each pixel outside the spline has an alpha value of 0 and each pixel inside the spline has a customised alpha value ranging from 0 to 1.

Further Solutions:

One further innovation has already been mentioned: using a mannequin and background of changing colour in image capture. It is imagined that the surface of the mannequin might emit light at frequencies that can be controlled by the operator. Alternatively the mannequin and background surface might reflect light of different frequencies in different manners, for example they might reflect light in the ultra violet region of the spectrum differently to the way it might reflect light in the visible region of the spectrum.

Another innovation is to use a more general method for estimating foreground and background colours. For example, machine learning techniques can be used to "teach" the software which RGB colour values correspond to background, which correspond to foreground and which contain elements of each. In such a way it is understood that alpha mattes for translucent garments of more than one colour could be produced.

Another innovation is to use the ability to change mannequin colour without re-dressing it (the first innovation above) to create alpha mattes in the following way. Two images of each garment in the same position will be taken. The first image will have a background of a certain RGB value, the second image will have a background of a differing RGB value. The difference in RGB value between the two images will be calculated on a per-pixel basis. Those pixels that have a difference known to be the same as background pixels will be labelled background and their alpha value set to 0; those pixels that have a difference of 0 between the two images will be labelled foreground and their alpha value set to 1; those pixels which have an intermediate difference will be labelled as translucent and their alpha value set between 0 and 1 corresponding to the magnitude of the difference between their RGB values. In such a way an alpha matte of the image will be produced.

It is believed that this last innovation will provide the most general solution for creating alpha mattes of translucent garments.

Other features include:

Locating the Subject Silhouette Automatically

The photographed subject, for instance the garment on the mannequin, has a silhouette that can be located automatically using an edge finding approach.

Using detents to assist in mannequin positioning

Any mechanical means of making mannequins easier to assemble or clothes easier to photograph, e.g. the idea of using detents for getting arm position right even after the mannequin is dressed. This is important for having an exact position of the mannequin between different photo-shoots.

The use of camera calibration technologies with a reference frame

The use of (various) camera calibration technologies to facilitate precise alignment of image-based garment models with a reference frame.

The use of green screen and/or colour segmentation technology to facilitate garment digitization for visualization applications.

The use of image morphing to facilitate the adaptation of image-based garment models to fit real human bodies. Fitting clothing to body models with respect to size and a visual illustration of how the item would fit the individual.

The use of a low dimensional representation of human body shape to facilitate capture of a user's body shape via a simple user interface (UI).

The information gathered from users uploading their photos can be used to create body shapes via a simple UI. The system possesses information about common body correlations allowing for more precise body models even if the information is insufficient.

Section 77: How Metail Uses Metadata for Hairstyles

Hairstyles have attributes set to configure how they are coupled with the virtual fitting room Generic Modeling Environment (GME) "garment" ids, and how they are filtered in the UI based on skin tone and hairstyle.

Examples of metadata files are shown in FIGS. 34 and 35.

Metadata needs only to be edited for one view (e.g. view 0) of any one model—it will be applied to all subsequent views automatically. So also associated with the hairstyle in FIG. 34 are views 0 to 7.

Section 78: How the Virtual Fitting Room Use Metadata for Hairstyles

The virtual fitting room use hairstyle metadata (text strings) to populate information against hairstyles for the following purposes:

1. To link hairstyles in the Vizago system to morphing data in the virtual fitting room system (vs_id) and set important variables such as viewpoint so that the hair can be applied to a face and the head attached to the body in the right place.

2. To group hairstyles using the name (for the views associated, so that the same hairstyle but correct data is applied to each view of the 3d face).

3. For filters (both shown and hidden in the user interface) the following are used—screens. Where they are used is shown below a. Hidden filters: Some hairstyles will only work with pale skin faces, some with dark skin. Setting the metadata for each restricts the selection of available hairstyles so that a user can choose only compatible hairstyles with their complexion (compatible in this context translating as those which give the best results). The relationship is one to many (one hairstyle to multiple skin types where relevant)

b. Shown filters: The user can drill down when selecting a hairstyle through setting categories to filter the hair on. The xml data is used to set which categories the hairstyle should belong to. The relationship is one to many.

Section 79: Key Features of Social Media Integration

There is provided a method of enabling users to interact with virtual body models, comprising the steps of (a) providing a virtual dressing room in which a first user can select one or more garments to visualise as being combined with their virtual body model; (b) making that combined virtual body model and garment available to other users that meet defined collaboration, sharing or friendship criteria set by the first user.

The method may be one in which a first user's virtual body model is shown or shared with another user so that other user can select and buy clothes to fit the first user, whilst concealing actual measurements from that other user.

There is also provided a method for sharing a virtual body model of a person, in which the virtual body model is generated by the person interacting with a web site, and in which the virtual body model is accessible or useable by a different web site, namely a social networking web site.

The method may be one in which the person has selected a garment on a garment retail web site and that selected garment is visualised on the virtual body model, and in which the garment retail web site includes a button or icon which, when selected, automatically posts an image of the garment visualised on the virtual body model to the social networking web site page, entry or resource of that person.

The method may be one in which the social networking web site page, entry or resource of that person enabling various functions, such as (i) showing what the user is wearing or thinking of wearing and/or buying, allowing friends to comment, express a like; (ii) enabling friends to dress the virtual body model with their own suggested clothing; (iii) enabling friends to add their own clothed virtual body model to the user's virtual body model so that the user's page shows both models together in their chosen garments.

The method may be one in which a first user's virtual body model is shown or shared with another user so that other user can select and buy clothes to fit the first user, whilst concealing actual measurements from that other user.

There is also provided a method for sharing a virtual body model of a person, in which the virtual body model is generated by a user interacting with an application or web site, and in which the virtual body model is accessible or useable by any type of display device that is operable to use an extensible image framework, such that images of a garment can on any such display device be seen as combined onto the virtual body model, to enable that person to visualise what the garment will look like when worn by them.

The method may be one in which the extensible image framework includes a web browser. The method may be one in which the extensible image framework includes a browser API or extension. The method may be one in which the type of display device includes one or more of: televisions, mobile telephones, tablet computers, laptop computers, desktop computers, digital mirrors, digital cameras, digital video cameras, displays placed in retail stores, digital mirrors placed in retail stores. The method may be one in which the type of display device includes a television and a tablet computer. The method may be one in which, when the user is viewing an image of their virtual body model combined with one or more garments on a portable device, the user can, with a single physical gesture, cause the same image to be displayed on a different display device. The method may be one in which the gesture is a flick or throw gesture.

Section 80: Social Interaction

Figure 10:
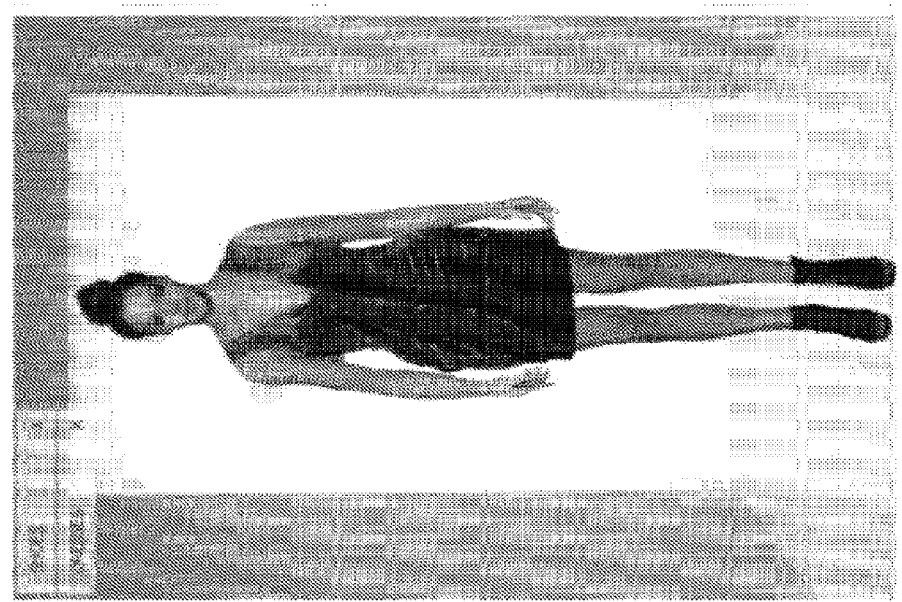
FIG. 10 shows an example of "My favourite look" in a social networking application.
Figure 11:
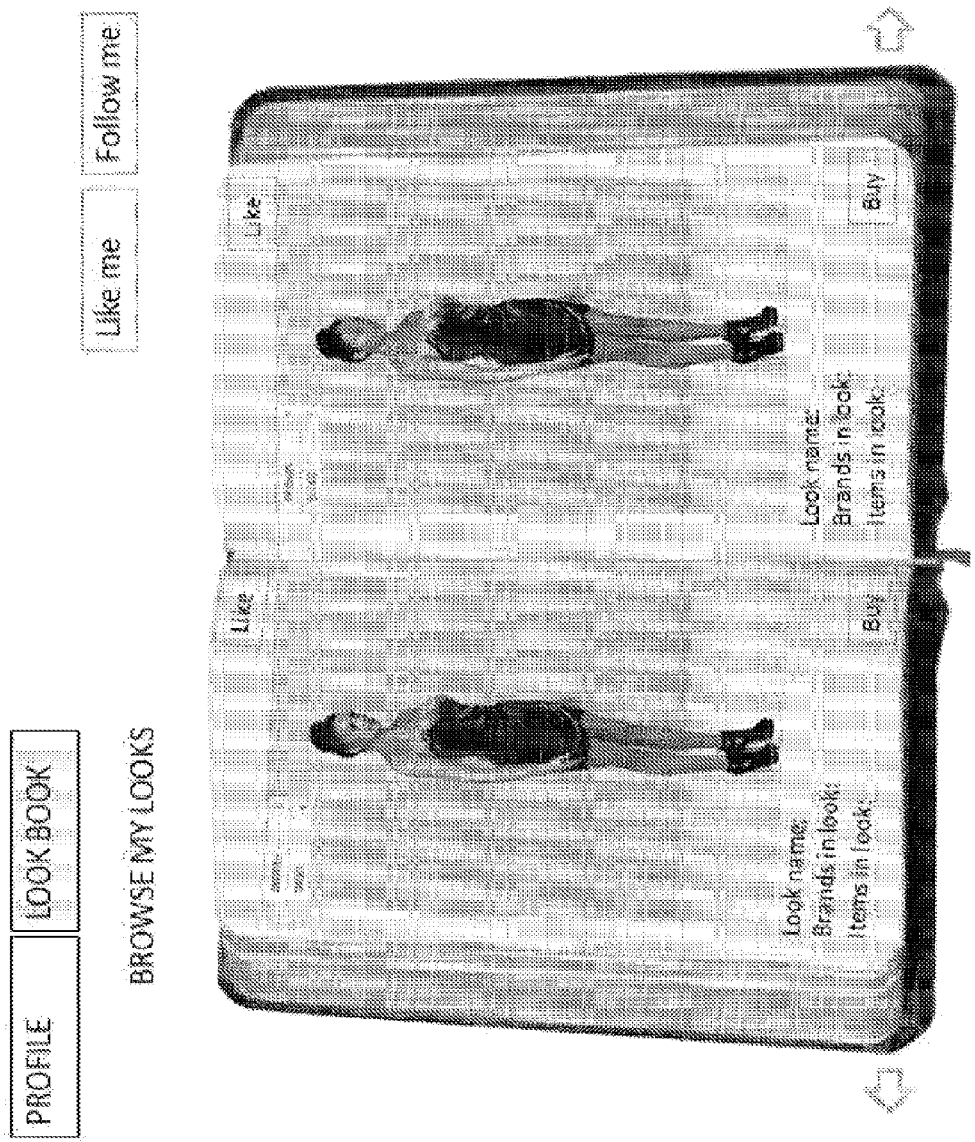
FIG. 11 shows examples of looks in a look book profile.

The virtual fitting room can in different examples have a social interaction aspect. One example is shown in FIG. 10-11. The concept of sharing is part of the interaction on the Internet and there are tools to share content with others.

Section 81: Social Needs

The social interaction is an important aspect of the platform and the technology. There are different reasons for different users as to why they interact socially with the service and the platform. Among the different social drivers for interaction four are more prominent: 1) purely social, 2) exhibition, 3) recommendation, 4) discovery.

'Feedback' is the idea that you get in-depth feedback from your wider social circles.

'Discovery' facilitates you to find out new fashion items. 'Try that look on me' is a discovery tool.

'Exhibition': the idea to show off how wonderful your fashion taste is. Try to publish your looks to as many people as possible.

'Recommendation': you view yourself as an expert, as a fashion stylist or expert. Use the virtual fitting room to be able to give recommendations to other users.

Section 82: Purely Social

Humans are social beings and interaction with other people is an important part of human life. Many of the actions and choices we do are purely based on interaction with other people. One aspect of the current technology is to be able to interact and play and exchange experiences with other people. The main driver for the user would then be just the social interaction in itself.

See also Section 93-96.

Section 83: Exhibition

A different type of driver for some users is that they would like to expose themselves and get attention. The users could aspire for the attention through for instance being provocative, being true or in some other way get attention in some form.

Users of the system described in this document can in one example share their body model as it is or with a specific outfit. This could be in the form of a picture of the outfit as exemplified in FIG. 27 or it could be in an interactive form where the other users could rate and make comments and in one example change the outfit and features of the shared body model.

See also Section 89.

Section 84: Recommendations

Using information from other users, possibly from users you trust and believe you share common views with, is one way of social interaction online. This is especially important online since the amount of information is vast and you sometimes would like either to share your own views to someone or you would like to get information from someone who you trust or share views with.

Recommendation can also be as part of a crowd-sourced effort where several users put in recommendations around a question, a subject or similar and the common view would then be the recommended view.

Using recommendation as the social driver can be implemented in that the user either can recommended for example outfits for another user's body model or the user can let other users recommend for example outfits for his or her body model.

See also Section 30 and 98.

Section 85: Discovery

As stated above the amount of data in the online environment can be vast and it is sometimes hard to pierce through the "noise" to find what is really relevant or to find new experiences. Discovery is to experience something new which you might not have known already existed or at least did not actively contemplate.

In a solution, this could be in the form of experiencing a new outfit for your body model. This could be through looking through different types of outfits or garments and trying them on or through for instance using a randomized or curated selection of garments or full outfits.

See also Section 99-101.

Section 86: Online Social Interaction

The social interaction online has taken the form of different ways to recommend, share and interact with other users. There are different interaction tools that users can use. For example different icons can be selected, representing for example the social networking site Facebook, the micro blogging platform Twitter and to share an experience via email. All three of these icons would enable the user to share the current experience which could be a web page, a photo, a video or some other experience which can be shared with another user.

Different online tools are available for sharing content and exemplifying the different range of media types for sharing and platforms where content can be shared.

One implementation of the sharing function can be seen in FIG. 39 where icons for sharing the look are present in the lower right hand corner.

Section 87: User Profile

In the virtual fitting room community, the user would be able to see his or her profile. In one example the profile page would contain the body model currently associated with that account as well as the wardrobe and the looks being saved to that account.

The user would also be able to see the comments and rating she has received in an inbox and it could also be presented as a flow of events. One part of the profile can contain the stylists' recommendations that you subscribe to or that you have received. The profile page can be divided in to three main parts: stuff that you have done yourself, stuff that has been done by your friends (inbox) and stuff that stylists have done. The profile page would also be able to show notifications of what has happened since the user last logged in.

An example of the profile can be seen in FIG. 10 and an alternative way of visualizing looks can be seen in FIG. 11.

Section 88: Social Interaction Features

The following social interaction features may be implemented by the system:

Save Looks and Later Select Looks to Share

Save multiple looks and publish a selection with titles, comments and questions for other users to view or interact with. This relates to the social need feedback.

Save multiple looks to the user's account so the user can access the looks and share the looks as and when the user prefers. The saved looks will be displayed in an area of your account where you can browse around saved looks.

The user can share the saved looks using the sharing tools the virtual fitting room offers.

The saved looks can have areas associated with them for the user to enter comments or viewing feedback the user has received on a specific look when the looks previously has been shared. The user can in one example also view and follow links to when and where the user has shared the look.

The user is able to access, store and sort the advice she is being given from other users and for instance style advisors, in the virtual fitting room.

Save Other User's Look

The virtual fitting room also provides for saving looks that you have received from another user or that you have selected in a store. The looks can for instance be recommended looks from fashion stylists or the user's friends.

Statistics on Shared Looks

The virtual fitting room can also provide statistics on the specific looks such as how many, when and from where other users have interacted with the look, such as having viewed it or rated it.

The virtual fitting room further provides for the user to be able to follow what garments have been rated highest or viewed the most when included in a look.

Vote on preferred look, when shared through Facebook, email, twitter etc

Allow for voting when a user shares multiple looks using buttons (optional when sharing). This relates to the social need Feedback.

One example of the user sharing a look and allowing other users to vote is shown in FIG. 8-9.

This can be in relation to a specific event where multiple shared looks from the event are being presented and users can rate the different looks. This could for instance be from the Academy Award event or a wedding where the dresses used by the people at the event can be presented for users to comment on and rate.

The virtual fitting room also provides for the user to try the look on to the body model. If the dress would not fit the user could be notified that the dress is not in the right size.

Allow Specific Questions to be Asked when Seeking Feedback

The user can pose a specific question or attach an issue to the look to be shared. It can for instance be a question about "Which outfit would be best for . . . ?" and the user can allow friends to vote for if this is a good look for that purpose. This relates to the social need Feedback.

Notifications for when Feedback is Received

In order for the user to be aware that she has received feedback on a look an email can be sent out to the user's preferred address with a notification. The email can contain an image of the look with the feedback. The email can alternatively provide an instruction to log in to the virtual fitting room to view the feedback provided. This relates to the social need Feedback.

Feedback Inbox

The feedback inbox stores all previous looks and feedback to those looks. The virtual fitting room provides for the feedback on looks to be viewed in an inbox type style where the feedback can be shown according to the chronology in which they were received or for instance the type of feedback it is (rating, comment etc.). This relates to the social need Feedback.

As previously described, the feedback and ratings etc. can also be viewed in relation to each look or garment which the feedback relates to.

Section 89: Sharing the Private Wardrobe

The virtual fitting room allows for the user to create a private wardrobe to store garments and to share that wardrobe. The people that the user selects to share the wardrobe with can be friends or followers of that user.

In another example, the user can select to share the wardrobe with other users who have a similar body size to the user. The user can also select to share her looks or specific looks to other users based on the body shape of those other users.

The filtering of whom the user will share the wardrobe with can be set by the user. This relates to the social need Feedback.

Adjustable privacy settings for sharing body for gift shopping: This relates to the social need Feedback.

In one example, the virtual fitting room enables the users to share the body model, not the actual measurements, with someone else. That other person can then shop for the user and get the correct size without knowing the exact measurements of the user. The user can set the level of detail of the body model the user would like to share with the other person.

The user can also select to only share a standard image or a dressed image of the body model to the other person. The measurements would still be correct for the fitting of the garments the other person tries out on the body model but the other person is not seeing the actual size of the user.

In another example the user can share with the other person only the size of the body model but not the actual body model. The other person is not able to change the body model's shape and size, unless the user allows this.

See also Section 83.

Section 90: Circle of Friends

Create a group of friends who can all chat and share collectively, but without wider publication.

This is a feature where the user can share looks with a closed group of other users, friends, who then can make comments and rate the look. The group can be closed for other persons, either totally closed or with different levels of participation by other users. One setting can be to allow other users to see the shared looks but not interact with the looks and make comments and rate etc.

Section 91: Get Live Feedback on Look from Friends

This relates to the social need Feedback. This feature is a real time chat with other users where they can see the user's look either as the look is created or when the user elects to share the look. The live feedback can for instance be in the "Facebook chat" format where active users can interact.

There can also be a function where the user can randomly select someone to interact with, not necessarily from the set of friends. This interaction can be in the form of a chat and the user can after that rate the user having given the input on the look. This feedback can form part of the overall rating of the user, such as points given for good reviews or a helpful user.

Section 92: Fashion Panel AKA Style Counsel

Ability to create a group of friends to allow for one click sharing "share with my style counsel" This relates to the social need Feedback.

The fashion panel can consist of users that do not necessarily know each other. The user sharing a look will push the look to the fashion panel for them to make comments and provide feedback on the look. In one example the user sharing the look can allow the fashion panel to also alter the look and make new suggestions on how to improve it.

Section 93: Shared Live Fitting Room

Space where a defined circle of friends can see each other's body models, recommend garments for each other to try on and instant chat. This relates to the social need Purely Social.

This can be seen as a shared shopping experience, an online shopping trip, for instance if you are shopping for a bridesmaid outfit together with friends.

Section 94: Instant Chat Through Facebook (FB) Chat

Via the virtual fitting room the users can chat instantly with each other. This can be used together with other collaboration via the platform. The users can for instance chat with each other at the same time as they are reviewing a specific look or going through a library of looks or garments. This relates to the social need Purely Social.

Section 95: Invite Friends to Shop with Reminder

The users of the virtual fitting room can add events to a calendar and also invite or include other users to an event. The user can also set that the participants to an event will get a reminder that the event is soon to happen. An event can for instance be a joint shopping experience. This relates to the social need Purely Social.

Section 96: See which Facebook Friends are Using the Virtual Fitting Room

If the user has connected the virtual fitting room account to another social network such as Facebook the user can see if her friends on that other network are online. This relates to the social need Purely Social.

For Section 93-96 also see Section 84.

Section 97: Become a Stylist and be Rated by Peers

A user of the virtual fitting room can allow other users to follow their profile and get recommendations from that user on garments and outfits. Other users can also rate the recommendations given by a "stylist". The stylist rating can be displayed on the member's profile or in a list of the highest rated stylists. This relates to the social need Exhibition.

Section 98: Stylist Recommended According to Style Data

This relates to the social need Recommendation. Depending on the size and shape of the user's body model the user can be recommended different stylists.

The stylists can in one example enter for what shapes and sizes they will create recommendations. In another example the system derives for what shapes and sizes the recommendations are made, based on for instance the size of the body model the stylist is using.

See also Section 84.

Section 99: Try that Look on Me

When looking at a stylist's look book/posting, there is a "try this look on me" button. This relates to the social need Discovery.

People could also become "stylists" and share their recommendations to the wider crowd. Users can also select to subscribe or follow a specific stylist and that way get new recommendations to try on the body model.

In relation to shared and public looks the user can in one example click on a button or link to try that look on the user's body model.

Section 100: Follow Friends/Celeb Looks

As described a user can allow other users to follow her profile and the user can give style advice. In one example the user needs to approve the persons following her profile and her style advice.

Users can be rated and get recognition through being assigned different levels of credibility. One aspect of this is that the stylists can aspire to those higher levels through for instance user recommendations and the number of style advice given. The stylists can be awarded different credibility badges, such as stylist guru or a person giving really niche style tips.

In one example there are different levels of for instance followers with goals that trigger different real value recognition items such as vouchers at a specific retailer. The user could also be recognized for pushing a specific garment and that people buy that garment after viewing it or after getting a style recommendation for that garment.

The virtual fitting room provides for the stylists to create their own "world" within the fitting room where different features can be personalized. The stylists and other users can also become affiliates getting a share of the sales generated by traffic they have driven.

Section 101: Like and Dislike Stylist Recommendations to Find Best Stylist for You The virtual fitting room enables the users to provide feedback about the recommendations the stylists have given. This information can be used for the public rating of the stylist and also for the service to understand the effectiveness of the recommendations made. This relates to the social need Discovery.

For 99-101 also Section 85.

Section 102: Look Recommendations Connected to a Specific Event

The outfit randomizer can also be related to events such as films and other things that are happening in the media. It could be to dress up as if you were in a film or as if you were going to the Oscars night.

Section 103: Different Social Platforms to Share Via Facebook®

The system could have a specifically designed Facebook® welcome page that the user would land at when visiting Metail's fan or group page on the social networking site. There could be different landing pages with different features for different social networking sites or services.

The user has the option to also share the look on to a wide range of platforms. An example is sharing an outfit on Facebook. The user would click on for instance the Facebook logo and the look is then presented on the Metail website in relation to the look the user would like to share.

It is understood that the interface the user would be presented with will differ depending on the social networking site used also on the current features and layout of the site. For example a text box is provided where the user can write a message to be shown in relation to the shared look on Facebook.

The look can be shared on the wall of the user to be viewed by a wide range of users or the look could be shared as a personal message to one specific user or group of users.

The shared look can include some standard elements in accordance with the Facebook requirements such as a title, a displayed universal resource locator (URL), a correct link to the shared look, and an image of the shared look.

The thumbnail associated with the shared look on Facebook would be a static image that either is preselected by the system or the user can flick through alternative thumbnails to select it for use.

Figure 27:
FIG. 27 shows an example of a shared "My Look" in social media.

The shared URL will take the user to a webpage where the look is shown, as exemplified in FIG. 27. The information on the shared look page can be customized in many different ways. The webpage in FIG. 27 has a link to the virtual fitting room start page for any user to create their own body model. The page also has a "like button" which will initiate the like function on Facebook.

In one example, information about the garments in the shared look is also accessible from the shared look. This can be in the form of a list of the garments the body model is dressed in.

The information about the garments the body model is dressed in can be price, retailer, brand and size. The user can in one example set what features should be shared together with the specific look. In another example the sharing preferences are set centrally, e.g. by the brand or retailer or by the platform administrators. In another example there could also be links to the retailer or to the garment in the virtual fitting room.

In one example the user can select to share several views of the same look and all or a select subset of the views of the look would be shared over the social networking site. The user can either share a subset of the views available or all of them. In one example this lets the person viewing the page with the shared look, e.g. as shown in FIG. 27, alternate between different looks—rotate the body model in the outfit. In one example the background of the shared look is changeable by the user.

Other Options for Sharing

In one example the user is able to choose between different views of the same look for the image of the shared look. This can be done either through viewing the look the user would like to share on the Metail website and activate sharing and that image would be the default to be shared. The user can alternatively in one example select between several different images to be shared and the user could then click through the different images on the stage of sharing to select the image the user would like to represent the shared look.

In one example the user can select to share several different looks over the social networking site. The looks, and if selected also alternative views of the same, are shared as a set of images. This can be in the form of an album on the social networking site or as a linked album or stream of images on a different networking site.

Twitter

The user can select to share the look via a micro blogging platform such as Twitter by selecting an icon. The user is then presented with the option to share the look using the link to the page (e.g. in FIG. 27) via the Twitter interface.

The user is presented with a standard form text reading "View my look from the Metail fitting room, and create yours"; alternative text can be used. Also in the standard format presented to the user is a URL which leads to the shared look. It is understood that the URL can be shortened and it can also be presented as such: the actual landing page has a different address.

The user can alternatively select to share the image of the look on Twitter using for instance the tweet pic sharing platform or any other platform where the user can upload the image of the look. The tweet can include a specific identifier of the shared look; this could be a code or a hyperlink.

Look Feed

In one example the user is able to share looks in the form of a feed. The user can in relation to a look as shown to the user in the Metail system select to publish the look to a feed. The look would then be shared on that feed: Other users who follow the user who has published the look are able to see the shared look.

In another example the feed is in a form of a photo feed where the user uploads the look to an album and where the looks can be presented as a feed of image representations of looks.

Section 104: Email

When sharing for instance an outfit or a body model via email the user is presented with a template email to be sent. The template will in one example not allow the user to edit the content. In a different example the user can add specific text to the email in for instance a text box.

In yet another example the user can edit the email to be sent through his email client of choice and via Metail's sharing feature be presented a link or a section of link and text to be pasted in to the email.

Section 105: Share Alternative Looks

In another example the user can select to share a plurality of different looks to appear so that other users compare the looks.

The multiple shared looks would in one example appear next to each other and the page would provide for a comment and ratings option. The user sharing the looks could provide a text describing each of the looks and/or an intro text to the page. The user could then for instance post a question on Facebook saying "which of these two looks is better on me" and then link to the page with the two looks on the body model.

Section 106: Share the Outfit

Share the outfit as being presented on the body model and let others dress their body model in that outfit.

The user sharing the outfit can select to share the outfit with a specific friend for that person try the outfit on their body model. The shared outfit can be presented on either of the user's body models. The user sharing the outfit can set whether she would like to share her body model in the outfit or not. The user receiving the shared outfit does not have to already have a body model in the system, and if not she can be asked to create one to see the outfit on a or her own body model. The shared look could alternatively be presented on a standard body model not having the physical characters of the user sharing the look.

In one example the shared look would be presented as shown in FIG. 27 with the addition of a button or link allowing for the user looking at the shared look to try the look on to his or her body model, or to create one to see the body model dressed.

The background is part of the experience shared but can also be decoupled from what is shared and what the user would allow other users to use from her outfit if they decide to try the outfit on to their body models.

Section 107: Sociability

The social interaction of the virtual fitting room is exemplified in FIGS. 10 and 11.

Some key features of the social interaction of the virtual fitting room are listed below:

1. Share feature allows you to send your looks to Facebook and Twitter and receive comments and advice from friends whilst promoting the feature
2. Combining fashion and beauty trends with personalised recommendation for face shape, skin tone and hair type
3. Publish looks to the retailer's and/or the virtual fitting room's websites and receive comments and advice from the community
4. Community rating of beauty blog posts, tips and products
5. The virtual fitting room collaborations with stylists and fashion bloggers will add to the quality of advice provided by and to the community
6. The community will grow as more brands are linked to the virtual fitting room, allowing for a sociable shopping experience online Section 108: Share Your Model The user can select to share with different circles, either created within the platform or from other platforms. Decide different levels of what you would like to share with an individual or list/circle of friends. This can be your outfit on your model, your outfit that someone else could try that on to themselves, the measurements, share the model but not be able to see in underwear.

The user can further select to share via an email list. This can for instance be to share a look with friends who are not connected via a social network or on the virtual fitting room. The user can allow a person to share outfits to be dressed on to the other person's body models. The user can also allow another user to dress her body model. The user can set the level at which another user can interact with the sharing user's body model. It can be to only change outfit, or to get the actual measurements and size measurements. The other user could perhaps shop for garments for the shared body model. Not showing the size of the model during the process at all, all the way through the purchase process. The user can share the shape and/or the measurements.

The user can further let a specific user access and dress the sharing user's body model. This can be a mother dressing and shopping for a child and then interacting with the child's body model. Could also be for husband and wife.

Connect Several Model to One User Account

The system allows in one example for a user to have more then one body model associated with one user account.

Section 109: Key Features of the Virtual Body Model

There is provided a method for enabling garments to be visualized on a virtual body model of a user, in which (a) a display device shows an image of a garment, of a size selected by the user, combined onto the virtual body model to enable the user to visualize what the garment will look like when worn by them and (b) the display device also provides an icon, button, function, sliding scale or other control that, if selected by the user, causes the image of the garment to be altered to correspond to what a garment of a different size would look like on the virtual body model.

The method may be one in which the user can select one size larger and one size smaller. The method may be one in which the control is voice activated using a speech recognition system. The method may be one in which the image of the garment is generated by photographing in 2D an actual garment from a number of viewpoints, on a mannequin of known size and shape. The method may be one in which the garment is photographed from between 5 and 12 different viewpoints around the garment and the resulting photographs are analysed and processed to generate a 3D photo-real image of the garment that can be viewed from 360 degrees. The method may be one in which the image of a garment is a 3D photo-real image of the garment. The method may be one in which, for a given garment, only a single size of that garment is photographed and the appearance of other sizes is calculated by extrapolating from that single size. The method may be one in which the process of extrapolating is based on measuring other sizes of that garment, or different garments, from the same manufacturer of that garment.

There is provided a method of generating a virtual body model, in which a user takes, or has taken for them, a photograph of their face which is then processed by a computer system to generate a face image derived from that photograph, in which the colour and texture of the skin of the face, obtained from or matched to the photograph, is then applied by the computer system to a virtual body model such that the colour and texture of the skin of the user's virtual body model is matched to the colour and texture of the skin of the face of the user.

The method may be one where the colour and/or texture of the skin of the face is obtained automatically from the photograph. The method may be one where the colour and/or texture of the skin of the face is obtained manually from the photograph by a user manually selecting an appropriate, matching colour from a palette of possible colours and/or palette of possible textures. The method may be one in which the colour and/or texture of the skin applied to the virtual body model is in addition a function of the age or the user.

There is provided a method of generating a virtual body model, in which a user takes, or has taken for them, a photograph of their face which is then processed by a computer system to generate a face image derived from that photograph, in which the colour of the skin of the face and/or the eyes, obtained from or matched to the photograph is analysed and used as a filter or criteria the system automatically applies when recommending a colour for a garment to be selected by the user from an online garment retail website, or rating the colour of a garment al-ready selected by the user from the online garment retail website in terms of complimenting the user's skin and/or eye colour.

Section 110: Aiding Body Shape Prediction Through Specific Features (Pregnant Etc.)

The model used to create a body model can be aided through adding specific features about the user. This can be in the form that the user inputs that she has an athletic body or a fatter body. A similar approach can also be used for modelling a pregnant body. Allowing the user to input that she is pregnant will provide the body model with probabilistic input about the shape of the body. An alternative version is to model a pregnant body in a set of (for example weekly) stages to be added to the body model to model fit and size for a pregnant woman.

Section 111: Improved Body Modelling Using Aggregated Customer Data

The aggregated customer data is used to improve body modelling by mapping information about generic similarities and correlations in body shapes. The information is derived from millions of users' 2D photographs rather than doing expensive collection of a few hundred bodies in 3D. The information is in one example used to generate the most likely body shape for user who hasn't supplied a complete set of data.

Section 112: Modelling Clothes that do not Fit

The virtual fitting room can in one example provide for the user to try on garments of a size that is not the best fit. The system will generally select the garment size which would give the best fit to the size of the user's body model.

However, providing the option for a user to try on different sizes will help the users in their decision on which garment has the best fit for that specific user's body model. Some users will like the garment to be more loose fitting than what others would find a good fit and therefore to provide one size larger than the best fit to be modelled on the body model would provide value to the user.

The virtual fitting room will in one example provide for the option for the user to alternate size. This could for some garments be one size up and one size down. For some garments the range of available sizes to try on the body model can be broader.

Section 113: Creating the Face

Annotation points will determine the extremities of the face and the different points to be used in the process. The photo will be pasted on the head of the hairstyle model which has been used. This is also why only certain hairstyles are allowed to be used with certain skin tones.

The transition between the face from the user's picture and the hairstyle model is done in the skin area and that is why the skin tone is important for the selection of the hairstyle model to be used. A too lightly coloured face to be put on to a dark skinned model will not give a good transition and vice versa.

Skin tone values are sampled from the face and from the model and a middle value is given for the blend in the transition between the face and the hairstyle model. The skin tone is sampled from a set of key areas to give an accurate skin tone measure. In one example the sample areas are the chin, the forehead and around the ears.

See also Section 4.

Section 114: Skin Textures and Use of Face Photo to Generate Skin Coloration for a Body Different skin textures can be applied on to the body model in order to make the body model more realistic and to resemble the user.

The canonical body model can have skin textures such as shadows or skin features such as the belly button and nipples applied to give a more natural look. These features are in one example pre-applied and not changeable by the user. In another example the user can select from a set of different body textures to be applied to the canonical model. In yet another example the skin textures to be applied to the body model, either automatically or by user selection, are set by the selected hairstyle and/or the user's skin tone.

Also, different body shapes will typically have different skin textures. For instance a muscular body will have skin texture features that are different from an overweight person. The system can apply certain skin textures and/or features based on the body model's BMI, weight, length or other values.

In order to model a male body model naturally the option to apply chest hair and other body hair is provided for. The user can either choose to apply body hair for the whole body in different levels entered by a number or for instance a slider. The option for the user to select certain areas to apply the body hair to can also be provided for. The option to remove hair in certain areas of the body may be provided for.

The colour of the face is an indicator of the colour of the rest of the body. Taking the total skin tone value, an estimate of the skin colour from the face will give a value that can be used to colour correct the skin texture of the body model. This colour will also be used to adjust the colour of the associated head onto which the face features are modelled.

Section 115: Male Vs. Female Model

Building a simple probabilistic model of the body shape can be indifferent to if it is a male or female body model. Different input values are needed for modelling male models instead of female, for instance bust measurements for females. The bust size is one aspect of the body model that is likely to vary in a more random fashion and is not necessarily related to the size of other body parts. Using input values for the cup size and strap size provide values for the modelling.

Section 116: Key Features of the Application Programming Interface and Mobile Aspects There is provided a method for visualising a garment on a virtual body model of a person, in which an icon, barcode or symbol associated with a garment can, when scanned by a mobile computing device, automatically causes one or more images of the garment to be combined onto a virtual body model of the person to enable that person to visualise what the garment will look like when worn by them.

The method may be one in which the icon, barcode or symbol is associated with a printed or electronic image of the garment. The method may be one in which the icon, barcode or symbol is in a printed magazine, such as a fashion magazine. The method may be one in which icon, barcode or symbol is on a physical tag or label for the garment. The method may be one in which the icon, barcode or symbol uniquely codes for the garment. The method may be one where the image of the garment when combined with the virtual body model is displayed on the same mobile computing device, which scanned the icon or symbol.

There is also provided a method of generating photo-realistic images of a garment combined onto a virtual body model, in which (a) a user locates a garment on a website; (b) a computer implemented system analyses the image of that garment from the website and then searches and identifies that garment in a database of previously analysed garments and then combines one or more virtual images of the garment from its database onto a virtual body model of the user and then displays to the user that combined garment and virtual body model.

The method may be one in which the user, when viewing a website showing the garment on a touch screen device, indicates that the garment is to be visualised on his or her virtual body model by touching the image of the garment shown on the touch screen display.

The method may be one in which the computer implemented system searches and identifies that garment in a database of previously analysed garments by using an image matching system that can assess the similarity between two images of objects. The method may be one in which the computer implemented system searches and identifies that garment in a database of previously analysed garments by using garment identification metadata exposed by the website. The method may be one in which a web browser extension enables the user, when browsing the website, to initiate the tasks required to be performed by the computer implemented system. The method may be one in which the combined garment and virtual body model is shown within the same web browser. The method may be one in which the combined garment is shown in a window appearing over the website.

Section 117: Mobile

The virtual fitting room is possible to view and interact with from different types of platforms, where the user will get the virtual fitting room experience from any device used. Using a multi channel approach aids the different core features of the different devices and also the different types of features that you would like to use when you are using a mobile phone for instance, in contrast to sitting at your desk by your computer.

The mobile interface can be used as a way to save the experiences you have when you are mobile. It can be to save a garment you see in a store for later retrieval at home. The mobile interface can also be capable of capturing images of for instance an outfit which you would like to recreate when you come to your larger screen device.

In one example the user uses her mobile phone to access the body model. This can be combined with for example bar code scanning of clothes she either would like to see on the model directly on the phone or that she would like to try on in the virtual fitting room in the store. The phone can also display styling tips and special offers available to the user.

Section 118: Application Programming Interface (API)

The virtual fitting room has a server side API which can be used for various ways of integration. This could for instance be ACTP or Jason API as can be used for creating macros and finding information. This could be used for deep integration of the virtual fitting room.

As an alternative the virtual fitting room also can be provided as a Java based service using a java script library. This could be used for the body model visualization widget for example. However in some cases there could be reasons why the user should be taken to the virtual fitting room native environment for the body model creation process and then be taken back to the third party browsing experience with the body model.

Different levels of integration are possible.

1) The first level is to use the virtual fitting room as a visualization tool for the retailing experience, showing different garments in combination.

2) The next level would be that the retailers would like to push different trends out through the virtual fitting room.

3) Another aspect of the integration is to integrate personal visualization elements into email marketing campaigns. This could be to show the user's body model in the email dressed in a garment that the sender of the email would like to show the user in, for instance for marketing. This step would most likely be through the server side API.

4) The retailers can also enable that the full current outfit the body model is wearing is pulled in to the shopping basket. If the outfit contains garments of different brands or garments from different retailers one aspect is that selecting to purchase the whole outfit would place the relevant garments in different baskets depending on where they can be bought.

Section 119: Automatic Detection of Garments and Method and System to Try the Garments on the Body Model Overview A browser extension that allows a user to "try on" garments using their body model where the garments are digitized in the virtual fitting room systems, even if the website being viewed has not embedded the virtual fitting room's UI technology.

The Enabling Tech and Data Needed

The user is using a browser that has been customized to provide the system. In one example this could be via a browser extension. In an alternative example the user can have access to an application with an embedded browser ("Browser Extension").

The system also consists of an Image Identification Engine that identifies that two image resources are of the same scene despite rescaling/changing headers/re-encoding etc.

The system further consists of a process that allows the virtual fitting room to associate online images of garments that have been digitized by the virtual fitting room with the virtual fitting room stored model of the garment and present that garment on the user's associated body model.

The System

When the user is browsing the Internet, the Browser Extension examines images, passing them to the Image Identification Engine to establish whether the image corresponds to a garment the virtual fitting room has identified. If it does identify a garment, the user is given the option to replace the image with the virtual fitting room's interactive view of the garment on the user's body model.

In one example the user can actively select that an image is to be passed on to the Image Identification engine for garment detection. The user can also in one example indicate on a specific image what portion of the image includes the garment which is to be identified. This could be done for instance by indicating with a click in the middle of the garment or for instance by indicating the perimeters of the garment in the image to assist the Image Identification Engine.

In an alternative example the Browser Extension also examines the metadata for each of the images for an identification of the garment. This identification can be in the form of a standardised system for garments and/or products. Such a standardised system can be for instance the International Article Number (EAN), Stock-keeping unit (SKU) or similar systems. The identification can also be a proprietary system of identification codes unique to each retailer or garment producer. The Image Identification Engine will have access to different databases for identification of garments by the embedded identification in the image.

The Image Identification Engine is in one example able to store previously identified image locations and/or images and associated garments to be presented to the user when they are browsing the web. This speeds up the process of identifying garments and enhances the user experience.

Section 120: The Similarity System

If a garment in an image of a website the user is browsing is not the exact version of a garment in the virtual fitting room's garment library the Image Similarity Engine can semantically characterize the garments in the image (e.g. automatically detect that an image is of a red maxi-dress). The browser extension then offers the user the opportunity to try a similar garment from the virtual fitting room's library on the user associated body model.

In one example the browser extension automatically selects the most similar garment and presents it on the user's body model.

In an alternative example the browser extension presents the user with alternative garments that match the garment in the identified image and the user can select which garment is to be presented on the user's associated body model.

The Image Similarity Engine uses different parameters to identify and classify a garment in an image and how similar it is to a stored garment. It can for instance use what type of garment it is, such as "trousers" or "dress" and also the colour, fabric and if it has sleeves and the length of the sleeves.

In one example the user can also assist the Image Similarity Engine by inputting certain values such as what type of garment it is.

Further Details

The user would typically not need to log in each time they use the browser extension. The authentication details would in one example be cached and the user's id in the virtual fitting room system and some of their body model details could also be cached.

It is further understood that in one example the user can select on which of several body models associated with the user's account that an identified garment is to be presented.

Section 121: Key Features of Data Services

There is provided a method of determining if a shopper is buying garments for themselves or for someone else; comprising the steps of: (a) the shopper providing a virtual body model of themselves to a computer-based system; (b) the shopper purchasing garments at an on-line or retail store of a garment retailer; (c) the computer-based system matching the size of the purchased garments to the virtual body model and then determining if the purchased garments are for the shopper or not.

The method may be one in which the computer-based system is linked to a database which includes data about the shopper. The method may be one in which the database provides loyalty awards, dis-counts or points to shoppers.

There is provided a method of generating search results using a web search engine, comprising the steps of (a) a user generating a virtual body model of themselves; (b) the web search engine using that virtual body model, or data that defines some or all of that virtual body model, in its search process, algorithm or algorithms.

The method may be one so that search results are optimised to be relevant to a user with that particular virtual body model when searching. The method may be one so that searches for shopping for garments returns search results that are relevant to a potential purchaser with that user's virtual body model. The method may be one in which search results can be filtered manually by a user of the search engine by price and whether or not the user's virtual body model is used. The method may be one in which the search engine is associated with a social network and that social network includes the user's virtual body model. The method may be one in which, if the search engine is associated with such a social network, then the virtual body model is automatically used in all searches, unless the user has manually set a preference against that. The method may be one in which the virtual body model includes the age, sex, height, weight, and body shape of the user. The method may be one in which the search engine optimises searches from a user for any of the following good or services or events using the virtual body model of that user: garments, footwear, food, restaurants, holidays, flights, insurance, sports events, medicines, physical therapy, books, entertainment.

Section 122: Uses for the Data that is Gathered

What can it be used for: Popular body shapes; Usage statistics; Abandoned baskets.

Also the Facebook data to go through from Facebook. The users could agree to give this data away.

Gather user information: Sizing from photos; Past purchase history; Likes and dislikes; Demographics.

Intelligent solutions: Size & Fit; Purchase history including: color-ways, styles, sizes; Current trends, inventory; Retailer promotions Monetisation: Margin—For goods sold using the Metail solution; Auctions—For direct marketing space in customer communications; Licensing—For using the product; Subscriptions—To data about customers shapes and sizes; And retailer savings from lower returns and photography costs.

Data in the form of demographic shape, who has what size etc. Understanding what types of shapes buy what types of garments.

There can also be a trending layer on top of the demographic. Not only what shape but also what they actually are buying.

Section 123: Market Research

The data gathered within the virtual fitting room can be used for instance for market research. Data can be provided for garment specific research for example regarding that the garment is tried out by many users but is not bought to the same high extent as other garments.

Another aspect of the research data is what garments the users have saved and for how long they keep the garments saved in their wardrobe or personal storage on the platform.

Section 124: Size and Shape Demographic

Understanding which people are buying specific sizes and what that matches up against in terms of the demographic of those people. This data can be fed back in to the retailers and can be shared around how their fit models actually match up with the body models of their customers.

Another aspect is that the virtual fitting room can provide fitting data and shape data on different markets. The users in different markets have different body shapes. Also users in different markets might have different perceptions on good clothing fit and some like it better loose and some tighter. The data provided from the virtual fitting room can aggregate this data.

Indicators that the body model is actually created to represent the user can be that the model is used for shopping repetitively or that the body model is being used to a high extent.

Section 125: Online Search

Online search is reliant on good information and the more information that is provided the better, and the more relevant the search results become. Including sizing information in a product search means that the search would be more relevant to the user, by providing only garments that match the user's size (or a different size the user is using for search).

The virtual fitting room can provide that data to a search engine, either as the sizing information for a specific retailer or brand or for instance the measurements of the user's body model.

Section 126: Key Features of Garment Morphing Strategies

The following garment morphing strategies may be practised with the system.

Section 127: Photographing a Deforming Mannequin to Capture Shape Variations

We may photograph garments on a deforming mannequin to ensure that we capture important modes of shape variation. The idea is that the important modes of deformation captured can be chosen according to garment properties.

In one example sufficient information is gathered by one photo, or one photo per view. In another the technology uses a few photos of every view to collect the information.

Three sizes giving us further points to interpolate likely garment morphing behaviour against different sizes and shape is what is required. A basic mannequin that changes between a few sizes will give us the extra bits of information we need, such as the presence of vertical versus horizontal creases, to then compute and create the rest automatically with our system. We are effectively getting a couple more real view example points with the mannequin to improve synthetic deformation performance.

Section 128: Garment Size and Stretch

Background

Metail solves the problem of online clothing fit by allowing users to create 3D photo-real body models of themselves. Metail also seeks to provide accurate size recommendation to users. This is to help reduce numbers of returns, which are estimated to be between 25% to 40%, for major online retailers. As part of this, a way to quantify the absolute size and stretch of garments is required.

Problem

Inconsistency in sizing of garments between manufacturers and designers means that generic sizing charts lack accuracy and consistency. We seek to quantify size and stretch of each garment digitized by Metail to provide an accurate and consistent sizing recommendation to the user.

Description

We apply a force normal to the garments in a vertical plane across defined points in the garment, which correspond to different body regions, such as, but not limited to, chest, waist and hips. Furthermore the force is spread, in each instance, across a region of the garment, by means of a flexible material, to mimic curvature in body shape. The extension of the garment for each force applied to it is ascertained to give a relationship between the stretch of a garment and a force applied to it. The force may be applied in a variety of ways including, but not limited to, manual force, electromagnets and linear actuators. Furthermore we measure the absolute size of garments. These measurements provide data to create a metric of different qualities of fit to allow the user to purchase garments of the correct size.

We provide a consistent, quick and simple way to ascertain data for use in garment size recommendation.

Examples of setups for measuring garment stretch properties are shown in FIG. 1.

EXAMPLES

The measuring device may be used at the time of digitizing garments for Metail, to provide a sizing recommendation scheme for that particular garment. The garment may be placed on the apparatus and the extension of the fabric for a series of forces would be measured. The garment might then be repositioned a number of times on the apparatus to ascertain measurements for other regions of the garment Other A mechanical device for measuring absolute garment size and stretch as the basis for a size recommendation engine. Allows an accurate and consistent sizing recommendation to be provided to users.

By doing this our solution moves further away from what competitors are doing today.

Delivering stretch information could be valuable.

On the model, the user can see where it will fit and not fit. This helps to identify the problematic areas.

We could use this information to provide back into the retail industry to help the design process.

See also Section 68.

Section 129: Key Features of Head Modelling

The system implements the following head modelling features:

See also Section 4.

Section 130: Attaching the Face to the Head Model

When modelling the head, the system uses heads with neck and hair and attaches a face to that head. One aspect of this is that a real hair model can be used and that the hair will look more natural.

One part of the user's face which has been defined as containing the key features is extracted to be used. This part containing the eyes, nose, mouth down to the jaw is then "transplanted" in on to the model head. The ears, neck and hairstyle is kept from the model's head.

The head is then modelled from the 2D image to be viewable from at least the eight viewpoints as used in the virtual fitting room.

The shape of the head model's neck is adjusted to fit with the body model's shoulders. This can be done irrespective of if the face has been replaced with the features of the user's face.

The head is in one example adjusted in size to match the body model's size. A larger body model should have a larger head to have the right proportions of the overall body.

The number of possible heads for the user to select a hairstyle from is filtered based on the derived skin tone of the user's uploaded face.

The head is created with support for layers enabling garments that interfere with the area occupied by the head. One example is if the body model is wearing a turtle neck, the skin on the neck is behind the garment while the hair is shown as usual.

When combining artificial elements with representations from pictures, the lighting has to be consistent between the different objects. The identification process for lighting includes problems with the white balance.

In an example the user holds a white object underneath her head in order to identify and adjust the white balance.

Section 131: Hair as a Layered Garment

The head with the hair is treated as a layered garment in the system. This way the hair can be displayed together with a garment. The hair is annotated using a similar process to garments. This way long hair can sit on top of a garment: on the shoulder, for instance.

Section 132: Hands as a Layered Garment

Hands and feet can be modelled as a garment. In this way the user can for instance select to use Kate Moss's hands or someone else's legs or hands. These body parts can be coloured using the same colour value as for the rest of the body.

In general hands can be quite hard to model digitally and through using a pair of real hands, the overall appearance of the body model is more natural.

Machine learning for upload process of face: Machine learning can be used to infer the correct points in a face, e.g. eyes, mouth, nose etc. Getting the points closer to the actual position. This speeds up the process of uploading your face for the Me Model.

Section 133: Server Infrastructure

The system is implemented with the following computer-based sub-systems:

Section 134: Image/Me Model Rendering on the Back Server

The Image/Me model rendering on the back server and sending images in sections to the client makes the client device agnostic.

Section 135: Visualization Subsystem (VS)

Figure 44:
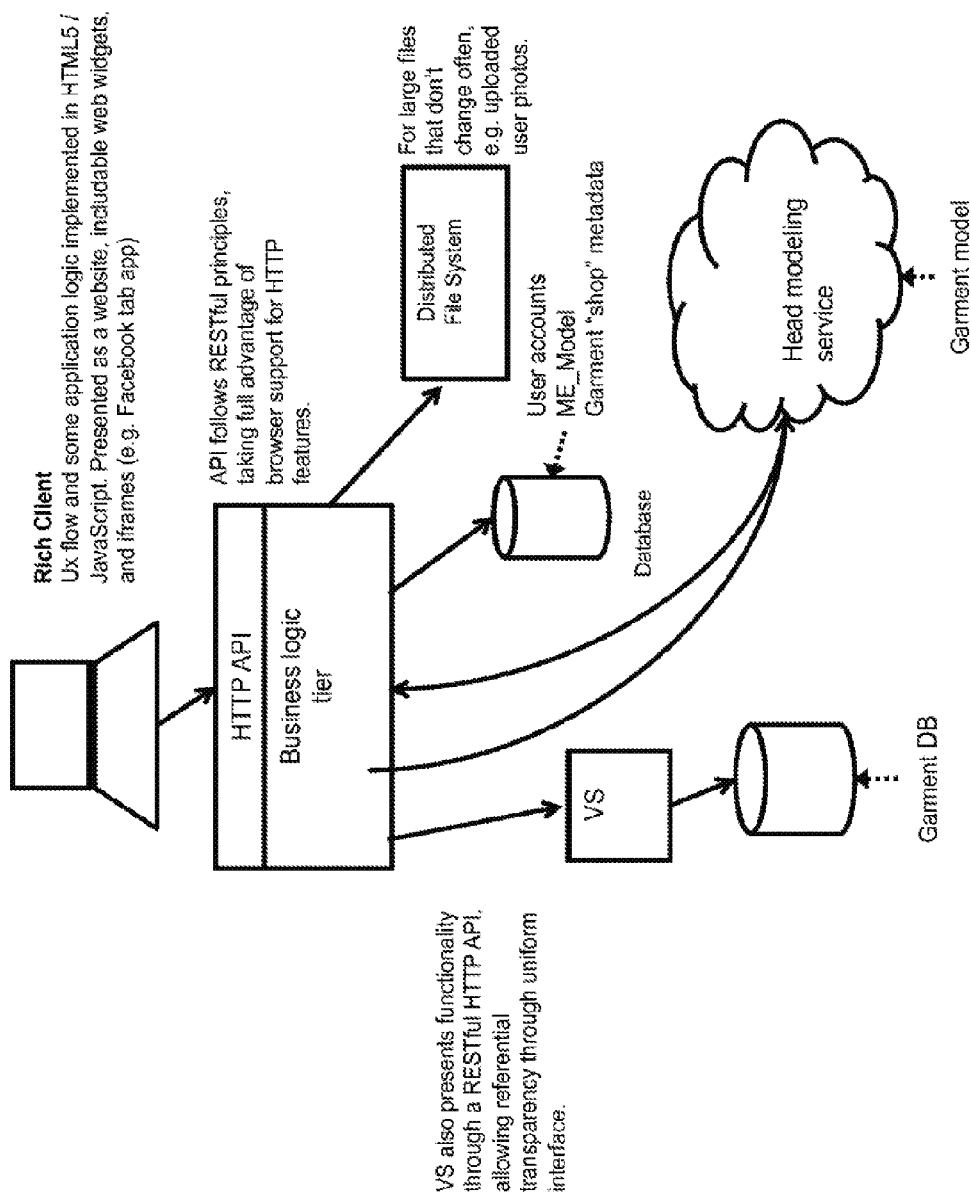
FIG. 44 shows an example of IT infrastructure which may be used in garment body modelling.
Figure 45:
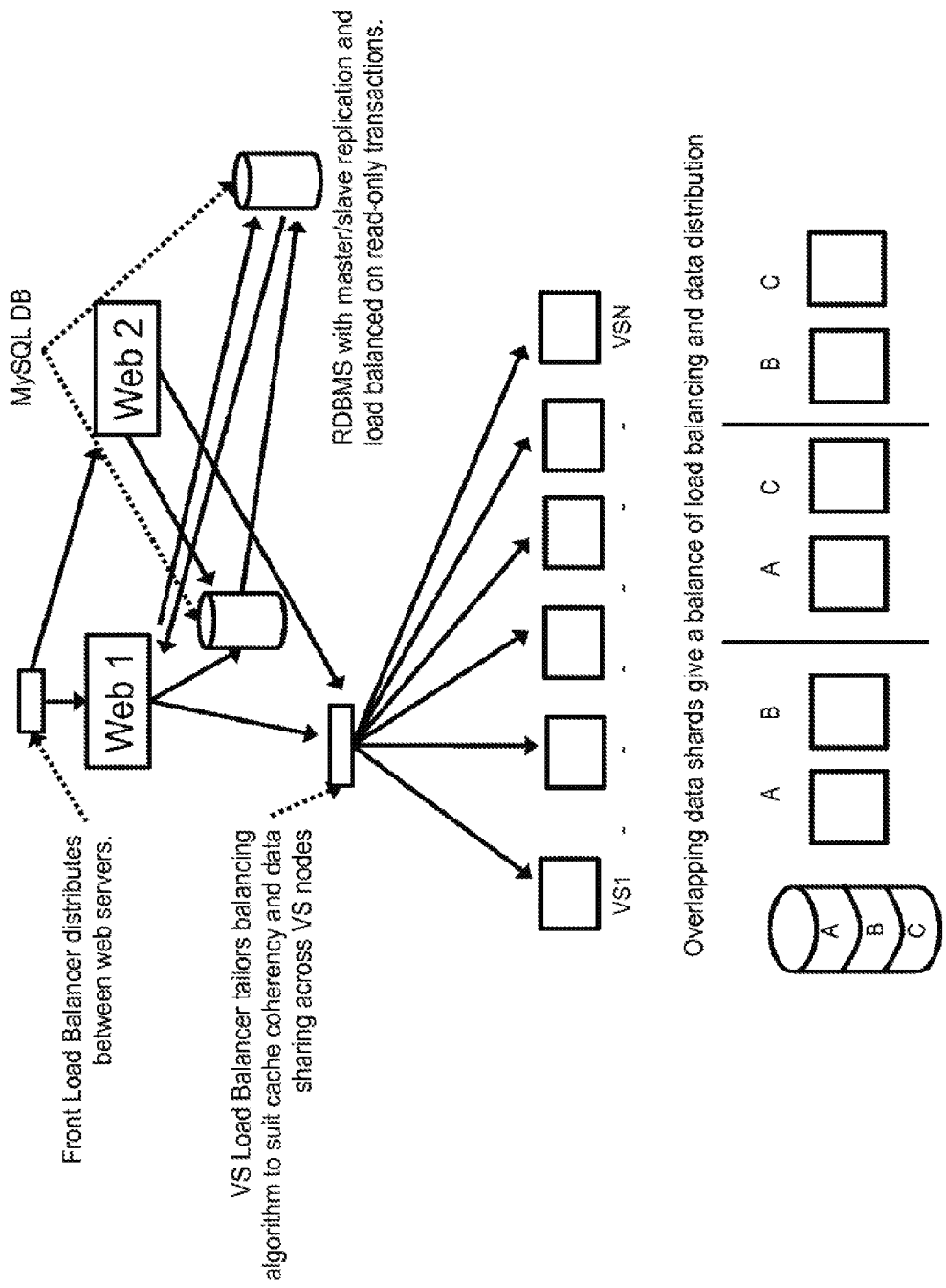
FIG. 45 shows examples of IT infrastructure which may be used in garment body modelling.

Examples of IT infrastructure are provided in FIG. 44 and FIG. 45. The throughput of the VS is in an example close to being directly proportional to the speed per-render.

Section 136: Adding More Nodes

The visualization subsystem is for example homogenous and can work statelessly in operation. This means we can increase the throughput of this subsystem simply by adding more nodes.

Section 137: Caching Strategies

Since the speed-per-render of the subsystem is proportional to its throughput, we can improve scalability by employing caching and using session affinity in the VS load balancer to optimize access. There are a number of potential strategies here:—

Section 138: Two-Part Request Affinity

Requests for the RGB and A parts of a render are sent to the same server, allowing most of the intermediate artefacts to be cached.

Section 139: Per-Avatar Session Affinity

Directing the same avatar visualizations to the same render node allows for high coherence in caching of body model data intermediates. This strategy forces a sub-optimal approach to load balancing if done naively (whereby an individual node could easily become overloaded while the rest are idle), so a form of sharding may be used, whereby an avatar is directed to 2 or 3 nodes from a pool of many.

Section 140: Client-Side Image Caching

The images generated during body model creation are often the same regardless of the user. By using standard web caching mechanisms (E-Tag headers, caching pragmas etc), these may be cached in standard web caches and in users' browsers, leading to lower load on the VS.

Section 141: Garment Data

The database of digital garment models may in an example be small enough to fit on a single VS node. This will not be the case in some examples for which we may take one of the following approaches:—

Section 142: Sharding

The garment data is divided ('sharding') between the render nodes in such a way that a load balancer can direct a request to visualize an outfit to a render node that has the right data.

Section 143: Distributed Database (DB)

The garment database is moved into a separate subsystem that the VS nodes can access over the network (like a traditional Relational database management system (RDBMS)). It's likely that some form of caching strategy would need to be employed in this case to maintain per-render speed.

Section 144: Hardware

A platform example (the Apple MacMini) was selected for having a good balance of GPU/CPU/IO performance at a price that represents good value. In another example, Solid-state drive (SSD) devices may be used rather than Hard disk drives (HDDs), because these could give better value. Frequent profiling of the software enables one to reason about performance/price trade-offs between hardware alternatives.

Section 145: Web Tier

In an example, the web tier consists of a number of logical components:—
- AJAX web client (HTML, CSS, JS. A minimal amount of server-side templating): Metail written software.
- API engine (Java application running in Jetty): Metail-written software.
- DB (MySQL)
- Distributed file system
- Web server
- Load balancer These components may run on the same hardware, but can all interact through network interfaces. A generic route to scalability involves identifying those components that are resource-hungry, and moving those components onto dedicated hardware.

An important property of the API engine is that the Java application running it is entirely stateless—it does not maintain per-user sessions. This allows us to scale trivially (by adding nodes), whilst being able to load balance randomly across the tier, without having to worry about session distribution e.g. through multicast.

Section 146: Improved DB Performance

This can be achieved in a number of ways, presented in the order of importance bottlenecks may arise:—

- Query optimization. Profiling may reveal the most performance critical queries. By rewriting these queries and adding indices to the database, we can improve speed and throughput.
- Moving the database onto dedicated hardware. The DB may run on the same hardware as the rest of the API engine. At some point, a tipping point is reached where the increased speed of query execution gained by running it on separate hardware exceeds the network overhead incurred. At this point the DB can be moved to run on a separate master-slave cluster.
- Expand the DB cluster. Database throughput for reads (but not writes) can be improved by increasing the number of slaves in the RDBMS master-slave cluster.
- Data partitioning—we can separate out garments per retailer, and can shard the end user data between several different databases, or by optimizing individual nodes for a subset of the data and directing traffic intelligently.
- Move the database onto specialized hardware, with e.g. RAIDed SSDs. Once the database is running on its own hardware, a solution to improve query execution is to improve the hardware. The problem with this route is that it has rapidly diminishing cost-performance increase, and there is a hard limit on how much performance can be improved.
- Rewrite database layer. By using a distributed database with relaxed consistency guarantees (e.g. MongoDB, CouchDB), we can improve read and write throughput for the database. This might not be necessary for Metail's core application, but it is possible as a strategy for e.g. recommender system and data mining.

Section 147: Optimize and Distribute Performance Critical Code

The performance of the API engine can be improved by the usual profiling and code optimization approaches. In addition to this, the same approach may be used as used with the VS: identifying performance critical sections of code, in particular those that are functional (i.e. do not require access to the database) and stateless in operation, and creating subsystems around them to allow them to be scaled trivially, through addition of nodes.

Section 148: Offload SSL Decryption

Our application may make heavy use of SSL to secure communications between the AJAX web client and the API engine. These requests are decrypted by the load balancer. At around 200 Mbit/s of traffic, we may need to dedicate a pair of machines to the load balancer and install an entropy key service to ensure smooth operation.

Section 149: Spare Capacity/Node Provisioning

An important aspect of scalability is the ability to cope with a sudden high-load. This is catered for by keeping spare capacity for various parts of the system on hot- or warm-standby, such that they can be included in the system at short notice, but don't incur cost whilst on standby. There are a couple of examples of strategies that make this more effective and practical:—

- By automating the setup of our servers and optimizing this automatic installation, we reduce the time, cost and effort required to expand our system, which allows us to scale more quickly, and allows us to carry spare capacity in the form of minimally installed servers.
- Disaster resilience will mean that we may keep a mirror of our system in a geographically separate data center. This mirror will be used as spare capacity by default.

Section 150: Various Miscellaneous Implementation Features

The body model can in one example be duplicated on the screen, so that the user can dress the body model and compare two separate outfits side by side. Another aspect is that a user can select to compare her body model with another user, for instance her boyfriend or a friend to see how the two outfits match together.

The virtual fitting room may allow the user to search and filter the garments presented using different filter parameters. For instance the user can filter the garments based on a specific style, a product category or a fashion trend.

The user can select to randomize the hairstyle used on the body model. This allows the user to create a random look on the body model.

In the virtual fitting room the user can wear accessories such as bags, scarfs and hats in different ways. A scarf can for instance be worn tied around the neck and alternatively loosely hanging over the shoulders. Similarly the user can select at which height she would like to wear a belt if that is not worn with the trousers. In one example the user can click and drag the belt into the correct position. Glasses and sunglasses can be worn on the face or up on the head or for instance in the breast pocket of a shirt.

The virtual fitting room provides personalized fitting information to the users. This is communicated in a friendly way or in the manner of a stylist e.g. 'This is too loose on your bust, try a size smaller' or 'this is too small for your hips, try a bigger size or an A-line shaped dress'.

The virtual fitting room can provide recommended style advice and complementary products that go with what is being worn and also fit with the style that has been bought by the user in the past. This can for instance be in the form of a 'personalise my outfit' button where the outfit is automated. This process can be refined through user input on the recommended garments or outfit. The user can for instance "dislike" or rate a recommended outfit.

In one example the virtual fitting room provides general user styling tips for the user's shape and size (e.g. You are an hourglass so avoid high necks and dropped waistlines; with this dress try wearing a waist belt to make the most of your figure and highlight your best features).

Users can indicate their best feature and their feature they need to cover up to inform specific recommendation of garments and styling.

In one example the user can select to remove the bra from the body model. The difference that this makes to the garment is then shown.

A virtual fitting room mobile app/widget is an alternative interface in which the user can interact with the body model and the virtual fitting room. For instance the profile can be accessed, looks created and shared, products purchased, comments received from other users, and the following of other users, are possible.

More sliders and input fields may be added to the user interface—for example an input for inner thigh size. These need not have values attached to them, but can be a "fine tune" so users can get the shape they think is accurate.

Additionally, there can be provided a "fine tune" section where you can (e.g. using uncalibrated sliders) change parts of the body after it is made—such as thigh width, shoulders, how big arms are etc. Examples of body parts for which values can be added or fine tuned are Head, Forehead, Jaw, Cheek, Chin, Eye, Ear, Nose, Mouth, Teeth, Neck, Shoulders, Arm, Elbow, Wrist, Hand, Fingers, Thumb, Spine, Chest, Breast, Abdomen, Groin, Hip, Buttocks, Navel, Leg, Thigh, Knee, Calf, Heel, Ankle, Foot and Toes.

All publications mentioned in the above specification are herein incorporated by reference.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer implemented method of generating search results using a web search engine associated with a social network including an account of a user, and generating a photo-realistic image of a selected garment combined onto a 3D virtual body model, the method comprising the steps of:
   (a) receiving user measurement data entered by the user;
   (b) generating the 3D virtual body model of the user based on the received user measurement data entered by the user;
   (c) the web search engine using the 3D virtual body model, or data that defines some or all of the 3D virtual body model, in its search process, algorithm or algorithms so that a search for garments or other goods or services returns search results that are relevant to a potential purchaser with the user's 3D virtual body model, in which the web search engine is associated with the social network, the social network including a plurality of user accounts including the account of the user, and in which the social network includes the user's 3D virtual body model;
   (d) the web search engine receiving an indication of the selected garment on a website from the user, and
   (e) a computer implemented system analysing the image of the selected garment from the web site and then searching and identifying the selected garment in a database of previously analysed garments and then combining one or more virtual images of the selected garment from the database onto the 3D virtual body model of the user and then displaying to the user the combined selected garment and 3D virtual body model, as the photo-realistic image of the selected garment combined onto the 3D virtual body model.

2. The method of claim 1, in which a search for shopping for garments returns search results that are relevant to a potential purchaser with that user's 3D virtual body model.

3. The method of claim 2, in which the user is presented with alternative garments that match a garment in an identified image and the user can select which garment is to be presented on the user's associated body model.

4. The method of claim 2, in which the user can also get a recommendation that one of the garments they are trying out has complementary garments.

5. The method of claim 2, in which a combined garment and 3D virtual body model is shown within a web browser.

6. The method of claim 2, in which a virtual fitting room is connectable to the search engine as well as to different types of platforms such as social networking sites and different retailers.

7. The method of claim 6, in which there is provided a feature where the user can take an image of an outfit worn by a person and that image, or the corresponding outfit, is matched to garments the virtual fitting room has in its database.

8. The method of claim 7, in which the search provides an absolute match of the garments and suggest the same ones as seen in the image.

9. The method of claim 2, in which there is provided an index matching system such that a user could search for items from people with an 80% body match index, or from people with a 95% body match index.

10. The method of claim 2, in which a virtual fitting room can provide sizing information data to a search engine, either as the sizing information for a specific retailer or brand or for instance the measurements of the user's body model.

11. The method of claim 2, in which a virtual fitting room allows the user to search and filter the garments presented using different filter parameters.

12. The method of claim 2, the method further comprising a method for generating an image of a user in a garment, in which a system can access a virtual body model of the user and a database of garment images and a history or record of previous garments purchased or viewed by the user, and the system automatically, without user intervention, selects a garment which the system determines is a suitable garment given the history or record of previous garments purchased or viewed by the user and then combines an image of that garment onto the virtual body model and automatically without user intervention provides to the user an image of the garment, combined with the virtual body model, to enable that person to visualise what the garment will look like when worn by them.

13. The method of claim 2, in which a system has access to a database of images of many different garments and selects which garment to choose by applying criteria based on a purchasing history of the user.

14. The method of claim 2, in which a virtual wardrobe or garment storage environment is provided which stores images of all garments purchased by the user after they have been shown when combined with the user's virtual body model; including in the virtual wardrobe or garment storage environment images of other garments, purchased or selected by the user without having been combined with the user's virtual body model.

15. The method of claim 2, in which a virtual fitting room allows the user to search and filter the garments presented using different filter parameters, and in which the user can filter the garments based on a specific style, a product category or a fashion trend.

16. The method of claim 1, in which the search engine optimises searches from a user for any of the following good or services or events using the 3D virtual body model of that user: garments, footwear, food, restaurants, holidays, flights, insurance, sports events, medicines, physical therapy, books, entertainment.

17. The method of claim 1, so that search results are optimised to be relevant to a user with that particular 3D virtual body model when searching.

18. The method of claim 1, in which the user, when viewing a website showing a garment on a touch screen device, indicates that the garment is to be visualised on his or her 3D virtual body model by touching the image of the garment shown on the touch screen display.

19. The method of claim 1, in which the computer implemented system searches and identifies that garment in a database of previously analysed garments by using an image matching system that can assess the similarity between two images of objects.

20. The method of claim 1, in which the computer implemented system searches and identifies that garment in a database of previously analysed garments by using garment identification metadata exposed by the website.

21. The method of claim 1, in which a web browser extension enables the user, when browsing the web site, to initiate the tasks required to be performed by the computer implemented system.

22. The method of claim 1, in which 3D virtual body model sizing information is usable in the search engine's search algorithms.

23. A computer system, the computer system including a web search engine and a social network, the computer system adapted or operable to generate search results using the web search engine which is associated with the social network, the social network including a plurality of user accounts including an account of a user, in which the computer system is configured to:
(a) receive user measurement data entered by the user;
(b) generate a 3D virtual body model of the user based on the received user measurement data entered by the user;
(c) use the web search engine to use the 3D virtual body model, or data that defines some or all of the 3D virtual body model, in its search process, algorithm or algorithms so that a search for garments or other goods or services returns search results that are relevant to a potential purchaser with the user's 3D virtual body model, and wherein the social network includes the user's 3D virtual body model;
(d) use the web search engine to receive an indication of a selected garment on a web site from the user, and
(e) analyse the image of the selected garment from the website and then search and identify the selected garment in a database of previously analysed garments and then combine one or more virtual images of the selected garment from the database onto the 3D virtual body model of the user and then display to the user the combined selected garment and 3D virtual body model, as a photo-realistic image of the selected garment combined onto the 3D virtual body model.

* * * * *